(12) United States Patent
Kawata et al.

(10) Patent No.: US 10,507,629 B2
(45) Date of Patent: Dec. 17, 2019

(54) HOT-DIP GALVANIZED STEEL SHEET

(71) Applicant: NIPPON STEEL CORPORATION, Tokyo (JP)

(72) Inventors: Hiroyuki Kawata, Kisarazu (JP); Takeshi Yasui, Jawa Barat (ID); Kohei Ueda, Chiba (JP); Naoki Maruyama, Kimitsu (JP); Yuji Yamaguchi, Kimitsu (JP); Satoshi Uchida, Kisarazu (JP); Ryosuke Komami, Kimitsu (JP); Hayato Arai, San Pedro (MX); Yasuhiro Nakashima, Chiba (JP); Toyomitsu Nakamura, Kisarazu (JP)

(73) Assignee: NIPPON STEEL CORPORATION, Tokyo (JP)

( * ) Notice: Subject to any disclaimer, the term of this patent is extended or adjusted under 35 U.S.C. 154(b) by 272 days.

(21) Appl. No.: 15/522,409

(22) PCT Filed: Nov. 5, 2015

(86) PCT No.: PCT/JP2015/081235
§ 371 (c)(1),
(2) Date: Apr. 27, 2017

(87) PCT Pub. No.: WO2016/072477
PCT Pub. Date: May 12, 2016

(65) Prior Publication Data
US 2017/0313028 A1    Nov. 2, 2017

(30) Foreign Application Priority Data
Nov. 5, 2014  (JP) .................................. 2014-225612

(51) Int. Cl.
*B32B 15/01* (2006.01)
*C23C 2/06* (2006.01)
(Continued)

(52) U.S. Cl.
CPC .............. *B32B 15/013* (2013.01); *C21D 9/46* (2013.01); *C22C 38/001* (2013.01);
(Continued)

(58) Field of Classification Search
None
See application file for complete search history.

(56) References Cited

U.S. PATENT DOCUMENTS 6,410,163 B1    6/2002  Suzuki et al.
2010/0304183 A1  12/2010  Honda et al.
(Continued)

FOREIGN PATENT DOCUMENTS

CN    101336308 A    12/2008
CN    102753730 A    10/2012
(Continued)

OTHER PUBLICATIONS

International Search Report for PCT/JP2015/081235 dated Feb. 2, 2016.
(Continued)

*Primary Examiner* — Daniel J. Schleis
(74) *Attorney, Agent, or Firm* — Birch, Stewart, Kolasch & Birch, LLP

(57) ABSTRACT

A hot-dip galvanized steel sheet wherein the hot-dip galvanized steel sheet comprises a base steel sheet and a hot-dip galvanized layer, a ferrite phase is, by volume fraction, 40% or more and 97% or less in a range of ⅛ thickness to ⅜ thickness centered at a position of ¼ thickness from the surface of the base steel sheet, a hard structure is 3% or more in total, wherein the hot-dip galvanized steel sheet has the hot-dip galvanized layer in which Fe is 5.0% or less and Al is 1.0% or less, and columnar grains formed of a $\zeta$ phase is 20% or more in an entire interface between the plated layer and the base steel sheet on the surface of the base steel sheet
(Continued)

in which a ratio of a volume fraction of the hard structure in a surface layer range of 20 µm depth in a steel sheet direction from an interface between the hot-dip galvanized layer and the base steel sheet is 0.10 times or more to 0.90 times or less of a volume fraction of the hard structure in the range of ⅛ thickness to ⅜ thickness, and wherein the hot-dip galvanized steel sheet has a refined layer at the side of the interface in the base steel sheet, and wherein an average thickness of the refined layer, an average grain size of ferrite in the refined layer and a maximum size of the oxide included in the refined layer are defined respectively.

20 Claims, 1 Drawing Sheet

(51) Int. Cl.
　　*C23C 2/40*　　　(2006.01)
　　*C21D 9/46*　　　(2006.01)
　　*C22C 38/06*　　(2006.01)
　　*C22C 38/00*　　(2006.01)
　　*C22C 38/02*　　(2006.01)
　　*C22C 38/04*　　(2006.01)
　　*C22C 38/08*　　(2006.01)
　　*C22C 38/12*　　(2006.01)
　　*C22C 38/14*　　(2006.01)
　　*C22C 38/16*　　(2006.01)
　　*C22C 38/18*　　(2006.01)

(52) U.S. Cl.
　　CPC .......... *C22C 38/002* (2013.01); *C22C 38/005* (2013.01); *C22C 38/02* (2013.01); *C22C 38/04* (2013.01); *C22C 38/06* (2013.01); *C22C 38/08* (2013.01); *C22C 38/12* (2013.01); *C22C 38/14* (2013.01); *C22C 38/16* (2013.01); *C22C 38/18* (2013.01); *C23C 2/06* (2013.01); *C23C 2/40* (2013.01); *B32B 2255/06* (2013.01); *B32B 2255/205* (2013.01); *C21D 2211/005* (2013.01); *Y10T 428/12799* (2015.01)

(56) References Cited

U.S. PATENT DOCUMENTS

| | | |
|---|---|---|
| 2012/0031528 A1 | 2/2012 | Hayashi et al. |
| 2012/0100391 A1 | 4/2012 | Lee et al. |
| 2012/0175028 A1 | 7/2012 | Matsuda et al. |
| 2012/0222781 A1 | 9/2012 | Azuma et al. |
| 2014/0212684 A1 | 7/2014 | Kawata et al. |
| 2014/0227555 A1 | 8/2014 | Kawata et al. |
| 2014/0234657 A1 | 8/2014 | Azuma et al. |
| 2014/0234659 A1 | 8/2014 | Kawata et al. |
| 2014/0234660 A1 | 8/2014 | Kawata et al. |
| 2014/0255725 A1 | 9/2014 | Yamanaka et al. |
| 2014/0377582 A1 | 12/2014 | Azuma et al. |
| 2015/0083278 A1 | 3/2015 | Kawata et al. |
| 2017/0313028 A1 | 11/2017 | Kawata et al. |

FOREIGN PATENT DOCUMENTS

| | | |
|---|---|---|
| CN | 102787271 A | 11/2012 |
| CN | 103328676 A | 9/2013 |
| CN | 103857819 A | 6/2014 |
| EP | 2631319 A1 | 8/2013 |
| EP | 2762585 A1 | 8/2014 |
| JP | 51-12575 B1 | 4/1976 |
| JP | 9-157821 A | 6/1997 |
| JP | 9-167819 A | 6/1997 |
| JP | 9-176815 A | 7/1997 |
| JP | 9-241812 A | 9/1997 |
| JP | 11-140587 A | 5/1999 |
| JP | 2001-26853 A | 1/2001 |
| JP | 2001-303226 A | 10/2001 |
| JP | 2002-88459 A | 3/2002 |
| JP | 2002-167656 A | 6/2002 |
| JP | 2003-55751 A | 2/2003 |
| JP | 2003-73772 A | 3/2003 |
| JP | 2003-96541 A | 4/2003 |
| JP | 2004-124187 A | 4/2004 |
| JP | 2005-60742 A | 3/2005 |
| JP | 2005-60743 A | 3/2005 |
| JP | 2005-200750 A | 7/2005 |
| JP | 2006-63360 A | 3/2006 |
| JP | 2008-19465 A | 1/2008 |
| JP | 2008-24972 A | 2/2008 |
| JP | 2011-111675 A | 6/2011 |
| JP | 2013-541645 A | 11/2013 |
| KR | 10-2012-0031510 A | 4/2012 |
| KR | 10-2013-0006507 A | 1/2013 |
| KR | 10-204-0030785 A | 3/2014 |
| TW | 201319267 A1 | 5/2013 |
| TW | 201329251 A1 | 7/2013 |
| TW | 201329252 A1 | 7/2013 |
| TW | 201331383 A1 | 8/2013 |
| WO | WO 2013/018739 A1 | 2/2013 |
| WO | WO 2013/047755 A1 | 4/2013 |
| WO | WO 2013/118679 A1 | 8/2013 |
| WO | WO 2016/072475 A1 | 5/2016 |

OTHER PUBLICATIONS

Office Action for TW 104136602 dated May 25, 2016.
Written Opinion of the International Searching Authority for PCT/JP2015/081235 (PCT/ISA/237) dated Feb. 2, 2016.
English translation of the Written Opinion of the International Searching Authority (Form PCT/ISA/237) for Application No. PCT/JP2015/081237, dated Feb. 2, 2016.
International Search Report and English translation (Form PCT/ISA/210) for Application No. PCT/JP2015/081237, dated Feb. 2, 2016.
Taiwanese Office Action and Search Report for Application No. 104136603, dated Aug. 11, 2016, with an English Translation of the Search Report.
Extended European Search Report for European Application No. 15857390.7, dated Mar. 8, 2018.
Korean Notice of Allowance for Application No. 10-2017-7010984, dated Aug. 1, 2018, with English language translation.
Notice of Allowability dated Jun. 27, 2018 for U.S. Appl. No. 15/520,502.
Chinese Office Action and Search Report for counterpart Chinese Application No. 201580058632.6, dated Oct. 31, 2018, with English translation for Search Report.
Chinese Office Action and Search Report for related Chinese Application No. 201580058649.1, dated Oct. 31, 2018, with English translation of the Search Report.
Indian Office Action for Indian Application No. 201717014417, dated Mar. 18, 2019, with English translation.
International Search Report for PCT/JP2015/081231 (PCT/ISA/210) dated Jan. 26, 2016, with an English translation.
International Search Report for PCT/JP2015/081236 (PCT/ISA/210) dated Jan. 26, 2016, with an English translation.
Japanese Office Action dated Jun. 5, 2018, issued in Japanese Patent Application No. 2016-557817.
Korean Notice of Allowance, dated Aug. 1, 2018, for corresponding Korean Application No. 10-2017-7012050, with an English translation.
Korean Notice of Allowance, dated Aug. 17, 2018, for Korean Application No. 10-2017-7011181, with an English translation.
Taiwanese Office Action for Patent Application No. 104136604 dated Dec. 7, 2016.
Taiwanese Office Action for Patent Application No. 104136605 dated May 25, 2016.
U.S. Notice of Allowance, dated Sep. 19, 2018, for U.S. Appl. No. 15/520,502.

(56) References Cited

OTHER PUBLICATIONS

U.S. Office Action, dated Apr. 2, 2019, for U.S. Appl. No. 15/521,535.
U.S. Office Action, dated Apr. 8, 2019, for U.S. Appl. No. 15/522,243.
U.S. Office Action, dated Jan. 4, 2018, for U.S. Appl. No. 15/520,502.
Written Opinion of the International Searching Authority (PCT/ISA/237), dated Jan. 26, 2016, for International Application No. PCT/JP2015/081236, with an English translation.
Written Opinion of the International Searching Authority for PCT/JP2015/081231 (PCT/ISA/237) dated Jan. 26, 2016, with an English translation.

HOT-DIP GALVANIZED STEEL SHEET

TECHNICAL FIELD OF THE INVENTION

The present invention relates to a hot-dip galvanized steel sheet. The present invention relates to a high strength hot-dip galvanized steel sheet particularly excellent in ductility, bendability, hole expansibility, and plating adhesion at the time of bending deformation and excellent in cyclic bending fatigue resistance.

Priority is claimed on Japanese Patent Application No. 2014-225612, filed on Nov. 5, 2014, the content of which is incorporated herein by reference.

RELATED ART

There has been an increasing demand for high-strengthening of steel sheets mainly used for automotive frame members in recent years. For these high strength steel sheets, it is necessary to have formabilities such as ductility, bendability and flange formability in order to obtain complex member shapes. In addition, since these high strength steel sheets are always affected by vibration when used for automotive members, it is required to have high fatigue resistance. Further, since an automotive steel sheet is generally used outdoors, it is usually required for the steel sheet to have excellent corrosion resistance.

In uses for automotive outside sheets and the like, the peripheral part of a sheet is usually subjected to severe bending (hem bending) by press working. Not only in uses for the automotive outside sheets but also in other uses, a sheet is subjected to severe bending by press working, hole expansion working, or the like to be used in many cases. In the case of subjecting a conventional hot-dip galvanized steel sheet to severe bending, hole expansion working, or the like, the plated layer is sometimes peeled off from the base steel sheet in the worked part. When the plated layer is peeled off from the base steel sheet as described above, there is a problem that the corrosion resistance of the peeled part is lost and the base steel sheet is corroded and rusted at an early stage. In addition, even when the plated layer is not peeled off, the adhesion between the plated layer and the base steel sheet is lost, even small voids are formed in the area in which the adhesion is lost to cause external air or moisture to enter the voids. Thus, a function of corrosion resistance by the plated layer is lost, and as a result, as described above, corrosion and rusting occurs in the base steel sheet at an early stage.

In view of such problems, for a high strength steel sheet for uses in which such severe bending or the like is performed, there has been a strong desire for developing a plated steel sheet including a hot-dip galvanized layer excellent in adhesion of the plated layer with the base steel sheet.

In order to enhance the adhesion of a plated layer, for example, as represented by Patent Documents 1 to 3, methods of forming oxides inside a steel sheet and reducing the amount of oxides at an interface between the base steel and a plated layer that causes plating peeling are proposed. However, in such a case of forming an oxide on the surface of the steel sheet, carbon in the surface of the steel sheet is bound to oxygen to be gasified, and as a result, carbon is released from the steel sheet. Thus, in the technologies described in Patent Documents 1 to 3, the strength of the region of the steel sheet from which the carbon is released is significantly decreased in some cases. In the case in which the strength of the surface of the steel sheet is decreased, there is a concern that fatigue resistance, which strongly depends on the properties of the surface part, is deteriorated and thus fatigue limit strength is significantly decreased.

Alternatively, in order to enhance the adhesion of a plated layer, in Patent Document 4, a method of enhancing plating adhesion by reforming the surface of a base steel sheet in such a manner that steps are performed by adding new annealing step and pickling step before a normal annealing step, is proposed. However, in the method described in Patent Document 4, the number of steps is increased as compared to a normal method of producing a high strength plated steel sheet, and thus there is a problem in costs.

Further, in Patent Document 5, a method of enhancing plating adhesion by removing carbon from the surface part of a base steel sheet is proposed. However, in the method described in Patent Document 5, the strength of the region from which carbon is removed is significantly decreased. In this case, there is a concern that fatigue resistance, which strongly depends on the properties of the surface part, is deteriorated and thus fatigue limit strength is significantly decreased in the method described in Patent Document 5.

In Patent Documents 6 and 7, there are disclosed steel sheets in which the amounts of Mn, Al, and Si in a plated layer are controlled to be within a suitable range and plating adhesion is improved. For the steel sheets described in these Patent Documents 6 and 7, it is required to control the amounts of elements in the plated layer with high accuracy at the time of production, which applies a great industrial load and causes a problem in costs.

In Patent Document 8, a high strength steel sheet in which the microstructure of the steel sheet is formed of only ferrite is proposed as a method for enhancing plating adhesion. However, since the microstructure is formed of only soft ferrite in the steel sheet described in Patent Document 8, sufficiently high strength cannot be obtained.

Here, a galvannealed steel sheet obtained by subjecting a steel sheet to an alloying treatment after a hot dip galvanizing treatment is widely used. The alloying treatment is a treatment of heating a plated layer to a temperature of equal to or higher than the melting point of Zn, diffusing a large amount of Fe atoms into the plated layer from the inside of a base steel sheet, and forming the plated layer into a layer mainly including a Zn—Fe alloy. For example, in Patent Documents 9, 10 and 11, galvannealed steel sheets excellent in plating adhesion are proposed. However, in the galvannealed steel sheets of Patent Documents 9 to 11, it is required to heat a steel sheet at a high temperature so as to sufficiently alloy the plated layer. When the steel sheet is heated to a high temperature, the microstructure inside the steel sheet is reformed and particularly coarse iron-based carbides are easily generated and the properties of the steel sheet deteriorate. Thus, this case is not preferable.

In Patent Document 12, in the production of the hot-dip galvanized steel sheet of the base steel sheet containing Si—Mn—Al, by controlling of the entering temperature and defining the area fraction of the cross section of the alloy layer formed at the interface between the base steel sheet and the plated layer, the technology for improving plating adhesion and spot weldability is disclosed.

In the steel sheet described in Patent Document 12, it is disclosed that Si—Mn oxides adversely affect on plating adhesion. However, a technology for reducing the amounts of Si—Mn oxides until plating is started is not disclosed in Patent Document 12. In addition, in Patent Document 12, the temperature at which the base steel sheet enters a plating bath is set to be higher than the temperature of the hot dip galvanizing bath (The temperature varies depending on the Al content in the hot dip galvanizing bath, the temperature at which the base steel sheet enters a plating bath is set to be at least 4° C. higher than temperature of the hot dip galvanizing bath and to be at most 28° C. higher than temperature of the hot dip galvanizing bath.), therefore regarding the stability of the bath temperature, and uniformity in the properties of the product is not sufficient in some cases.

PRIOR ART DOCUMENT

Patent Document

[Patent Document 1] Japanese Unexamined Patent Application, First Publication No. 2008-019465
[Patent Document 2] Japanese Unexamined Patent Application, First Publication No. 2005-060742
[Patent Document 3] Japanese Unexamined Patent Application, First Publication No. H9-176815
[Patent Document 4] Japanese Unexamined Patent Application, First Publication No. 2001-026853
[Patent Document 5] Japanese Unexamined Patent Application, First Publication No. 2002-088459
[Patent Document 6] Japanese Unexamined Patent Application, First Publication No. 2003-055751
[Patent Document 7] Japanese Unexamined Patent Application, First Publication No. 2003-096541
[Patent Document 8] Japanese Unexamined Patent Application, First Publication No. 2005-200750
[Patent Document 9] Japanese Unexamined Patent Application, First Publication No. H11-140587
[Patent Document 10] Japanese Unexamined Patent Application, First Publication No. 2001-303226
[Patent Document 11] Japanese Unexamined Patent Application, First Publication No. 2005-060743
[Patent Document 12] Published Japanese Translation No. 2013-541645 of the PCT International Publication

DISCLOSURE OF THE INVENTION

Problems to be Solved by the Invention

In consideration of the above circumstances, an object of the present invention is to provide a high strength hot-dip galvanized steel sheet excellent in formabilities of a steel sheet, which are represented by ductility, bendability and stretch-flange formability and excellent in fatigue resistance, weldability, corrosion resistance and plating adhesion.

Means for Solving the Problem

The present inventors have conducted intensive investigations for obtaining a high strength hot-dip galvanized steel sheet excellent in formabilities of a steel sheet represented by ductility, bendability and stretch-flange formability and excellent in fatigue resistance, weldability, corrosion resistance and plating adhesion. As a result, the present inventors have improved ductility and hole expansibility (stretch-flange property) by controlling microstructures of a steel sheet in an appropriate structure fraction. In addition, the present inventors have improved bendability and fatigue resistance by controlling a volume fraction of a hard phase at the side of the base steel sheet of an interface between a plating layer and the base steel sheet. The present inventors have suppressed plating peeling by forming a ζ phase ($FeZn_{13}$) in a plated layer and incorporating a coarse oxide, which acts as a fracture origin, in the inside thereof. By the above method, the present inventors have found that a hot-dip galvanized steel sheet excellent in formabilities of a steel sheet represented by ductility, bendability and hole expansibility (stretch-flange property) and excellent in fatigue resistance, weldability, corrosion resistance and plating adhesion can be obtained without subjecting the plating layer to an alloying treatment.

The present invention has been completed based on the findings and aspects thereof are as follows.

(1) A hot-dip galvanized steel sheet according to an aspect of the present invention, is a hot-dip galvanized steel sheet comprising: a base steel sheet; and a hot-dip galvanized layer formed on at least one surface of the base steel sheet, wherein: the base steel sheet includes, a chemical composition comprising, % by mass, C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%, and
a remainder of Fe and impurities;

in a range of ⅛ thickness to ⅜ thickness centered at a position of ¼ thickness from the surface of the base steel sheet, by volume fraction, 40% or more and 97% or less of a ferrite phase, a total of 3% or more of a hard structure comprising one or more of a bainite phase, a bainitic ferrite phase, a fresh martensite phase and a tempered martensite phase, a residual austenite phase is 0 to 8% by volume fraction, a total of a pearlite phase and a coarse cementite phase is 0 to 8% by volume fraction, in a surface layer range of 20 μm depth in a steel sheet direction from an interface between the hot-dip galvanized layer and the base steel sheet, a volume fraction of a residual austenite is 0 to 3%, the base steel sheet includes a microstructure in which V1/V2 which is a ratio of a volume fraction V1 of the hard structure in the surface layer range and a volume fraction V2 of the hard structure in the range of ⅛ thickness to ⅜ thickness centered at the position of ¼ thickness from the surface of the base steel sheet is 0.10 or more and 0.90 or less, a Fe content is more than 0% to 5.0% or less and an Al content is more than 0% to 1.0% or less in the hot-dip galvanized layer, and columnar grains formed of a ζ phase are included in the hot-dip galvanized layer, a ratio (($A^*$/A)×100) of an interface ($A^*$) between the ζ phase and the base steel sheet in an entire interface (A) between the hot-dip galvanized plated layer and the base steel sheet is 20% or more, a refined layer is formed at the side of the interface in the base steel sheet, an average thickness of the refined layer is 0.1 to 5.0 μm, an average grain size of ferrite in the refined layer is 0.1 to 3.0 μm, one or two or more of oxides of Si and Mn are contained, and a maximum size of the oxide is 0.01 to 0.4 μm.

(2) The hot-dip galvanized steel sheet according to the above (1), wherein the base steel sheet further contains, % by mass, one or two or more selected from Ti: 0.001% to 0.150%,
Nb: 0.001% to 0.100%, and
V: 0.001% to 0.300%.

(3) The hot-dip galvanized steel sheet according to the above (1) or (2), wherein the base steel sheet contains, % by mass, one or two or more selected from Cr: 0.01% to 2.00%,
Ni: 0.01% to 2.00%,
Cu: 0.01% to 2.00%,
Mo: 0.01% to 2.00%, B: 0.0001% to 0.0100%, and W: 0.01% to 2.00%.

(4) The hot-dip galvanized steel sheet according to any one of the above (1) to (3), wherein the base steel sheet contains, % by mass, one or two or more selected from Ca, Ce, Mg, Zr, La, and REM in a total amount of 0.0001% to 0.0100%.

(5) The hot-dip galvanized steel sheet according to any one of the above (1) to (4), wherein a ratio of an interface formed between ζ grains in which coarse oxides are present and the base steel sheet in an interface between the ζ phase and the base steel sheet in the hot-dip galvanized layer is 50% or less.

(6) The hot-dip galvanized steel sheet according to any one of the above (1) to (5), wherein a plated amount on one surface of the base steel sheet in the hot-dip galvanized layer is 10 $g/m^2$ or more and 100 $g/m^2$ or less.

Effects of the Invention

According to the above aspects of the present invention, it is possible to provide a hot-dip galvanized steel sheet excellent in formability, fatigue resistance, weldability, corrosion resistance and plating adhesion.

EMBODIMENTS OF THE INVENTION

Figure 1:
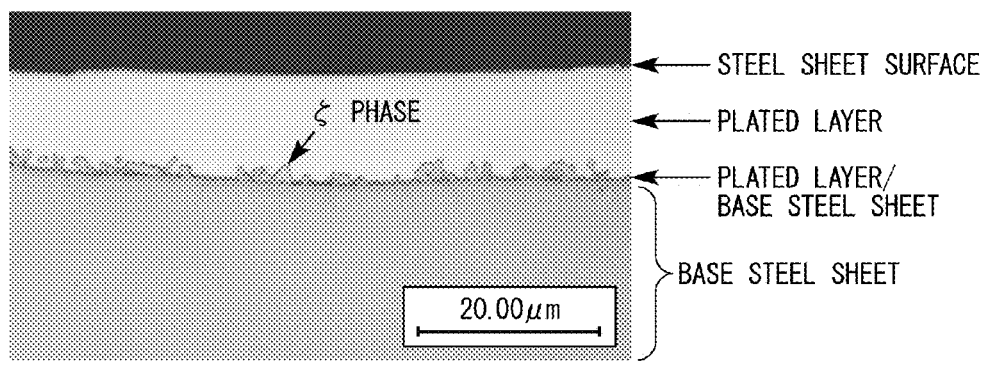
FIG. 1 is an enlarged structure micrograph of the vicinity of an area including an interface between a hot-dip galvanized layer and a base steel sheet in the cross section of a hot-dip galvanized steel sheet according to an embodiment.

A hot-dip galvanized steel sheet according to the embodiment is a hot-dip galvanized steel sheet which a hot-dip galvanized layer (hereinafter, also referred to as a plated layer simply) is formed on a surface of a base steel sheet (hereinafter, also referred to as a steel sheet simply) including a chemical composition which comprises, % by mass, C: 0.040% to 0.280%, Si: 0.05% to 2.00%, Mn: 0.50% to 3.50%, P: 0.0001% to 0.1000%, S: 0.0001% to 0.0100%, Al: 0.001% to 1.500%, N: 0.0001% to 0.0100%, O: 0.0001% to 0.0100%, and a remainder of Fe and impurities.

It is appropriate that the thickness of the base steel sheet is 0.6 mm or more and less than 5.0 mm. When the thickness of the base steel sheet is less than 0.6 mm, it is difficult to keep the shape of the base steel sheet flat and the thickness is not appropriate. In addition, when the thickness of the base steel sheet is 5.0 mm or more, the control of cooling in a production process will be difficult, a predetermined microstructure is not obtained and formability deteriorates.

First, the chemical components (composition) of the base steel sheet constituting the hot-dip galvanized steel sheet according to the embodiment will be described below. In the following description, the term "%" means "% by mass".

[C: 0.040% to 0.280%]

C is added to enhance the strength of the base steel sheet. However, when the C content is more than 0.280%, the spot weldability is deteriorated. Thus, the C content is 0.280% or less. From the viewpoint of spot weldability, the C content is preferably 0.250% or less and more preferably 0.220% or less. On the other hand, when the C content is less than 0.040%, the strength is deteriorated and thus it is difficult to secure sufficient maximum tensile strength. Thus, the C content is 0.040% or more. In order to further increase the strength, the C content is preferably 0.055% or more and more preferably 0.070% or more.

[Si: 0.05% to 2.00%]

Si is an element that suppresses formation of iron-based carbides in the base steel sheet and enhances strength and formability. However, Si is an element that makes steel brittle. When the Si content is more than 2.00%, a trouble such as cracking of a cast slab or the like easily occurs. Therefore, the Si content is 2.00% or less. Further, Si forms oxides on the surface of the base steel sheet in an annealing step to significantly impair plating adhesion. From this viewpoint, the Si content is preferably 1.500% or less and more preferably 1.200% or less. On the other hand, when the Si content is less than 0.05%, in a plating step for the hot-dip galvanized steel sheet, a large amount of coarse iron-based carbides is formed and strength and formability deteriorate. Therefore, the Si content is 0.05% or more. From the viewpoint of suppressing formation of iron-based carbides, the Si content is preferably 0.10% or more and more preferably 0.25% or more.

[Mn: 0.50% to 3.50%]

Mn is added to increase the strength by increasing the hardenability of the base steel sheet. However, when the Mn content is more than 3.50%, a coarse Mn-concentrated part is generated in the thickness central part of the base steel sheet and embrittlement easily occurs. Thus, a trouble such as cracking of a cast slab easily occurs. Therefore, the Mn content is 3.50% or less. In addition, an increase in the Mn content results in deterioration of spot weldability of the hot-dip galvanized steel sheet. For this reason, the Mn content is preferably 3.00% or less and more preferably 2.80% or less. On the other hand, when the Mn content is less than 0.50%, a large amount of soft structure during cooling after annealing is formed and thus it is difficult to secure a sufficiently high maximum tensile strength. Accordingly, the Mn content is necessary to be 0.50% or more. In order to further enhance strength of the hot-dip galvanized steel sheet, the Mn content is preferably 0.80% or more and more preferably 1.00% or more.

[P: 0.0001% to 0.1000%]

P is an element that makes steel brittle and when the P content is more than 0.1000%, troubles such as cracking of a cast slab and cracking of a slab during hot rolling easily occurs. Therefore, the P content is 0.1000% or less. In addition, P is an element that causes embrittlement of a molten part by spot welding, and the P content is preferably 0.0400% or less and more preferably 0.0200% or less in order to obtain sufficient welded joint strength. On the other hand, a P content of less than 0.0001% results in a greatly increased production cost. Thus, it is preferable that the P content has a lower limit of 0.0001% and the P content is 0.0010% or more.

[S: 0.0001% to 0.0100%]

S is an element that is bounded to Mn and forms coarse MnS and formability such as ductility, hole expansibility (stretch-flange property) and bendability deteriorates. Therefore, the S content is 0.0100% or less. In addition, S is an element that deteriorates spot weldability. Therefore, the S content is preferably 0.0060% or less and more preferably 0.0035% or less. On the other hand, a S content of less than 0.0001% results in a greatly increased production cost.

Therefore, it is preferable that the S content has a lower limit of 0.0001%, and the S content is 0.0005% or more, and more preferably 0.0010% or more.

[Al: 0.001% to 1.500%]

Al is an element that makes steel brittle. When the Al content is more than 1.500%, a trouble such as cracking of a cast slab easily occurs and thus the Al content is 1.500% or less. In addition, when the Al content is increased, spot weldability is deteriorated and thus the Al content is more preferably 1.200% or less and even more preferably 1.000% or less. On the other hand, even when the lower limit of the Al content is not particularly limited, the effects of the embodiment are exhibited. Al is an unavoidable impurity present in the raw material in a very small amount and an Al content of less than 0.001% results in a greatly increased production cost. Therefore, the Al content is 0.001% or more. In addition, Al is an element that that is effective as a deoxidation material but in order to obtain a sufficient deoxidation effect, the Al content is more preferably 0.010% or more.

[N: 0.0001% to 0.0100%]

Since N is an element that forms a coarse nitride and deteriorates formability such as ductility, hole expansibility (stretch-flange property) and bendability, the amount of N added is necessary to be suppressed. When the N content is more than 0.0100%, deterioration in formability is significant and thus the upper limit of the N content is 0.0100%. In addition, an excessive amount of N causes generation of blowholes at the time of welding and the lower the content thereof is the better it is. From this viewpoint, the N content is preferably 0.0070% or less and more preferably 0.0050% or less. On the other hand, even when the lower limit of the N content is not particularly limited, the effects of the embodiment are exhibited. However, an N content of less than 0.0001% results in a greatly increased production cost. Therefore, the lower limit of the N content is 0.0001% or more. The N content is preferably 0.0003% or more and more preferably 0.0005% or more.

[O: 0.0001% to 0.0100%]

Since O forms an oxide and deteriorates formability such as ductility, hole expansibility (stretch-flange property) and bendability of the hot-dip galvanized steel sheet, the content thereof is necessary to be suppressed. When the O content is more than 0.0100%, deterioration in formability is significant and thus the upper limit of the upper limit of the O content is 0.0100%. Further, the O content is preferably 0.0050% or less and more preferably 0.0030% or less. Even when the lower limit of the O content is not particularly limited, the effects of the embodiment are exhibited. However, an O content of less than 0.0001% results in a greatly increased production cost. Therefore, the lower limit thereof is 0.0001%. The O content is preferably 0.0003% or more and more preferably 0.0005% or more.

Further, the following elements may be optionally added to the base steel sheet of the hot-dip galvanized steel sheet according to the embodiment.

First, the base steel sheet according to the embodiment may further contain one or two or more selected from Ti: 0.001% to 0.150%, Nb: 0.001% to 0.100%, and V: 0.001% to 0.300%.

[Ti: 0.001% to 0.150%]

Ti is an element that contributes to increasing the strength of the hot-dip galvanized steel sheet by precipitate strengthening, fine grain strengthening due to suppression of ferrite grain growth, and dislocation strengthening through suppression of recrystallization. However, when the Ti content is more than 0.150%, the amount of precipitated carbonitrides is increased formability deteriorates. Thus, the Ti content is preferably 0.150% or less. In addition, from the viewpoint of formability, the Ti content is more preferably 0.080% or less. On the other hand, even when the lower limit of the Ti content is not particularly limited, the effects of the embodiment are exhibited. However, in order to sufficiently obtain the effect of high-strengthening by adding Ti, the Ti content is preferably 0.001% or more. In order to achieve higher strength of the hot-dip galvanized steel sheet, the Ti content is more preferably 0.010% or more.

[Nb: 0.001% to 0.100%]

Nb is an element that contributes to increasing the strength of the hot-dip galvanized steel sheet by precipitate strengthening, fine grain strengthening due to suppression of ferrite grain growth, and dislocation strengthening through suppression of recrystallization. However, when the Nb content is more than 0.100%, the amount of precipitated carbonitrides is increased and formability of the hot-dip galvanized steel sheet deteriorates. Thus, the Nb content is more preferably 0.100% or less. From the viewpoint of formability, the Nb content is more preferably 0.060% or less. On the other hand, even when the lower limit of Nb content is not particularly limited, the effects of the embodiment are exhibited. However, in order to obtain a sufficiently obtain the effect of high-strengthening by adding Nb, the Nb content is preferably 0.001% or more. In order to achieve higher strength of the hot-dip galvanized steel sheet, the Nb content is more preferably 0.005% or more.

[V: 0.001% to 0.300%]

V is an element that contributes to increasing the strength of the hot-dip galvanized steel sheet by precipitate strengthening, fine grain strengthening due to suppression of ferrite grain growth, and dislocation strengthening through suppression of recrystallization. However, when the V content is more than 0.300%, the amount of precipitated carbonitrides is increased and formability deteriorates. Therefore, the V content is preferably 0.300% or less and more preferably 0.200% or less. On the other hand, even when the lower limit of the V content is not particularly limited, the effects of the embodiment are exhibited. In order to sufficiently obtain the effect of high-strengthening by adding V, the V content is preferably 0.001% or more and more preferably 0.010% or more.

In addition, the base steel sheet according to the embodiment may contain one or two or more selected from Cr 0.01 to 2.00%, Ni: 0.01% to 2.00%, Cu: 0.01% to 2.00%, Mo: 0.01% to 2.00%, B: 0.0001% to 0.0100%, and W: 0.01% to 2.00%.

[Cr 0.01% to 2.00%]

Cr is an element that suppresses phase transformation at a high temperature and is effective for high-strengthening of the hot-dip galvanized steel sheet and may be added instead of part of C and/or Mn. However, when the Cr content is more than 2.00%, hot workability is impaired and productivity deteriorates. Thus, the Cr content is preferably 2.00% or less and more preferably 1.20% or less. On the other hand, even when the lower limit of the Cr content is not particularly limited, the effects of the embodiment are exhibited. However, in order to sufficiently obtain the effect of high-strengthening by adding Cr, the Cr content is preferably 0.01% or more and more preferably 0.10% or more.

[Ni: 0.01% to 2.00%]

Ni is an element that suppresses phase transformation at a high temperature and is effective for high-strengthening of the hot-dip galvanized steel sheet and may be added instead of part of C and/or Mn. However, when a Ni content is more than 2.00%, weldability is impaired. Thus, the Ni content is preferably 2.00% or less and more preferably 1.20% or less. On the other hand, even when the lower limit of the Ni content is not particularly limited, the effects of the embodiment are exhibited. However, in order to sufficiently obtain the effect of high-strengthening by adding Ni, the Ni content is preferably 0.01% or more and more preferably 0.10% or more.

[Cu: 0.01% to 2.00%]

Cu is an element that that exists as fine particles in steel to thereby enhance strength of the hot-dip galvanized steel sheet and can be added instead of part of C and/or Mn. However, when the Cu content is more than 2.00%, weldability is impaired. Thus, the Cu content is preferably 2.00% or less and more preferably 1.20% or less. On the other hand, even when the lower limit of the Cu content is not particularly limited, the effects of the embodiment are exhibited. However, in order to sufficiently obtain the effect of high-strengthening of the hot-dip galvanized steel sheet by adding Cu, the Cu content is preferably 0.01% or more and more preferably 0.10% or more.

[Mo: 0.01% to 2.00%]

Mo is an element that suppresses phase transformation at a high temperature and is effective for high-strengthening of the hot-dip galvanized steel sheet and may be added instead of part of C and/or Mn. However, when the Mo content is more than 2.00%, hot workability is impaired and productivity deteriorates. Thus, the Mo content is preferably 2.00% or less and more preferably 1.20% or less. On the other hand, even when the lower limit of the Mo content is not particularly limited, the effects of the embodiment are exhibited. However, in order to sufficiently obtain the effect of high-strengthening by adding Mo, the Mo content is preferably 0.01% or more and more preferably 0.05% or more.

[B: 0.0001% to 0.0100%]

B is an element that suppresses phase transformation at a high temperature and is effective for high-strengthening of the hot-dip galvanized steel sheet and may be added instead of part of C and/or Mn. However, when the B content is more than 0.0100%, hot workability is impaired and productivity deteriorates. Thus, the B content is preferably 0.0100% or less. From the viewpoint of productivity, the B content is more preferably 0.0050% or less. On the other hand, even when the lower limit of the B content is not particularly limited, the effects of the embodiment are exhibited. However, in order to sufficiently obtain the effect of high-strengthening by adding B, the B content is preferably 0.0001% or more. In order to achieve further high-strengthening of the hot-dip galvanized steel sheet, the B content is more preferably 0.0005% or more.

[W: 0.01% to 2.00%]

W is an element that suppresses phase transformation at a high temperature and is effective for high-strengthening of the hot-dip galvanized steel sheet and may be added instead of part of C and/or Mn. However, when the W content is more than 2.00%, hot workability is impaired and productivity deteriorates. Thus, the W content is preferably 2.00% or less and more preferably 1.20% or less. On the other hand, even when the lower limit of the W content is not particularly limited, the effects of the embodiment are exhibited. However, in order to sufficiently obtain the effect of high-strengthening by adding W, the W content is preferably 0.01% or more and more preferably 0.10% or more.

The base steel sheet in the hot-dip galvanized steel sheet according to the embodiment may further contain, as another elements, one or two or more of Ca, Ce, Mg, Zr, La, and REM in a total amount of 0.0001% to 0.0100%. The reasons for adding these elements are as follows.

Note that REM stands for Rare Earth Metal and refers to an element belonging to the lanthanoid series. In this embodiment, REM or Ce is often added in misch metal and may contain elements of the lanthanoid series other than La and Ce in a complex form. The effects of the embodiment are exhibited even when elements of the lanthanoid series other than La and Ce are contained in the slab as impurities. Further, the effects of the embodiment are exhibited even when metals La and Ce are added to the slab.

Ca, Ce, Mg, Zr, La, and REM are elements effective for improving formability of the hot-dip galvanized steel sheet, and one or two or more of these elements can be added to the slab. However, when the total content of one or two or more of Ca, Ce, Mg, Zr, La, and REM is more than 0.0100%, there is a concern of ductility being impaired. Therefore, the total content of the respective elements is preferably 0.0100% or less and more preferably 0.0070% or less. On the other hand, even when the lower limit of the content of one or two or more of Ca, Ce, Mg, Zr, La, and REM is not particularly limited, the effects of the embodiment are exhibited. However, in order to sufficiently obtaining the effect of improving the formability of the hot-dip galvanized steel sheet, the total content of one or two or more of the respective elements is preferably 0.0001% or more. From the viewpoint of formability, the total content of one or two or more of Ca, Cc, Mg, Zr, La, and REM is more preferably 0.0010% or more.

In the chemical components of the hot-dip galvanized steel sheet according to the embodiment, a remainder other than the above-described respective elements includes Fe and impurities. Incidentally, a very small amount of each of Ti, Nb, V, Cr, Ni, Cu, Mo, B, and W described above being less than the above-described lower limit value is allowed to be contained as an impurity. In addition, regarding Ca, Ce, Mg, Zr, La, and REM, a minute amount of them being less than the above-described lower limit value of the total content of them is allowed to be contained as an impurity.

The reasons for defining the structure of the base steel sheet of the hot-dip galvanized steel sheet according to the embodiment of the present invention are as follows.

(Microstructure)

The microstructure in the base steel sheet of the hot-dip galvanized steel sheet according to the embodiment of the present invention is a microstructure in which, in a range of ⅛ thickness to ⅜ thickness centered at a position of ¼ thickness from the surface of the base steel sheet, a ferrite phase (hereinafter, referred to as a ferrite) is 40% or more and 97% or less by volume fraction, a hard structure comprising one or more of a bainite phase (hereinafter, referred to as a bainite), a bainitic ferrite phase (hereinafter, referred to as a bainitic ferrite), a fresh martensite phase (hereinafter, referred to as a martensite) and a tempered martensite phase (hereinafter, referred to as a tempered martensite) in total is 3% or more by volume fraction, a residual austenite phase (hereinafter, referred to as an residual austenite) is 0 to 8% by volume fraction (including 0%), a pearlite phase (hereinafter, referred to as a pearlite) and a coarse cementite phase (hereinafter, referred to as a cementite) in total is 0 to 8% by volume fraction (including 0%).

[Ferrite]

Ferrite is a structure which has excellent ductility. However, since the ferrite has low strength due to being soft, a hot-dip galvanized steel sheet having sufficient maximum tensile strength can not be obtained when the volume fraction of the ferrite is more than 97%. Therefore, the volume fraction of the ferrite is 97% or less. In order to improve maximum tensile strength of the hot-dip galvanized steel sheet, the volume fraction of the ferrite is preferably 92% or less and more preferably 85% or less. Further, in order to obtain a hot-dip galvanized steel sheet having a maximum tensile strength of more than 950 MPa, the volume fraction of the ferrite is preferably 80% or less and more preferably 70% or less. On the other hand, sufficient ductility can not be obtained when the volume fraction of the ferrite is less than 40%. Therefore, the volume fraction of the ferrite is 40% or more. The volume fraction of the ferrite is preferably 45% or more and more preferably 50% or more.

[Residual Austenite]

The residual austenite is a structure for greatly improving a balance between strength and ductility of the hot-dip galvanized steel sheet. On the other hand, the residual austenite is transformed into hard martensite with deformation and this hard martensite acts as a fracture origin, and stretch-flange property deteriorates. Thus, an upper limit of the volume fraction of the residual austenite is 8%. From the viewpoint of formability of the hot-dip galvanized steel sheet, the volume fraction of the residual austenite is preferably low and 5% or less, and more preferably 0 to 3% (including 0%). The volume fraction of the residual austenite of the hot-dip galvanized steel sheet is preferably lower and may be 0%.

[Hard Structure]

In order to improve maximum tensile strength of the hot-dip galvanized steel sheet, it is necessary that a volume fraction of the hard structure comprising one or more of a bainite, a bainitic ferrite, a fresh martensite and a tempered martensite in total is 3% or more. In order to improve maximum tensile strength of the hot-dip galvanized steel sheet, the volume fraction of the hard structure is preferably 7% or more and more preferably 15% or more. On the other hand, since the ductility of the hot-dip galvanized steel sheet deteriorates when the volume fraction of the hard structure is excessively high, the volume fraction of the hard structure is limited to 60% or less. From this viewpoint, the volume fraction of the hard structure is preferably 55% or less and more preferably 50% or less.

[Bainitic Ferrite and/or Bainite]

Bainitic ferrite and/or bainite are a structure excellent in a balance between strength and formability of the hot-dip galvanized steel sheet. It is preferable that the bainitic ferrite and/or the bainite are included 60% or less by volume fraction, in a steel sheet structure. In addition, the bainitic ferrite and/or the bainite are microstructures which have medial strength between a soft ferrite and a hard martensite, a tempered martensite and a residual austenite, are more preferably included 5% or more and are even more preferably included 10% or more, in viewpoint of stretch-flange property. On the other hand, yield stress excessively increases when the volume fraction of the bainitic ferrite and/or the bainite are more than 60%. Therefore, it is not preferable because the shape freezing property is concerned to deteriorate.

[Tempered Martensite]

Tempered martensite is a structure which increases tensile strength of the hot-dip galvanized steel sheet greatly and may be included 60% or less by volume fraction, in the steel sheet structure. From viewpoint of tensile strength, it is preferable that the volume fraction of the tempered martensite is 5% or more. On the other hand, yield stress excessively increases when the volume fraction of the bainitic ferrite and/or the bainite are more than 60%. Therefore, it is not preferable because the shape freezing property is concerned to deteriorate.

[Fresh Martensite]

Fresh martensite increases tensile strength of the hot-dip galvanized steel sheet greatly. On the other hand, the fresh martensite works as a fracture origin, and deteriorates stretch-flange property. Therefore, it is preferable that the fresh martensite is included in the steel sheet structure, by a volume fraction of 30% or less. In order to increase hole expansibility, the volume fraction of the fresh martensite is more preferably 20% or less and even more preferably 10% or less.

[Other Microstructures]

Microstructures other than the above described microstructures, such as pearlite and/or coarse cementite, may be included in the steel sheet structure of the hot-dip galvanized steel sheet according to the embodiment of the present invention. However, ductility deteriorates when the content of the pearlite and/or the coarse cementite in the steel sheet structure of the hot-dip galvanized steel sheet increases. From this viewpoint, a volume fraction of the pearlite and/or the coarse cementite in the steel sheet structure is 8% or less in total. A total of the content of the pearlite and/or the coarse cementite is preferably 5% or less.

Further, in the steel sheet structure of the hot-dip galvanized steel sheet according to the embodiment of the present invention, the volume fraction of the residual austenite is limited to 3% or less in a surface layer range originating from an interface between a plated layer and a base steel sheet (base steel) and having 20 m depth in a steel sheet direction. And further, a volume fraction "V1" of the hard structure in the surface layer range is in a range of 0.10 to 0.90 times of a volume fraction "V2" of the hard structure in a range of ⅛ thickness to ⅜ thickness centered at a position of ¼ thickness from the surface of the base steel sheet.

[Residual Austenite in Vicinity of Interface of Plated Layer and Base Steel]

Residual austenite in the vicinity of the interface of the plated layer of the hot-dip galvanized steel sheet and the base steel sheet is transformed into hard martensite with deformation and acts as a fracture origin at the time of bending deformation in which a large strain is added in the vicinity of a surface of the hot-dip galvanized steel sheet. Therefore, the residual austenite in the vicinity of the interface of the plated layer of the hot-dip galvanized steel sheet and the base steel sheet is a structure which influences deterioration of bendability and fatigue resistance. Form this viewpoint, it is necessary that the volume fraction of the residual austenite is limited to 0 to 3% (including 0%) in a surface layer range originating from an interface between a plated layer and a base steel sheet (base steel) and having 20 μm depth in a steel sheet direction. The volume fraction of the residual austenite in the above surface layer range is preferably lower and may be 0%.

[Hard Structure in Vicinity of Interface of Plated Layer and Base Steel]

Hard structure in the vicinity of the interface of the plated layer of the hot-dip galvanized steel sheet and the base steel sheet (base steel) is a structure which enhances strength of the hot-dip galvanized steel sheet at the surface thereof, improves fatigue limit strength greatly, and influences improvement of fatigue resistance. From this viewpoint, when a volume fraction of the hard structure in a surface layer range originating from an interface between a plated layer and a base steel and having 20 μm depth in a steel sheet direction is set as "V1" and a total volume fraction in a range of ⅛ thickness to ⅜ thickness centered at a position of ¼ thickness from the surface of the base steel sheet is set as "V2", V1/V2 which is a ratio of these is set to be 0.10 or more, and it is necessary to sufficiently enhance the strength of the hot-dip galvanized steel sheet at the surface thereof. In order to sufficiently improve fatigue resistance, V1/V2 is preferably 0.20 or more, more preferably 0.30 or more and even more preferably 0.40 or more. On the other hand, bendability can be improved, by controlling a fraction of the hard structure in a surface layer range originating from an interface between a plated layer and a base steel and having 20 μm depth in a steel sheet direction to a certain degree and decreasing strength in the vicinity of the surface of the hot-dip galvanized steel sheet and improving ductility partially. From this viewpoint, in order to obtain good bendability, V1/V2 is 0.90 or less, preferably 0.85 or less and more preferably 0.80 or less.

Further, in the surface layer range originating from an interface between a plated layer of the hot-dip galvanized steel sheet according to the embodiment and a base steel and having 20 μm depth in a steel sheet direction, BCC grain boundaries of Fe and/or fine oxides including Si and/or Mn in grains may be contained. Formation of oxides including Si and/or Mn can be suppressed at the surface of the steel sheet which acts as the origin of peeling of the plated layer, the interface between the plated layer and a base steel sheet in other words, by antecedently forming fine oxides inside of the steel sheet at the surface layer range thereof.

The volume fraction of each structure contained in the base steel sheet of the hot-dip galvanized steel sheet according to the embodiment of the present invention can be measured by the method, for example described below.

The volume fraction of each of ferrite, bainitic ferrite, bainite, tempered martensite, fresh martensite, pearlite, and coarse cementite included in the steel sheet structure of the hot-dip galvanized steel sheet according to the present invention is determined as described below. The thickness cross section parallel to the rolling direction of the steel sheet is set as an observed section and a sample is collected, and the observed section of the sample is polished and etched with nital. The range of ⅛ thickness to ⅜ thickness centered at the position of ¼ of the thickness from the surface of the base steel sheet or the range of originating from an interface between a plated layer and a base steel sheet (base steel) and having 20 μm depth in a steel sheet direction are respectively observed with a field emission scanning electron microscope (FE-SEM) to measure the area fractions of the structures and these area fractions can be considered as the volume fractions of the respective structures. However, when the plated layer is removed by the nital etching, a surface of the sample can be considered as the interface between the plated layer and the base steel.

The volume fraction of residual austenite included in the steel sheet structure of the hot-dip galvanized steel sheet according to the embodiment is evaluated, by performing high resolution crystal orientation analysis according to EBSD (Electron Bach-scattering Diffraction) method using a FE-SEM.

First, a thickness cross section parallel to the rolling direction is subjected to mirror polishing, in the range of ⅛ thickness to ⅜ thickness centered at the position of ¼ of the thickness from the surface of the base steel sheet or in the range of originating from the interface between the plated layer and the base steel and having 20 μm depth in a steel sheet direction respectively, an observation step is set to be 0.15 μm or less, and crystal orientations are observed in a range of 10000 μm² or more in total. Each observation point is determined whether it is steel of BCC (Body-centered Cubic) or steel of FCC (Face-centered Cubic), a point determined as FCC steel is set as a residual austenite and an area fraction of the residual austenite is measured. This area fraction can be considered as the volume fraction. The area fraction and the volume fraction are equivalent when a sufficient broad range is observed, in the above case, the area fraction of the residual austenite can be considered as the volume fraction thereof by observing crystal orientations in the range of 10000 μm² or more in total.

The hot-dip galvanized steel sheet according to the embodiment has a refined layer in the base steel sheet at a side of interface contact to the plated layer. A part of the refined layer which is close to the plated layer directly contacts with the plated layer. The refined later is a region exists at an outermost layer of the base steel sheet and the refined later is a region in which the average grain size of ferrite phase constituting the refined layer is ½ or less of the average grain size of the ferrite phase in the lower layer of the refined layer in the base steel sheer. The boundary at which the average grain size of the ferrite in the refined layer is greater than ½ of the average grain size of the ferrite in the lower layer thereof is defined as a boundary between the refined later and the lower layer thereof.

The refined layer is in direct contact with the interface between the base steel sheet and the hot-dip galvanized layer. The average thickness of the refined layer is 0.1 to 5.0 μm. The average grain size of the ferrite in the refined layer is 0.1 to 3.0 μm. The refined layer contains one or two or more of oxides of Si and Mn and the maximum size of the oxide is 0.01 to 0.4 μm.

When the average thickness of the refined layer is 0.1 μm or more, crack generation or extension is suppressed at the time of working the hot-dip galvanized steel sheet. Therefore, the average thickness of the refined layer is 0.1 μm or more and is preferably 1 μm. In addition, when the average thickness of the refined layer is 5.0 μm or less, formation can be processed while suppressing excessive alloying in a plating bath. Accordingly, it is possible to prevent deterioration in plating adhesion caused by an excessive Fe content in the plated layer. For this reason, the average thickness of the refined layer is 5.0 μm or less and preferably 3.0 μm or less.

When the average grain size of the ferrite in the refined layer is 0.1 μm or more, cracking generation or extension is suppressed at the time of working the hot-dip galvanized steel sheet. Therefore, the average grain size of the ferrite in the refined layer is 0.1 μm or more and is more preferably 1 μm or more. In addition, when the average grain size of the ferrite in the refined layer is greater than 3.0 μm, the effect of suppressing crack generation or extension is limitative. Therefore, the average grain size of the ferrite in the refined layer is 3.0 μm or less and preferably 2.0 μm or less.

Examples of one or two or more of oxides of Si and Mn contained in the refined layer include one or two or more selected from $SiO_2$, $Mn_2SiO_4$, $MnSiO_3$, $Fe_2SiO_4$, $FeSiO_3$, and MnO.

When the maximum size of one or two or more of oxides of Si and Mn contained in the refined layer is 0.01 μm or more, the plated layer in which the formation of a ζ phase sufficiently proceeds with the formation of a refined layer can be formed. The maximum size of the oxide is preferably 0.05 μm or more. In addition, the refined layer in which the maximum size of the oxide is 0.4 μm or less can be formed while suppressing excessive alloying of the plated layer. Further, when the maximum size of the above oxides is 0.4 μm or less, formation can be processed while suppressing excessive alloying of the plated layer. Accordingly, it is possible to prevent deterioration in plating adhesion caused by an excessive Fe content in the plated layer with a formation of the plated layer. The maximum size of the oxide is preferably 0.2 μm or less.

The average thickness of the refined layer and the average grain size of the ferrite in the refined layer are measured according to the method described below. A thickness cross section parallel to the rolling direction of the base steel sheet is set as an observed section and a sample is collected from the hot-dip galvanized steel sheet. The observed section of the sample is processed by using CP (Cross section polisher) and a backscattered electron image is observed at a magnification of 5,000 with FE-SEM (Field Emission Scanning Electron Microscopy) for measurement.

The maximum size of one or two or more of oxides of Si and Mn contained in the refined layer is measured according to the method described below. A thickness cross section parallel to the rolling direction of the base steel sheet is set as an observed section and samples are collected from the hot-dip galvanized steel sheet.

The observed section of each sample is processed with FIB (Focused Ion Beam) to prepare thin film samples. Thereafter, each thin film sample is observed with FE-TEM (Field Emission Transmission Electron Microscopy) at a magnification of 30,000. Each thin film sample is observed in five visual fields and the maximum size of the diameter of the oxide measured in the whole visual field is set as the maximum size of the oxide in the thin film sample.

[Plated Layer]

The hot-dip galvanized steel sheet according to the embodiment of the present invention is a hot-dip galvanized steel sheet which a hot-dip galvanized layer is formed on a surface of a base steel sheet.

In the embodiment of the present invention, a Fe content is more than 0% to 5.0% or less and an Al content is more than 0% to 1.0% or less in the hot-dip galvanized layer. Furthermore, the hot-dip galvanized layer may contain one or two or more of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM or one or two or more of these elements are mixed in the hot-dip galvanized layer. Even when the hot-dip galvanized layer contains one or two or more of these elements or one or two or more of these elements are mixed in the hot-dip galvanized layer as described above, the effects of the embodiment are not deteriorated and there is sometimes a preferable case in which the corrosion resistance and the workability are improved depending on the content of the element.

Further, the hot-dip galvanized layer includes columnar grains formed of a ζ phase and 20% or more of it is covered with a ζ phase in the entire interface between the plated layer and the base steel. Thus, the ratio ((A*/A)×100) of the interface (A*) between the above ζ phase and the base steel sheet is 20% or more in the entire interface (A) between the hot-dip galvanized plated layer and the base steel sheet. Further, a plated amount on one surface of the base steel sheet in the hot-dip galvanized layer is 10 g/m² or more and 100 g/m² or less.

[Fe Content in Hot-Dip Galvanized Layer More than 0% to 5.0% or Less]

Since the plating adhesion is deteriorated when the Fe content in the hot-dip galvanized layer becomes higher, it is necessary that the Fe content is more than 0% to 5.0% or less. In order to further enhance the plating adhesion, the Fe content in the plated layer is preferably 4.0% or less and more preferably 3% or less. The lower limit of the Fe content in the plated layer is not limited. However, when the Fe content is less than 0.5%, since the amount of ζ phase required to enhance adhesion is not sufficiently obtained in some cases, the Fe content in the plated layer is preferably 0.5% or more and more preferably 1.0% or more.

[Al Content in Hot-Dip Galvanized Layer: More than 0% to 1.0% or Less]

Since the plating adhesion is deteriorated when the Al content in the hot-dip galvanized layer becomes higher, it is necessary that the Al content is more than 0% to 1.0% or less. In order to further enhance the plating adhesion, the Al content in the plated layer is preferably 0.8% or less and more preferably 0.5% or less. The lower limit of the Al content in the plated layer is not limited. However, in order to set the Al content to less than 0.01%, it is required that the concentration of Al in a plating bath is lowered extremely. When the concentration of Al in a plating bath is lowered extremely, the alloying of the plated layer excessively proceeds and thus the Fe content in the plated layer is increased. And therefore, the plating adhesion deteriorates. For this reason, the Al content in the plated layer is preferably 0.01% or more. From this viewpoint, the Al content in the plated layer is more preferably 0.05% or more.

Furthermore, the hot-dip galvanized layer may contain one or two or more of Ag. B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V. W, Zr, and REM or one or two or more of these elements are mixed in the hot-dip galvanized layer. Even when the hot-dip galvanized layer contains one or two or more of these elements or one or two or more of these elements are mixed in the hot-dip galvanized layer as described above, the effects of the embodiment are not deteriorated and there is sometimes a preferable case in which the corrosion resistance and the workability are improved depending on the content of the element.

[ζ Phase]

FIG. 1 indicates an enlarged structure micrograph of a cross section of the hot-dip galvanized steel sheet according to the embodiment. As shown in FIG. 1, the hot-dip galvanized layer of the embodiment is a plated layer plated on the surface of the base steel sheet (base steel), and includes columnar grains formed of a ζ phase ($FeZn_{13}$) of an alloy of Fe and Zn. Particularly, in the hot-dip galvanized layer of the embodiment, the ratio ((A*/A)×100) of the interface (A*) of the ζ phase in contact with the base steel sheet is 20% or more in the entire interface (A) between the hot-dip galvanized plated layer and the base steel sheet.

Accordingly, coarse oxides including Si and/or Mn, which act as the origin of peeling, and having a major axis of 0.2 μm or more are incorporated into the (phase from the surface of the base steel sheet. This makes the coarse oxides hardly work as a fracture origin and thus the adhesion of the plated layer is improved. From this viewpoint, the ratio of the interface between the ζ phase and the base steel with respect to the entire interface between the plated layer and the base steel sheet is preferably 25% or more and more preferably 30% or more. The upper limit of the ratio of the interface between the ζ phase and the base steel sheet with respect to the entire interface between the plated layer and the base steel is not particularly limited and may be 100%.

On the other hand, when the coarse oxides including Si and/or Mn and having the major axis of 0.2 μm or more are not incorporated into the ζ phase and the coarse oxides are present at the interface between the ζ phase and the base steel sheet, the effect of improving plating adhesion by the ζ phase cannot be sufficiently obtained and is not preferable. For this reason, the ratio of the interface between ζ grains (coarse oxide-containing ζ grains) in which coarse oxides are present among the ζ grains and the base steel sheet is preferably 50% or less, and more preferably 35% or less, with respect to the entire interface between the ζ phase and the base steel sheet. It is more preferable that the amount of the coarse oxides at the interface of the base steel sheet of the ζ phase is smaller. In the entire interface between the ζ phase and the base steel sheet, the ratio of the interface formed between the coarse oxide-containing ζ grain and the base steel sheet in the interface between the ζ phase and the base steel sheet is most preferably 0%.

When the major axis of the oxides including Si and/or Mn is 0.2 μm or more, cracking started from the oxides becomes remarkable and when the major axis of the oxides is less than 0.2 μm, the oxides hardly work as an origin of cracking. This is because a degree of stress concentration varies depending on the size of the oxide at the time of deformation of the hot-dip galvanized steel sheet. Specifically, as the size of the oxides increases (the major axis becomes longer), stress is more easily concentrated at the time of deformation and the plated layer is more easily peeled off.

In addition, the hot-dip galvanized layer may include a δ1 phase ($FeZn_7$). However, in order to increase the fraction of the δ1 phase, the base steel sheet is required to be heated to alloy the plated layer after the base steel sheet is immersed in the plating bath, and the tensile properties of the base steel sheet are deteriorated due to heating. From this view point, it is preferable that the fraction of the δ1 phase is small. Particularly, the ratio of the interface of the δ1 phase in contact with the base steel sheet is preferably 20% or less in the entire interface between the plated layer and the base steel sheet.

The ratio of the interface between the ζ phase and the base steel sheet with respect to the entire interface between the plated layer and the base steel sheet in the embodiment can be obtained as follows.

That is, a thickness cross section parallel to the rolling direction of the base steel sheet is set as an observed section and a sample is collected. The observed section is subjected to mirror polishing and observation is performed until the total length L of the observed interfaces between the plated layer and the base steel sheet reaches 200 μm or more by using a field emission scanning electron microscope (FE-SEM). In the same visual field as the visual field in which L is observed, grains having a columnar shape are considered to be the ζ phase or the δ1 phase and the total length L1 of the interfaces between the ζ phase and the δ1 phase and the base steel sheet is measured. Subsequently, in the same visual field as the visual field in which L1 is observed, high resolution crystal orientation analysis is performed according to EBSD (Electron Bach-scattering Diffraction) method using a FE-SEM to identify the δ1 phase. Thus, the total length L2 of the interfaces between the δ1 phase and the base steel sheet is obtained. (L1−L2)/L is considered as the ratio of the interface between the ζ phase and the base steel sheet in the entire interface between the plated layer and the base steel sheet.

In the same manner, L2/L is considered as the ratio of the interface between the δ1 phase and the base steel sheet in the entire interface between the plated layer and the base steel sheet.

The ζ phase and the δ1 phase may be identified according to methods other than the above EBSD method. For example, the ζ phase and the δ1 phase may be determined based on a difference in amount of Zn by mapping the Zn element in the plated layer using a field emission electron probe micro analyzer (FE-EPMA).

In order to make the ζ phase appear to be clear, the observed section may be corroded using a corrosive liquid such as nital after the sample is subjected to mirror polishing.

The presence of the coarse oxides having the major axis of 0.2 μm or more is, by the above method of performing the cross section SEM observation, determined by observing major axes of photographed oxides.

The oxide-containing ζ grains are determined by a difference of tones, in observing a SEM backscattered electron (BSE) image of an interface alloy layer. Since a number of backscattered electron images increases with an atomic number of an atom, oxides appear to be darker than the surroundings. A position which an oxide is formed is depending on an annealing dew point, it is formed inside of a surface layer of a steel sheet not on a surface of the steel sheet when the dew point is higher (about 0° C. or more). After a plated layer is formed, alloying proceed between the plated layer and a base steel sheet, when Fe in the surface layer of the base steel sheet diffuse into the plated layer, oxides are absorbed to the plated layer from the surface layer to inside sequentially. In addition, the major axes of each of the determined oxides in the observed section are measured, and oxides having the major axis of 2 μm or more is determined as coarse oxides.

[Plated Amount of Hot-Dip Galvanizing: 10 to 100 $g/m^2$]

Since sufficient corrosion resistance is not obtained when a plated amount on one surface of the base steel sheet in the hot-dip galvanized layer is small, it is preferable that the plated amount of the hot-dip galvanized layer on one surface of the base steel sheet is 10 $g/m^2$ or more. From the viewpoint of corrosion resistance, the plated amount is more preferably 20 $g/m^2$ or more and even more preferably 30 $g/m^2$ or more. On the other hand, when the plated amount of the plated layer is large, the wear of electrodes is significant at the time of performing spot welding, and reduction in a weld nugget diameter or deterioration in welded joint strength at the time of continuously performing spot welding occur. Therefore, the plated amount of the plated layer is 100 $g/m^2$ or less. From the viewpoint of continuous weldability, the plated amount is more preferably 93 $g/m^2$ or less and even more preferably 85 $g/m^2$ or less.

(Method of Producing Hot-Dip Galvanized Steel Sheet)

Next, the method of producing the hot-dip galvanized steel sheet according to the embodiment will be described in detail.

The method of producing the hot-dip galvanized plated steel sheet according to the embodiment includes a hot rolling step which is a step of performing a hot rolling with heating the slab including the above chemical compositions 1,080° C. or higher and setting a rolling completion temperature to be in a range of 850 to 980° C. to make a hot rolled steel sheet and coiling as a coil, and which is a step of controlling a temperature of the hot rolled steel sheet step to satisfy the Expression (1), which will be described later, in a cooling step after the hot rolling step until 300° C., after a pickling after the hot rolling step, a cold rolling step of performing a cold rolling with a total rolling reduction of 85% or less, an annealing step including heating at an average heating rate of 1.0° C./second or more in a range of 600° C. to 750° C. and with a maximum heating temperature in a range of (Ac1+25°)° C. or more and Ac3° C. or less, and 750° C. or more, and cooling at an average cooling rate of 0.1 to 5.0° C./second in a range of 760° C. to 700° C. and an average cooling rate of 1.0° C./second or more in a range of 650° C. to 500° C., after the annealing step, a plating step which is a step of hot-dip galvanizing the steel sheet surface by immersing the steel sheet in a plating bath under the plating conditions of a steel sheet temperature of 440° C. to 480° C. and an amount of effective Al of 0.050% to 0.180% by mass in the plating bath when the steel sheet enters the plating bath having a plating bath temperature of 450° C. to 470° C., to form a plated layer, and after the plating step, a cooling step of cooling the steel sheet to 350° C. satisfying the Expression (2) which will be described later and a processing step of performing a bending-bending back deformation twice or more in total using a roll with a diameter of 50 mm to 800 mm after the steel sheet is further cooled to 100° C. or less.

Hereinafter, each production step will be described in detail.

In order to produce the hot-dip galvanized steel sheet according to the embodiment of the present invention, first, a base steel sheet is produced.

In order to produce the base steel sheet, a slab including the above chemical components (composition) is casted.

For the slab to be supplied to hot rolling, a continuous casting slab or a slab produced by a thin slab caster or the like can be used.

[Hot Rolling Step]

In the hot rolling step, in order to suppress anisotropy of crystal orientation caused by casting, the heating temperature of the slab is preferably 1,080° C. or higher. The heating temperature of the slab is more preferably 1,150° C. or higher. On the other hand, the upper limit of the heating temperature of the slab is not particularly limited. In order to heat the slab at higher than 1,300° C., a large amount of energy needs to be applied, which causes a significant increase in the production cost. Thus, the heating temperature of the slab is preferably 1,300° C. or lower.

After heating the slab, hot rolling is performed. When the temperature when the hot rolling is completed (rolling completion temperature) is lower than 850° C., the rolling reaction force is high and thus it is difficult to stably obtain a predetermined thickness. Therefore, the temperature when the hot rolling is completed is preferably 850° C. or higher and more preferably 870° C. or higher. On the other hand, in order to set the temperature when the hot rolling is completed to be higher than 980° C., in the step from the completion of heating of the slab to the completion of hot rolling, a device for heating the steel sheet is necessary and a high cost is required. Therefore, the temperature when the hot rolling is completed is 980° C. or lower and more preferably 950° C. or lower.

Next, the hot-rolled steel sheet which has been subjected to hot rolling is coiled as a coil. The average cooling rate in the cooling process from the hot rolling to the coiling is preferably 10° C./second or more. This is because when transformation proceeds at a lower temperature, the grain size of the hot-rolled steel sheet is made fine and the effective grain size of the base steel sheet after cold rolling and annealing is made fine.

The coiling temperature of the hot-rolled steel sheet is preferably 450° C. or higher and 650° C. or lower. This is because in the microstructure of the hot-rolled steel sheet, pearlite and/or coarse cementite having a major axis of 1 μm or more is formed in a dispersed manner, strain introduced by cold rolling is localized. And reverse transformation to austenite having various crystal orientations occurs in the annealing step. Thus, the effective crystal orientation of the base steel sheet after annealing can be refined. When the coiling temperature is lower than 450° C., pearlite and/or coarse cementite may not be formed and thus this case is not preferable. On the other hand, when the coiling temperature is higher than 650° C., pearlite and ferrite are formed in a belt shape long in the rolling direction, and effective grains of the base steel sheet generated from the ferrite part after cold rolling and annealing tend to extend in the rolling direction and be coarse, which is not preferable.

Here, in the surface of the base steel sheet after an annealing, in order to control a hard structure to be in a predetermined volume fraction, in the hot rolling step, it is necessary to decarburize appropriately from the surface of the base steel sheet. Decarburization behavior may be controlled by an atmosphere control, however, it requires a large scale facility and a large burden of cost. For this reason, in the embodiment, decarburization behavior is controlled by controlling a cooling rate and a temperature of the steel sheet, in a section from a completion of a finishing rolling (rolling completion) to 300° C.

Temperature control of the base steel sheet is performed in arrange in which the temperatures is Ae 3* or less which is a temperature at which BCC phase of Fe at the surface of the case steel sheet is stable, in a section from the completion of a finishing rolling to 300° C. This is because, decarburization from BCC phase of Fe proceeds faster comparing to FCC phase which is a stable phase in a high temperature. In the embodiment, when the temperature of the base steel sheet is in a temperature range lower than 300° C., diffusion speeds of oxides are sufficiently slow, it can be considered that a decarburization proceeding speed does not influence the decarburization behavior, a temperature range of the temperature control of the base steel sheet in the hot rolling step is a section from the completion of a finishing rolling to 300° C.

Ae 3* can be obtained by the following formula.

Ae 3* [° C.]=885+31.7Si−29.3Mn+123.2Al−18.2Cr−40.0Ni−21.0Cu+12.6Mo

In the above formula, C, Si, Mn, Al, Cr, Ni, Cu, and Mo respectively represent an addition amount [% by mass] thereof.

Further, the decarburization behavior of the steel sheet is controlled in a first period from the completion of the finishing rolling to the coiling on a coil and a second period after the coiling to reaching to the room temperature respectively. This is because, a decarburization proceeds in the atmosphere in the first period, a decarburization in the second period proceeds in a condition that the coiled steel sheets contact and outer air does not intrude, decarburization speeds greatly vary in these terms.

Specifically, in order to decarburize the surface layer of the steel sheet appropriately, the temperature of the steel sheet is controlled to be in a range satisfying the following Expression (1) in the cooling step from the completion of the finishing rolling to 300° C. The Expression (1) is an expression related to a degree of progress of the decarburization behavior, the larger value of the Expression (1) indicates the decarburization proceeds.

In the Expression (1), t [second] represents the time elapsed from the completion of the finishing rolling, t1 [second] represents the time elapsed from the completion of the finishing rolling to the Ae 3* temperature, t2 [second] represents the time elapsed from the completion of the finishing rolling to the coiling, t3 [second] represents the time elapsed from the completion of the finishing rolling until the steel sheet temperature reaches 300° C. T (t) [° C.] represents a steel sheet temperature, $W_{Si}$ [% by mass] and $W_{Mn}$ [% by mass] respectively represent average amounts of each atom of Si and Mn in the entire steel sheet. Further, α, β, γ, δ are constant terms, and are 8.35×10, 2.20×10$^4$, 1.73×10$^{10}$, 2.64×10$^4$ respectively.

$$0.8 \leq \left[ \begin{array}{c} \int_{t1}^{t2} \alpha \cdot \exp\left(-\frac{\beta}{T(t)+273}\right) \cdot tdt + \\ \int_{t2}^{t3} \gamma \cdot W_{Si}^{2.5} \cdot W_{Mn}^{0.5} \cdot \exp\left(-\frac{\delta}{T(t)+273}\right) \cdot tdt \end{array} \right]^{0.5} \leq 20.0 \quad \text{Expression (1)}$$

In the above Expression (1), the first integral term in the brackets is a term related to the degree of progress of decarburization during cooling in the first period, and the second integral term in the brackets is a term related to the degree of progress of decarburization during cooling in the second period. In any of the term, decarburization proceeds as the temperature of the base steel sheet is high and a retaining time is long. Particularly in the second period, since oxygen which is an element for promoting decarburization hardly exists in the atmosphere and decarburization proceeds by oxygen which is attracted by Si and Mn in a steel from a surface layer of a scale layer, the second integral term includes the influence of the amounts of Si and Mn, and the value of the Expression (1) increases as the amounts of Si and Mn in the steel increases, indicating that decarburization proceeds.

In the cooling step after the completion of finish rolling, when the value of the above Expression (1) is less than 0.8, the surface layer of the base steel sheet is hardly decarburized, and V1/V2 which is the ratio of the volume fraction V1 of the hard structure in the surface part and the volume fraction V2 of the hard structure centered at the position of ¼ thickness from the surface of the base steel sheet is more than 0.90 and the flexibility deteriorates, therefore cooling is performed so that the value of the above Expression (1) is 0.8 or more. From this viewpoint, it is preferable to perform cooling so that the value of the above Expression (1) is 1.0 or more, more preferably 1.3 or more. On the other hand, when the value of the above Expression (1) is more than 20.0, the surface layer part of the steel sheet is excessively decarburized, V1/V2 becomes less than 0.30, and the fatigue resistance of the steel sheet significantly deteriorates, therefore cooling is performed so that the value of the above Expression (1) is 20.0 or less. From this viewpoint, it is preferable to perform cooling so that the value of the above Expression (1) is 15.0 or less, more preferably 10.0 or less.

Next, pickling of the hot-rolled steel sheet produced in the above-described manner is performed. The pickling is performed for removing oxides on the surface of the hot-rolled steel sheet. Thus, the pickling is important to improve plating adhesion of the base steel sheet. The pickling may be performed at once or a plurality of times separately.

[Cold Rolling Step]

Next, the hot-rolled steel sheet after pickling is subjected to cold rolling to obtain a cold-rolled steel sheet.

In the cold rolling, when the total rolling reduction is more than 85%, the ductility of the base steel sheet is impaired and a risk of breaking of the base steel sheet during the cold rolling becomes higher. Therefore, the total rolling reduction is 85% or less. From this viewpoint, the total rolling reduction is preferably 75% or less and more preferably 70% or less. The lower limit of the total rolling reduction in the cold rolling step is not particularly limited. When the total rolling reduction is less than 0.05%, the shape of the base steel sheet is not uniform and plating adheres unevenly, so that an external appearance of the steel sheet is impaired. Therefore, the total rolling reduction is preferably 0.05% or more and more preferably 0.10% or more. The cold rolling is preferably performed in a plurality of passes, but any number of passes of the cold rolling and any rolling reduction distribution to each pass are applicable.

When the total rolling reduction in the cold rolling is within a range of more than 10% and less than 20%, recrystallization does not progress sufficiently in the following annealing step. Therefore, coarse grains in which malleability is lost by including a large amount of dislocations remain near the surface, and bendability and fatigue resistance properties of the hot-dip galvanized steel sheet may be deteriorated in some cases. In order to avoid this, it is effective to make malleability remain by reducing the total rolling reduction and reducing accumulation of dislocations to the grains. Alternatively, it is also effective to turn the processed structure into recrystallized grains having a small amount of accumulation of dislocations inside by reducing the total rolling reduction and making recrystallization sufficiently proceed in the annealing step. From the viewpoint of reducing the accumulation of dislocations to the grains, the total rolling reduction in the cold rolling is preferably 10% or less and more preferably 5.0% or less. On the other hand, in order to make recrystallization sufficiently proceed in the annealing step, the total rolling reduction is preferably 20% or more and more preferably 30% or more.

[Annealing Step]

In the embodiment of the present invention, the cold-rolled steel sheet is subjected to annealing. In the embodiment of the present invention, a continuous annealing and plating line having a preheating zone, a reduction zone, and a plating zone is used. While performing the annealing process, the steel sheet is allowed to pass though the preheating zone and the reduction zone and before the steel sheet reaches the plating zone, the annealing step is completed. Then, the plating step is preferably performed in the plating zone.

As described above, in the case of using a continuous annealing and plating line in the annealing step and the plating step, for example, the method described below is preferably used.

First, the steel sheet is allowed to pass through the preheating zone in which the air ratio in the mixed gas of air and fuel gas used for a preheating burner is 0.7 to 1.2, while heating the steel sheet to a steel sheet temperature of 400° C. to 800° C.

By the above step, oxides are formed at the steel sheet surface part. Here, it is a ratio between the volume of air included in the mixed gas per unit volume and the volume of air which is theoretically required to cause complete combustion of fuel gas contained in the mixed gas per unit volume. Next, by heating the steel sheet to 750° C. or more in the preheating zone in which a ratio between $H_2O$ and $H_2$ is $P(H_2O)/P(H_2)$:0.0001 to 2.0, it can be a step of performing cooling after a reduction of oxides formed in the preheating zone. And then, a plating step after the annealing step can be a step of performing a hot-dip galvanizing a steel sheet in a condition of immersing the steel sheet in a plating bath under conditions of a plating bath temperature of 450° C. to 470° C., a steel sheet temperature of 440° C. to 480° C. when the steel sheet enters the plating bath, and an amount of effective Al of 0.05% to 0.18% by mass in the plating bath.

The heating rate in the annealing step is related to the progress of decarburization in the steel sheet surface part through the treatment time in the preheating zone. When the heating rate is low, the steel sheet is exposed to an oxidation atmosphere for a long period of time and thus decarburization proceeds. Particularly, the heating rate at 600° C. to 750° C. is important, in order to secure the treatment time in the preheating zone to promote ζ phase formation, the average heating rate is preferably 10° C./second or less. On the other hand, when the heating rate at 600° C. to 750° C. is too slow, oxidation excessively proceeds and coarse oxides are formed inside the steel sheet in some cases. To avoid formation of coarse oxides inside the steel sheet, the average heating rate is 1.0° C./second or more at the temperature range.

In the preheating zone, the steel sheet surface part is subjected to an oxidation treatment for forming a Fe oxide coating film having an appropriate thickness. At this time, the steel sheet is allowed to pass through the preheating zone in which the air ratio in the mixed gas of air and fuel gas used for a preheating burner, which will be described below, is 0.7 or more, while heating the steel sheet to a steel sheet temperature of 400° C. to 800° C.

The term "air ratio" is a ratio between "the volume of air included in the mixed gas per unit volume" and "the volume of air which is theoretically required to cause complete combustion of fuel gas contained in the mixed gas per unit volume", and is represented by the following expression.

"Air ratio"=[volume of air included in the mixed gas per unit volume (m$^3$)]/[volume of air which is theoretically required to cause complete combustion of fuel gas contained in the mixed gas per unit volume (m$^3$))]}

In the embodiment, the base steel sheet which is allowed to pass through the preheating zone is heated under the above conditions to form a Fe oxide coating film (oxide) having a thickness of 0.01 to 5.0 μm on the surface layer of the base steel sheet. The Fe oxide coating film (oxide) formed on the steel sheet surface is reduced in the reduction zone and becomes a surface excellent in plating adhesion.

In the case in which the air ratio is more than 1.2 and too large in the steel sheet surface part, excessive Fe oxide coating film is formed on the steel sheet surface part and after reduction, the decarburized layer becomes excessively thick. The oxide coating film is reduced in the reduction zone and becomes a surface excellent in plating adhesion. However, in the case in which air ratio is less than 0.7 and is too small, a predetermined oxide cannot be obtained.

When the steel sheet temperature for allowing the steel sheet to pass through the preheating zone is lower than 400° C., a sufficient oxide film cannot be formed. On the other hand, when the steel sheet temperature for allowing the steel sheet to pass through the preheating zone is a high temperature of higher than 800° C., the oxide coating film excessively grows up and it will be difficult to set a thickness of the decarburized layer within a predetermined range Accordingly, the steel sheet temperature for allowing the steel sheet to pass through the preheating zone is 800° C. or lower and more preferably 750° C. or lower.

The maximum heating temperature in the annealing step is an important factor for controlling the fraction of the microstructure related to the formability of the steel sheet to be within a predetermined range. When the maximum heating temperature is low, a large amount of coarse iron-based carbides is left unmelted in the steel and thus formability is deteriorated. When the maximum heating temperature is lower than 750° C., the coarse iron-based carbides in a hot rolled steel sheet are not sufficiently melted and remain in a product sheet and there is a concern of ductility being impaired. In order to sufficiently solid-dissolve the iron-based carbides to enhance formability, the maximum heating temperature is (Ac1 point+25°)° C. or higher and 750° C. or higher, and the maximum heating temperature is preferably (Ac1 point+50°)° C. or higher. On the other hand, a ferrite fraction in steel significantly decreases when the maximum heating temperature is more than Ac3 point, the maximum heating temperature is Ac3 point or less. Further, from the viewpoint of plating adhesion, it is preferable that the maximum heating temperature is lower for reducing oxides on the surface of the base steel. From this viewpoint, the maximum heating temperature is preferably 850° C. or lower and more preferably 830° C. or lower.

The Ac1 point and Ac3 point of the steel sheet are a starting point and a completion point of austenite reverse transformation. Specifically, the Ac1 point and Ac3 point are obtained by cutting off a small piece from the steel sheet after hot rolling, heating the piece to 1,200° C. at 10° C./second, and measuring the amount of volume expansion during heating.

The temperature preferably reaches the maximum heating temperature in the annealing step (750° C. or higher) in the reduction zone. In the reduction zone, the thin Fe oxide coating film formed on the steel sheet surface in the preheating zone is reduced to enhance plating adhesion. Therefore, a ratio between a water vapor partial pressure $P(H_2O)$ and a hydrogen partial pressure $P(H_2)$, $P(H_2O)/P(H_2)$, in the atmosphere in the reduction zone is 0.0001 to 2.00. When $P(H_2O)/P(H_2)$ is less than 0.0001, Si and/or Mn oxides which act as a plating peeling origin are formed on the outermost layer. On the other hand, when the $P(H_2O)/P(H_2)$ is more than 2.00, refinement excessively proceeds in the steel sheet surface and alloying of the plated layer excessively proceeds. Thus, plating adhesion is deteriorated. Further, when the $P(H_2O)/P(H_2)$ is more than 3.00, decarburization excessively proceeds and a hard phase of the base steel sheet surface is remarkably reduced. From this viewpoint, $P(H_2O)/P(H_2)$ is more preferably within a range of 0.002 to 1.50 and more preferably within a range of 0.005 to 1.20.

As described above, when $P(H_2O)/P(H_2)$ is 0.0001 to 2.00, in a case that water vapor is added into a reduction atmosphere, Si and/or Mn oxides which act as a plating peeling origin are not formed on the outermost layer, and Si and Mn form fine oxides inside the steel sheet surface alternatively. A size of the fine oxides is 0.01 μm or more and 0.4 μm or less in the above condition. In addition, water vapor in the reduction atmosphere causes the base steel surface to be decarburized and thus the base steel surface is turned into ferrite. Since these Si—Mn inside oxides suppress the growth of Fe recrystallization during a reduction annealing, on the surface of the base steel, a refined layer having an average thickness of 0.1 μm or more and 5 μm or less and having a ferrite having an average grain size of 0.1 μm or more and 3 μm or less is formed.

In the annealing step, at a cooling step before the plating step after the temperature reaches the maximum heating temperature and before the steel sheet reaches a plating bath (cooling step before plating), a predetermined microstructure is obtained by controlling a temperature of a steel sheet in two steps of a temperature range of 760° C. to 700° C. and a temperature range of 650° C. to 500° C. First, in order to sufficiently promote a formation of ferrite, an average cooling rate in a range of 760° C. to 700° C. is defined. In some cases, formation of ferrite may not be sufficiently proceeded when the average cooling rate in the range of 760° C. to 700° C. is more than 5.0° C./second, the average cooling rate is 5.0° C./second or less. In order to promote a formation of ferrite, the average cooling rate is preferably 3.5° C./second or less and more preferably 2.5° C./second or less. In some cases, excessive pearlite may be formed when the average cooling rate in the range of 760° C. to 700° C. is less than 0.3° C./second, the average cooling rate is 0.3° C./second or more. In order to avoid a formation of pearlite, the average cooling rate is preferably 0.5° C./second or more and more preferably 0.7° C./second or more.

Next, in order to avoid a formation of excessive pearlite and/or coarse cementite, an average cooling rate in a range of 650° C. to 500° C. is defined. When the average cooling rate in the range of 650° C. to 500° C. is less than 1.0° C./second, pearlite and/or coarse cementite is formed greatly, the average cooling rate is 1.0° C./second or more. Since it is preferable that pearlite and/or coarse cementite is not included in a steel, in order to avoid a formation of these structures sufficiently, the average cooling rate is preferably 2.0° C./second or more and more preferably 3.0° C./second or more. Although the upper limit of the average cooling rate in a range of 650° C. to 500° C. is not particularly provided, an excessively high average cooling rate is not preferable since a special cooling facility and a coolant which does not interfere with the plating step are required to obtain the excessively high average cooling rate. From this viewpoint, the average cooling rate in the above-described temperature range is preferably 100° C./second or less and more preferably 70° C./second or less.

Subsequent to the cooling step before plating, in order to obtain tempered martensite, in a period after the steel sheet temperature reaches 500° C. and before the steel sheet reaches a plating bath, as a martensitic transformation treatment, the steel sheet may be retained in a predetermined temperature range for a predetermined period of time. Regarding the martensitic transformation treatment temperature, a martensitic transformation starting temperature Ms point is set as an upper limit and the lower limit of the martensitic transformation treatment temperature is 50° C. In addition, the martensitic transformation treatment time is 1 second to 100 seconds. The martensite obtained in the treatment enters a plating bath at a high temperature in the plating step and then is changed into tempered martensite.

The Ms point is calculated by the following expression.

$$Ms\ Point\ [°\ C.]=541-474C/(1-VF)-15Si-35Mn-17Cr-17Ni+19Al$$

In the above expression, VF represents the volume fraction of ferrite, and each of C, Si, Mn, Cr, Ni, and Al represents the amount [% by mass] of each element added.

It is difficult to directly measure the volume fraction of ferrite during production. Therefore, when the Ms point is determined in the embodiment, a small piece is cut off from the cold-rolled steel sheet before the steel sheet is allowed to pass through the continuous annealing and plating line. The small piece is annealed at the same temperature as in the case in which the small piece is allowed to pass through the continuous annealing and plating line and a change in the volume of the ferrite of the small piece is measured so that a numerical value calculated using the result is used as the volume fraction VF of the ferrite.

Further, in order to promote the formation of bainite, in a period after the steel sheet temperature reaches 500° C. and before the steel sheet reaches a plating bath, the steel sheet may be retained at a predetermined temperature range for a predetermined period of time as a bainitic transformation treatment.

When the bainitic transformation treatment temperature is more than 500° C., a formation of pearlite and/or coarse cementite proceed. Therefore, the bainitic transformation treatment temperature is 500° C. or lower. When the bainitic transformation treatment temperature is lower than 350° C., the transformation is not promoted. Therefore, the bainitic transformation treatment temperature is 350° C. or higher. The bainitic transformation treatment time is 10 seconds or more, in order to promote the transformation sufficiently. The bainitic transformation treatment time is 500 seconds or less, in order to suppress formation of pearlite and/or coarse cementite.

After the cooling step before plating, in the case in which both the bainitic transformation treatment and the martensitic transformation treatment are performed, regarding the treatment order, the martensitic transformation treatment and the bainitic transformation treatment are performed.

[Plating Step]

Next, the base steel sheet obtained as described above is immersed in a plating bath.

The plating bath mainly includes zinc and has a composition in which the amount of effective Al, which is a value obtained by subtracting the total amount of Fe from the total amount of Al in the plating bath, is 0.050 to 0.180% by mass. When the amount of effective al in the plating bath is less than 0.050%, the entering of Fe into the plated layer excessively proceeds to impair plating adhesion. Thus, it is required that the amount of effective Al is 0.050% or more. From this viewpoint, the amount of effective Al in the plating bath is preferably 0.065% or more and more preferably 0.070% or more. On the other hand, when the amount of effective Al in the plating bath is more than 0.180%, Al-based oxides are formed at the boundary between the base steel sheet and the plated layer and the movement of Fe and Zn atoms is inhibited at the same boundary. Thus, $\zeta$ phase formation is suppressed and plating adhesion is significantly deteriorated. From this viewpoint, it is required that the amount of effective Al in the plating bath is 0.180% or less and the amount of effective Al is preferably 0.150% or less and more preferably 0.135% or less.

One or two or more elements of Ag, B, Be, Bi, Ca, Cd, Co, Cr, Cs, Cu, Ge, Hf, I, K, La, Li, Mg, Mn, Mo, Na, Nb, Ni, Pb, Rb, Sb, Si, Sn, Sr, Ta, Ti, V, W, Zr, and REM may be mixed in the plating bath and there is a preferable case in which the corrosion resistance or workability of the hot-dip galvanized layer is improved according to the content of each element in the plating bath or the like.

In addition, the temperature of the plating bath is 450° C. to 470° C. When the temperature of the plating bath is lower than 450° C., the viscosity of the plating bath is excessively increased and thus it is difficult to control the thickness of the plated layer so that the external appearance of the hot-dip galvanized steel sheet is impaired. On the other hand, when the temperature of the plating bath is higher than 470° C., a large amount of fumes is generated, and it is difficult to realize safe production, so that the temperature of the plating bath is 470° C. or lower.

In addition, the steel sheet temperature when the steel sheet enters the plating bath is lower than 440° C., it is required to give a large quantity of heat to the plating bath to stabilize the temperature of the plating bath at 450° C. or higher, which is practically inappropriate. On the other hand, when the steel sheet temperature when the steel sheet enters in the plating bath is higher than 480° C., it is required to introduce a facility of removing a large quantity of heat from the plating bath to stabilize the temperature of the plating bath at 470° C. or lower, which is inappropriate in terms of production costs. Accordingly, in order to stabilize the temperature of the plating bath, the temperature of the base steel sheet when the base steel sheet enters the plating bath is preferably 440° C. or higher and 480° C. or lower. In addition, in order to control a $\zeta$ phase formation behavior to be appropriate, it is more preferable that the temperature when the base steel sheet enters the plating bath is controlled to 450° C. or higher and 470° C. or lower.

When the bath temperature of the plating bath is within a range of 450 to 470° C., the embodiment can be carried out. However, when the bath temperature is not stabilized within a range of 450 to 470° C., the ζ phase in the plating bath becomes not uniform, which causes non-uniformity in the external appearance and adhesion of the plated layer. Therefore, in an actual production, the bath temperature is preferably any value in a range of 450 to 470° C. and is constant. Therefore, it is preferable that the entering temperature is coincident with the bath temperature. However, due to the limit of controllability of an actual production facility, the entering temperature is preferably in a range of the bath temperature of the plating bath ±4° C.

Depending on the production line of the hot-dip galvanized steel sheet, there is a case that a device necessary for performing the "cooling step after plating" to be described later is not provided and the manufacturing conditions of the embodiment can not be performed in some cases. In that case, by appropriately controlling the immersion time of the plating bath, it is possible to manufacture the same product as in the embodiment. In other words, if the immersion time of the steel sheet in the plating bath is extended, it is possible to form the ζ phase at the interface between the plating layer and the base steel sheet as in the case of performing the "cooling step after plating".

The necessary immersion time depends on the amount of Al in the plating bath, however, it is necessary that the immersion time is 3 seconds or more. It is preferable that the immersion time is 5 seconds or more, and is more preferably 10 seconds or more, even more preferably 20 seconds or more.

In order to have an appropriate plated amount after immersing the steel sheet in the plating bath, an excessive amount of zinc on the surface is preferably removed by blowing a high pressure gas mainly including nitrogen onto the steel sheet surface.

[Cooling Step after Plating]

After the steel sheet is immersed in a plating bath, in the cooling step of cooling to room temperature after plating, by controlling a cooling treatment so that it satisfies the following Expression (2), an appropriate amount of ζ phase is obtained in the plated layer.

T(t) [° C.] represents a steel sheet temperature, t[second] represents the time elapsed from the time point when the steel sheet is taken out from the plating bath as a starting point, t4[second] represents the time elapsed from the time point when the steel sheet is taken out from the plating bath as a starting point and until the steel sheet temperature reaches 350° C., and $W^*_{Al}$ [% by mass] represents the amount of effective Al in the plating bath. In addition, ε, θ, and μ each represents constant terms, each of which is $2.62 \times 10^7$, $9.13 \times 10^3$, and $1.0 \times 10^{-1}$.

$$0.40 \leq \left[ \int_{t0}^{t4} \varepsilon \cdot \exp\left\{ -\frac{\theta \cdot \left(\frac{W^*_{Al}}{\mu}\right)^{0.2}}{T(t)} \right\} \cdot t dt \right]^{0.5} \leq 2.20 \qquad \text{Expression (2)}$$

The above Expression (2) is an expression related to a ζ phase formation behavior and as the value of the above Expression (2) increases, ζ phase formation proceeds in the plated layer. As the steel sheet temperature increases and the treatment time increases, the value of the above Expression (2) increases. In addition, when the amount of effective Al in the plated layer is increased, the value of the above Expression (2) is decreased and ζ phase formation is inhibited. When the steel sheet temperature is within a temperature range of 350° C. or lower, the diffusion of Fe atoms from the base steel sheet to the plated layer hardly occur and ζ phase formation is nearly stopped. Therefore, the above Expression (2) is used for calculation at a steel sheet temperature within a range of 350° C. or higher.

In the cooling step after plating which is performed after the immersing the steel sheet in the plating bath, when the value of the above Expression (2) is less than 0.40, a sufficient amount of the ζ phase is not obtained in the plated layer and plating adhesion is impaired. Therefore, it is necessary to control the cooling treatment so that the value of Expression (2) is 0.40 or more. When the value of the above Expression (2) is 0.40 or more, ζ phase formation is sufficiently promoted and the ratio ((A*/A)×100) of the interface (A*) between the ζ phase and the base steel sheet in the entire interface (A) between the hot-dip galvanized layer and the base steel sheet is 20% or more. In addition, when the value of the above Expression (2) is 0.40 or more, the ratio ((A**/A*)×100) of the interface (A**) formed between the ζ grains in which coarse oxides are present and the base steel sheet in the interface (A*) between the ζ phase and the base steel sheet is 50% or less.

In order to further enhance plating adhesion, it is preferable that the cooling treatment is controlled such that the value of the above Expression (2) is 0.50 or more, and it is more preferable that the cooling treatment is controlled such that the value of the above Expression (2) is 0.60 or more. On the other hand, when the value of the above Expression (2) in the cooling treatment is excessively large, alloying of the plated layer proceeds and the Fe content in the plated layer is excessively increased. Thus, plating adhesion is impaired. From the viewpoint, it is required that the cooling treatment is performed such that the value of the above Expression (2) is 2.20 or less. In order to further enhance plating adhesion, it is preferable that the cooling treatment is controlled such that the value of the above Expression (2) is 2.00 or less and it is more preferable that the cooling treatment is controlled such that the value of the above Expression (2) is 1.80 or less.

Here, when the temperature of the steel sheet is increased after the steel sheet is taken out from the plating bath, the value of the above Expression (2) is significantly increased and plating adhesion is deteriorated. In addition, the microstructure of the steel sheet is reformed and predetermined hard structure cannot be obtained and strength deteriorates. Further, coarse carbides are formed and there is a concern of deterioration in formability of the hot-dip galvanized steel sheet. Therefore, the steel sheet temperature after the steel sheet is taken out from the plating bath is not allowed to be higher than the higher temperature of the steel sheet temperature before the steel sheet is immersed in the plating bath and the plating bath temperature.

On the other, as shown in a general method of producing a hot-dip galvanized steel sheet, when the steel sheet is rapidly cooled after the steel sheet is immersed in the plating bath, the value of the above Expression (2) is significantly decreased. As a result, a sufficient amount of the ζ phase is not obtained and plating adhesion is deteriorated. In order to set the value of the above Expression (2) to be within a predetermined range, for example, after the steel sheet is taken out from the plating bath, the steel sheet may be subjected to an isothermal retention treatment for a predetermined period of time and then rapidly cooled.

In addition, as long as the value of the above Expression (2) is set to be within a predetermined range, another optional temperature control may be performed. That is, as long as the temperature control for setting the value of the above Expression (2) to be within the range of the embodiment, any cooling control form may be adopted. For example, a cooling form of rapidly cooling after an isothermal retention treatment may be used or a cooling form of almost constant slow cooling may be used.

By the above cooling treatment which satisfies the Expression (2), cooling at an average cooling rate of 1.0° C./second or more to 250° C. or lower may be performed after a sufficient amount of the ζ phase is obtained in the plated layer, in order to obtain the hard structure. In order to obtain a fresh martensite phase and a tempered martensite phase, the average cooling rate is preferably 3.0° C./second or more and more preferably 5.0° C./second or more.

Further, a reheating treatment may be performed in order to obtain tempered martensite after the steel sheet is cooled to 250° C. or lower. The treatment temperature and the treatment time of the reheating treatment may be appropriately selected according to desired properties. However, a sufficient effect cannot be obtained at a reheating treatment temperature of lower than 250° C. On the other hand, when the reheating treatment temperature is higher than 350° C., the plated layer changes in quality, and there is a concern that plating adhesion deteriorates. Therefore, the reheating treatment temperature is preferably 250° C. or higher and 350° C. or lower. In addition, when the treatment time of the reheating treatment is longer than 1,000 seconds, the effect of the treatment is saturated and thus the treatment time is preferably 1,000 seconds or shorter.

A bainitic transformation treatment in which the steel sheet is retained for 500 seconds or shorter within a temperature range of 250° C. to 350° C. to obtain residual austenite may be performed after a sufficient amount of the ζ phase is obtained in the plated layer by the cooling treatment satisfying the above Expression (2). When a treatment temperature is lower than 250° C., martensite is formed and a sufficient amount of residual austenite cannot be obtained. On the other hand, when the bainitic transformation treatment temperature is higher than 350° C., there is a concern that an excessively large amount of residual austenite is obtained. Further, when the treatment time is more than 500 seconds, coarse carbides are formed from the residual austenite and there is a concern that formability significantly deteriorates.

After the bainitic transformation treatment (retained for 500 seconds or shorter within a temperature range of 250° C. to 350° C.), in order to further stabilize the residual austenite, the steel sheet may be cooled to 250° C. or lower and then a reheating treatment may be performed. The treatment temperature and the treatment time of the reheating treatment may be appropriately selected according to desired properties. However, a sufficient effect cannot be obtained at a reheating treatment temperature of lower than 250° C. When the reheating treatment temperature is higher than 350° C., the residual austenite is decomposed and becomes carbides, and there is a concern that the properties significantly deteriorate. Therefore, the treatment temperature is preferably 350° C. or lower.

In addition, when the treatment time of the reheating treatment is longer than 1,000 seconds, the effect of the treatment is saturated and thus the treatment time is preferably 1,000 seconds or shorter.

[Processing Step]

Next, after the steel sheet is cooled to 100° C. or less, a bending-bending back deformation is applied to the plated steel sheet in order to reduce a residual austenite in the surface layer of the base steel sheet. The bending can be applied by using a roll with a diameter of 50 mm to 800 mm. When the roll diameter of the roll is less than 50 mm, a large amount of strain is introduced in the surface layer of the base steel sheet by the bending deformation and therefore formability of the steel sheet deteriorates. When the roll diameter of the roll is more than 800 mm, the amount of strain in the surface layer of the base steel sheet is small and therefore the residual austenite is not sufficiently reduced. Since the bending-bending back deformation reduces the residual austenite at the surfaces in both sides of the base steel sheet and it is necessary that deformation which each of the sides of the base steel sheet is set as a bending-outward is applied to once or more times on both sides respectively, therefore it is necessary that the bending-bending back deformation is applied twice or more in total. By this step, the residual austenite at the surfaces in both sides of the base steel sheet can be set within a predetermined range.

The hot-dip galvanized steel sheet according to the embodiment can be produced by the above-described production method. However, the present invention is not limited to the above embodiment. For example, in the embodiment of the present invention, a coating film formed of a composite oxide including a phosphorus oxide and/or phosphorus may be applied to the surface of the zinc-plated layer of the hot-dip galvanized steel sheet obtained by the above-described.

The coating film formed of a composite oxide including a phosphorus oxide and/or phosphorus can function as a lubricant when the steel sheet is worked and can protect the zinc-plated layer formed on the surface of the base steel sheet.

Further, in the embodiment of the present invention, cold rolling may be performed on the hot-dip galvanized steel sheet cooled at room temperature at a rolling reduction of 3.00% or less for shape correction. The cold rolling may be performed at any stage such as before or after the bending-bending back deformation, or in the middle of the bending-bending back deformation.

The method of producing the hot-dip galvanized steel sheet according to the above-described embodiment of the present invention is preferably applied to the production of a hot-dip galvanized steel sheet in which the thickness of the base steel sheet is 0.6 mm or more and less than 5.0 mm. When the thickness of the base steel sheet is less than 0.6 mm, it is difficult to keep the shape of the base steel sheet flat and the thickness is not appropriate in some cases. In addition, when the thickness of the base steel sheet is 5.0 mm or more, the control of cooling in the annealing step and the plating step may be difficult.

EXAMPLES

Examples of the present invention will be described below. The conditions in the examples are just an illustration which is employed for confirming the feasibility and effects of the present invention. The present invention is not limited to this illustration of conditions. The present invention can employ various conditions so long as not deviating from the gist of the present invention and achieving the object of the present invention.

Slabs having the chemical components (composition) A to BY shown in Tables 1 to 6 were casted and hot-rolled under the conditions (the slab heating temperature, the rolling completion temperature) shown in Tables 7 to 10. Next, the hot-rolled steel sheets were cooled under the conditions (the average cooling rate from hot rolling completion to coiling, and the coiling temperature, and Expression (1)) shown in Tables 7 to 10, and thus hot-rolled steel sheets were obtained.

Thereafter, the hot-rolled steel sheets were subjected to pickling and cold rolling under the condition (rolling reduction) shown in Tables 7 to 10 and thus cold-rolled steel sheets were obtained.

Next, the obtained cold-rolled steel sheets were subjected to annealing under the conditions (the air ratio in the preheating zone, the partial pressure ratio $(P(H_2O)/P(H_2)$ between $H_2O$ and $H_2$ in the reduction atmosphere, the average heating rate in a temperature range of 600° C. to 750° C., and the maximum heating temperature) shown in Tables 11 to 14 and thus base steel sheets were obtained.

The base steel sheets were subjected to a cooling treatment under the conditions (cooling rate 1 (the average cooling rate in a temperature range of 760° C. to 700° C.), cooling rate 2 (the average cooling rate in a temperature range of 650° C. to 500° C.), the conditions for martensitic transformation treatment (the treatment temperature and the treatment time), and bainitic transformation treatment 1 (the treatment temperature and the treatment time)) for the cooling step before plating shown in Tables 15 to 18 and thus base steel sheets for plating treatment were obtained.

Next, the steel sheets were immersed in a zinc plating bath under the conditions (the amount of effective Al, the plating bath temperature, and the steel sheet entering temperature) shown in Tables 15 to 18, and a cooling treatment after plating was performed under the conditions (Expression (2), cooling rate 3 (the average cooling rate in a temperature range of 350° C. to 250° C.), the conditions (the treatment temperature and the treatment time) for bainitic transformation treatment 2, and the conditions (the treatment temperature and the treatment time) for the reheating treatment) shown in Tables 19 to 22. Next, a bending-bending back deformation was performed under the conditions (the roll diameters and the processing times) shown in Tables 19 to 22.

Further, cold rolling was performed under the conditions (rolling reduction) shown in Tables 19 to 22 to obtain hot-dip galvanized steel sheets of Experimental Examples 1 to 200 (wherein the experiment was stopped in some of experimental examples).

Next, a thickness cross section parallel to the rolling direction of the base steel sheet was set as an observed section and a sample was collected from each of the hot-dip galvanized plated steel sheets, and the microstructure observation with a field emission scanning electron microscope (FE-SEM) and high resolution crystal orientation analysis according to an EBSD method were performed on the observed section of the sample. Volume fractions of the microstructure in a range of ⅛ thickness to ⅜ thickness centered at the position of ¼ of the thickness from the surface of the base steel sheet (¼ thickness), and a surface layer range originating from an interface between a plated layer and a base steel sheet and having 20 μm depth (surface layer of base steel) were measured respectively.

Here, "martensite" in the tables indicates a fresh martensite, "others" among the microstructures in the tables indicates pearlite and/or coarse cementite. In addition, "hard phase" is a hard structure consisting of one or more of a bainite, a bainitic ferrite, a fresh martensite and a tempered martensite.

Further, a thickness cross section parallel to the rolling direction of the steel sheet was set as an observed section and a sample was collected from the hot-dip galvanized steel sheet. The observed section of the sample was observed with a field emission scanning electron microscope (FE-SEM) to observe the interface between the plated layer and the base steel sheet, and the ratio of the interface between the ζ phase and the base steel sheet in the interface between the plated layer and the base steel sheet (boundary surface occupancy ratio) is measured. "Occupancy ratio of ζ grain in which oxides present" indicates the ratio of the interface between the ζ grains in which coarse oxides are present among the ζ grains and the base steel with respect to the entire interface between the ζ phase and the base steel.

The hot-dip galvanized steel sheet is processed by ion milling and a BSE image was photographed at an accelerating voltage of 5 kV and a magnification of 5,000 with FE-SEM. Oxides and ζ phase boundaries appear darker in this BSE image. Among a plated layer/base steel sheet boundary length, a length in which the ζ phase is formed and a length in which the ζ phase including coarse grains is formed are read from the image and the occupancy ratio of the grains in which oxides present.

Figure 2:
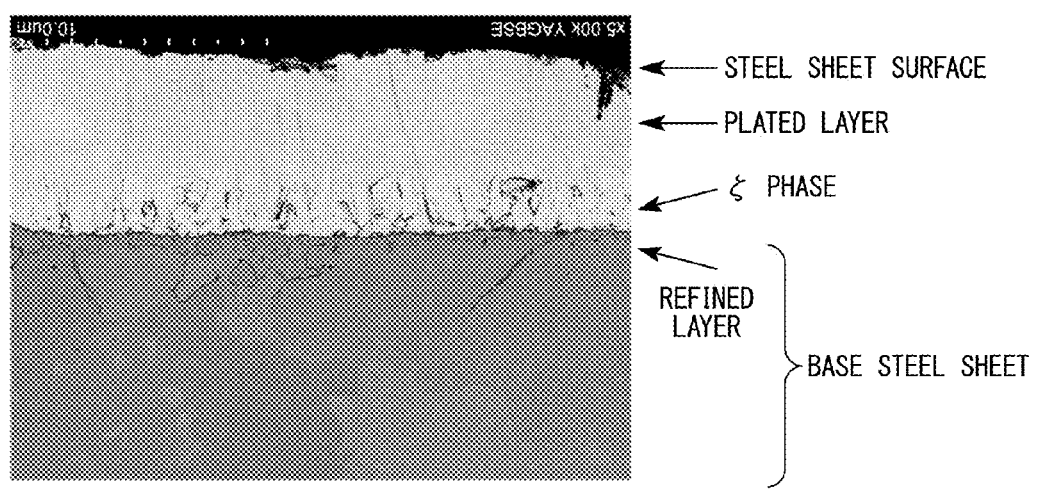
FIG. 2 is an enlarged cross section structure micrograph of the vicinity of an area including an interface between a hot-dip galvanized layer and a base steel sheet in the cross section of a hot-dip galvanized steel sheet according to an example.

FIG. 2 indicates an enlarged cross section structure micrograph of the hot-dip galvanized steel sheet of Experimental Example No. 1. The result of polishing a cross section of an obtained hot-dip galvanized steel sheet sample by ion milling process and imaging a BSE image at an accelerating voltage of 5 kV is indicated in FIG. 2. As shown in FIG. 2, a refined layer in which grains are fine was formed in the surface layer of the base steel sheet was formed. Additionally, it was confirmed that Si—Mn inside oxides are formed at an interface at a plated-layer side of the refined layer.

The plated amount of the plating was obtained by melting the plated layer using a hydrochloric acid with an inhibitor and comparing the weight before and after the melting. The results of observation of the microstructures and compositions of the plated layers, and so on, of the samples explained above are indicated in Tables 23 to 34.

Next, in order to investigate the properties of each hot-dip galvanized steel sheet, a tensile test, a hole expansion test, a bending test, a fatigue test, an adhesion evaluation test, a spot welding test, and a corrosion test were performed. The properties in each experimental example are shown in Tables 35 to 42.

No. 5 test pieces as described in JIS Z 2201 were cut out from the hot-dip galvanized steel sheets to perform a tensile test according to the method described in JIS Z 2241. Thus, the yield strength YS, the maximum tensile strength TS, and the total elongation El were obtained. The strength were evaluated such that a case in which the maximum tensile strength TS was 550 MPa or more was satisfactory.

A hole expansion test was performed according to the method described in JIS Z 2256. Among the formabilities, the ductility El and hole expansibility λ change according to the maximum tensile strength TS. However, the strength, the ductility and the hole expansibility in the case in which the following Expression (4) was satisfied were satisfactory.

$$TS^{1.5} \times El \times \lambda^{0.5} \geq 2.5 \times 10^6 \qquad \text{Expression (4)}$$

No. 5 test pieces as described in JIS Z 2201 were cut out from the hot-dip galvanized steel sheets to perform a bending test which is a 90° V bending test according to the V block method described in JIS Z 2248. A radius at a bottom portion of a V block is varied from 1.0 mm to 6.0 mm at intervals of 0.5 mm, a smallest radius of which crack did not occur in a test piece is set as a minimum bending radius r

[mm]. Bendability was evaluated by "r/t" obtained by normalizing the minimum bending radius r with the plate thickness t [mm], and a case where "r/t" was 2.0 or less was evaluated as good bendability.

No. 1 test pieces as described in JIS Z 2275 were cut out from the hot-dip galvanized steel sheets to perform a pulsating plane bending fatigue test according to the method described in JIS Z 2273. Fatigue limit DL and fatigue limit ratio DL/TS were evaluated by setting the maximum number of repetitions to 10 million times, and a case where the fatigue limit ratio was 0.30 or more was evaluated as good fatigue resistance.

For plating adhesion, each hot-dip galvanized steel sheet to which 5% uniaxial tension strain was applied was subjected to a DuPont impact test. An adhesive tape was attached to the plated steel sheet after the impact test and then peeled off. The case in which the plating was not peeled off was evaluated as pass (o) and the case in which the plating was peeled off was evaluated as fail (x). The DuPont impact test was performed by dropping a weight of 3 kg onto the steel sheet from a height of 1 m using a punching die having a radius of curvature of the front end of ½ inches.

Spot weldability was evaluated by performing a continuous dotting test. Under the condition that the diameter of the welded part is 5.3 to 5.7 times the square root of the thickness, spot welding was continuously performed 1,000 times and $d_1$ of the first dot and $d_{1000}$ of the 1,000-th dot of the diameters of the welded parts were compared to each other. The case in which $d_{1000}/d_1$ was 0.90 or more was evaluated as pass (o) and the case in which $d_{1000}/d_1$ was less than 0.90 was evaluated as fail (x).

For the evaluation of corrosion resistance, a test piece cut out from each hot-dip galvanized steel sheet to have a size of 150×70 mm was used, and the test piece was subjected to a zinc phosphate-based dipping type chemical conversion treatment and subsequently a cation electrode position coat of 20 μm was applied. Further, an intermediate coat of 35 μm and an upper coat of 35 μm were applied and then the rear surface and the end portion were sealed with an insulating tape. In the corrosion resistance test, CCT having one cycle of SST 6 hr→drying 4 hr→wetting 4 hr→freezing 4 hr was used. The evaluation of corrosion resistance after coating was performed such that the coated surface was cross-cut with a cutter until the cutting reached the base steel and a swollen width after 60 cycles of CCT was measured. The case in which the swollen width was 3.0 mm or less was evaluated as pass (o) and the case in which the swollen width was more than 3.0 mm was evaluated as fail (x).

For evaluating chipping properties, a test sample was cut out from each hot-dip galvanized steel sheet to have a size of 70 mm×150 mm, and an automotive degreasing, chemical conversion and 3-coat coating were performed on the test sample. In a state in which the test sample was cooled and retained at −20° C., ten crushed stones (0.3 to 0.5 g) were vertically applied with an air pressure of 2 kgf/cm². Ten crushed stones were applied to each sample. Each standard N5 is performed, 50 chipping scars in total were observed and evaluated according to the position of the peeled interface. The case in which the peeled interface was above the plated layer (the interface between the plated layer and the chemical conversion coating film or the interface between the electrode position coat and the intermediate coat coating) was evaluated as (o) and the case in which even one interface peeling occurred at interface between the plated layer and the base steel (base steel sheet) was evaluated as (x).

Powdering properties were evaluated using V bending (JIS Z 2248) to evaluate the workability of the plated layer. Each hot-dip galvanized steel sheet was cut into a size of 50×90 mm and a formed body was used with a 1R-90° V-shaped die press. In the grooves, tape peeling was performed. A cellophane tape having a width of 24 mm was pressed on the bent part and then peeled off. The part of the cellophane tape at a length of 90 mm was visually determined. The evaluation criteria were as follows.

o: the peeling of the plated layer occurred in an area of less than 5% of the worked part area x: the peeling of the plated layer occurred in an area of more than 5% of the worked part area

TABLE 1

| Chemical components | C % by mass | Si % by mass | Mn % by mass | P % by mass | S % by mass | Al % by mass | N % by mass | O % by mass | |
|---|---|---|---|---|---|---|---|---|---|
| A | 0.085 | 0.86 | 1.92 | 0.005 | 0.0016 | 0.059 | 0.0035 | 0.0008 | Example |
| B | 0.051 | 0.51 | 2.38 | 0.012 | 0.0015 | 0.035 | 0.0014 | 0.0011 | Example |
| C | 0.097 | 1.47 | 3.00 | 0.005 | 0.0011 | 0.007 | 0.0008 | 0.0032 | Example |
| D | 0.060 | 1.09 | 1.35 | 0.009 | 0.0005 | 0.020 | 0.0047 | 0.0017 | Example |
| E | 0.180 | 1.15 | 1.28 | 0.005 | 0.0030 | 0.042 | 0.0020 | 0.0012 | Example |
| F | 0.107 | 0.60 | 2.95 | 0.015 | 0.0034 | 0.035 | 0.0013 | 0.0010 | Example |
| G | 0.208 | 0.38 | 2.35 | 0.008 | 0.0048 | 0.028 | 0.0014 | 0.0010 | Example |
| H | 0.078 | 1.19 | 3.09 | 0.012 | 0.0038 | 0.086 | 0.0008 | 0.0020 | Example |
| I | 0.115 | 0.22 | 2.94 | 0.008 | 0.0040 | 1.246 | 0.0022 | 0.0019 | Example |
| J | 0.234 | 0.94 | 1.44 | 0.017 | 0.0003 | 0.038 | 0.0017 | 0.0025 | Example |
| K | 0.268 | 0.76 | 2.87 | 0.016 | 0.0040 | 0.081 | 0.0050 | 0.0018 | Example |
| L | 0.153 | 0.94 | 2.41 | 0.011 | 0.0015 | 0.004 | 0.0030 | 0.0027 | Example |
| M | 0.091 | 0.37 | 1.56 | 0.014 | 0.0008 | 0.046 | 0.0026 | 0.0008 | Example |
| N | 0.203 | 0.33 | 2.49 | 0.012 | 0.0029 | 0.016 | 0.0008 | 0.0012 | Example |
| O | 0.075 | 1.90 | 2.00 | 0.010 | 0.0029 | 0.027 | 0.0041 | 0.0015 | Example |
| P | 0.063 | 0.66 | 2.31 | 0.015 | 0.0027 | 0.099 | 0.0027 | 0.0004 | Example |
| Q | 0.116 | 0.72 | 1.96 | 0.017 | 0.0029 | 0.018 | 0.0046 | 0.0020 | Example |
| R | 0.081 | 0.50 | 2.39 | 0.009 | 0.0062 | 0.072 | 0.0036 | 0.0023 | Example |
| S | 0.203 | 0.89 | 1.74 | 0.016 | 0.0016 | 0.061 | 0.0008 | 0.0021 | Example |
| T | 0.157 | 0.50 | 3.16 | 0.011 | 0.0025 | 0.041 | 0.0046 | 0.0009 | Example |
| U | 0.100 | 0.88 | 2.73 | 0.047 | 0.0032 | 0.028 | 0.0033 | 0.0015 | Example |
| V | 0.083 | 0.65 | 1.30 | 0.014 | 0.0009 | 0.066 | 0.0013 | 0.0012 | Example |
| W | 0.092 | 0.67 | 2.86 | 0.018 | 0.0012 | 0.036 | 0.0020 | 0.0012 | Example |
| X | 0.069 | 0.60 | 2.03 | 0.007 | 0.0004 | 0.043 | 0.0018 | 0.0032 | Example |
| Y | 0.097 | 1.00 | 2.31 | 0.011 | 0.0059 | 0.029 | 0.0037 | 0.0020 | Example |
| Z | 0.106 | 0.53 | 2.28 | 0.006 | 0.0031 | 0.008 | 0.0043 | 0.0022 | Example |

TABLE 2

| Chemical components | Ti % by mass | Nb % by mass | V % by mass | Cr % by mass | Ni % by mass | Cu % by mass | Mo % by mass | B % by mass | W % by mass | Ca % by mass | Ce % by mass | Mg % by mass | Zr % by mass | La % by mass | REM % by mass | |
|---|---|---|---|---|---|---|---|---|---|---|---|---|---|---|---|---|
| A | | | | | | | | | | | | | | | | Example |
| B | | | | | | | | | | | | | | | | Example |
| C | | | | | | | | | | | | | | | | Example |
| D | | | | | | | | | | | | | | | | Example |
| E | | | | | | | | | | | | | | | | Example |
| F | | | | | | | | | | | | | | | | Example |
| G | | | | | | | | | | | | | | | | Example |
| H | 0.058 | | | | | | | | | | | | | | | Example |
| I | | | | | | | | | | | | | | | | Example |
| J | | | | | | | | | | | | | | | | Example |
| K | | | | | | | | | | | | | | | | Example |
| L | | | | | | | | | | | | | | | | Example |
| M | | 0.049 | | | | | | | | | | | | | | Example |
| N | | | | 0.49 | | | | | | | | | | | | Example |
| O | | | | | | | | | | | | | | | | Example |
| P | | | 0.131 | | | | | | | | | | | | | Example |
| Q | | | | | 0.26 | | | | | | | | | | | Example |
| R | | | | | | | | | | | | | | | | Example |
| S | | | | | | | 0.41 | | | | | | | | | Example |
| T | | | | | | | | | | | | | | | | Example |
| U | | | | | | | | | | | | | | | | Example |
| V | | | | | | | 0.48 | | | | | | | | | Example |
| W | | | | | | | | | 0.18 | | | | | | | Example |
| X | | | | | | | | 0.0047 | | | | | | | | Example |
| Y | | | | | | | | | | 0.0045 | | | | | | Example |
| Z | | | | | | | | | | | | 0.0032 | | | | Example |

TABLE 3

| Chemical components | C % by mass | Si % by mass | Mn % by mass | P % by mass | S % by mass | Al % by mass | N % by mass | O % by mass | |
|---|---|---|---|---|---|---|---|---|---|
| AA | 0.204 | 1.03 | 2.49 | 0.012 | 0.0014 | 0.047 | 0.0045 | 0.0003 | Example |
| AB | 0.176 | 0.16 | 2.06 | 0.023 | 0.0016 | 0.083 | 0.0017 | 0.0013 | Example |
| AC | 0.086 | 1.08 | 1.60 | 0.018 | 0.0006 | 0.078 | 0.0018 | 0.0008 | Example |
| AD | 0.141 | 0.66 | 2.28 | 0.004 | 0.0009 | 0.038 | 0.0059 | 0.0016 | Example |
| AE | 0.138 | 0.46 | 2.95 | 0.016 | 0.0016 | 0.020 | 0.0040 | 0.0017 | Example |
| AF | 0.124 | 0.93 | 1.92 | 0.017 | 0.0027 | 0.057 | 0.0008 | 0.0007 | Example |
| AG | 0.158 | 0.86 | 2.90 | 0.009 | 0.0003 | 0.070 | 0.0030 | 0.0028 | Example |
| AH | 0.172 | 0.76 | 2.99 | 0.018 | 0.0031 | 0.059 | 0.0050 | 0.0013 | Example |
| AI | 0.075 | 0.65 | 2.04 | 0.013 | 0.0004 | 0.255 | 0.0009 | 0.0010 | Example |
| AJ | 0.157 | 0.49 | 2.07 | 0.010 | 0.0013 | 0.472 | 0.0020 | 0.0009 | Example |
| AK | 0.179 | 0.95 | 3.07 | 0.020 | 0.0043 | 0.009 | 0.0016 | 0.0008 | Example |
| AL | 0.096 | 0.16 | 2.25 | 0.006 | 0.0025 | 0.008 | 0.0051 | 0.0015 | Example |
| AM | 0.177 | 0.75 | 2.40 | 0.009 | 0.0004 | 0.756 | 0.0038 | 0.0014 | Example |
| AN | 0.150 | 0.49 | 1.83 | 0.010 | 0.0031 | 0.068 | 0.0040 | 0.0008 | Example |
| AO | 0.134 | 0.67 | 2.36 | 0.009 | 0.0038 | 0.041 | 0.0017 | 0.0025 | Example |
| AP | 0.170 | 0.34 | 2.34 | 0.010 | 0.0020 | 0.025 | 0.0024 | 0.0008 | Example |
| AQ | 0.124 | 0.37 | 1.22 | 0.017 | 0.0064 | 0.046 | 0.0023 | 0.0027 | Example |
| AR | 0.084 | 0.53 | 2.20 | 0.011 | 0.0053 | 0.058 | 0.0013 | 0.0017 | Example |
| AS | 0.135 | 0.90 | 2.37 | 0.017 | 0.0023 | 0.061 | 0.0036 | 0.0025 | Example |
| AT | 0.084 | 0.61 | 2.63 | 0.004 | 0.0049 | 0.033 | 0.0021 | 0.0014 | Example |
| AU | 0.086 | 0.50 | 2.29 | 0.004 | 0.0022 | 0.045 | 0.0032 | 0.0014 | Example |
| AV | 0.114 | 0.99 | 1.79 | 0.005 | 0.0032 | 0.084 | 0.0038 | 0.0014 | Example |
| AW | 0.157 | 0.50 | 2.20 | 0.017 | 0.0022 | 0.087 | 0.0011 | 0.0009 | Example |
| AX | 0.090 | 0.55 | 3.20 | 0.003 | 0.0017 | 0.051 | 0.0033 | 0.0007 | Example |
| AY | 0.186 | 1.10 | 1.97 | 0.010 | 0.0033 | 0.030 | 0.0060 | 0.0029 | Example |
| AZ | 0.070 | 0.75 | 2.36 | 0.015 | 0.0045 | 0.040 | 0.0083 | 0.0009 | Example |

TABLE 4

| Chemical components | Ti % by mass | Nb % by mass | V % by mass | Cr % by mass | Ni % by mass | Cu % by mass | Mo % by mass | B % by mass | W % by mass | Ca % by mass | Ce % by mass | Mg % by mass | Zr % by mass | La % by mass | REM % by mass | |
|---|---|---|---|---|---|---|---|---|---|---|---|---|---|---|---|---|
| AA | 0.016 | 0.016 | | | | | | | | | | | | | | Example |
| AB | | | | | | | | | | | | | 0.0046 | | | Example |

TABLE 4-continued

| Chemical components | Ti % by mass | Nb % by mass | V % by mass | Cr % by mass | Ni % by mass | Cu % by mass | Mo % by mass | B % by mass | W % by mass | Ca % by mass | Ce % by mass | Mg % by mass | Zr % by mass | La % by mass | REM % by mass | |
|---|---|---|---|---|---|---|---|---|---|---|---|---|---|---|---|---|
| AC |  |  |  |  |  |  |  |  |  |  |  |  | 0.0046 |  |  | Example |
| AD | 0.013 |  |  |  |  |  |  | 0.0009 |  |  |  |  |  |  |  | Example |
| AE |  |  |  |  |  |  |  |  |  |  |  |  |  | 0.0006 |  | Example |
| AF |  |  |  |  |  |  |  |  |  |  |  |  |  |  | 0.0024 | Example |
| AG | 0.035 | 0.007 |  |  |  |  | 0.15 | 0.0003 |  |  |  |  |  |  |  | Example |
| AH | 0.007 | 0.015 |  | 0.14 |  |  |  |  |  |  |  |  |  |  |  | Example |
| AI | 0.090 | 0.025 |  | 1.34 |  |  |  |  |  |  |  |  |  |  |  | Example |
| AJ | 0.018 | 0.026 |  |  |  |  | 0.36 | 0.0018 |  |  |  |  |  |  |  | Example |
| AK | 0.045 | 0.011 |  | 0.08 |  |  |  | 0.0030 |  |  |  |  |  |  |  | Example |
| AL |  |  |  |  |  |  |  |  |  |  |  |  |  |  |  | Example |
| AM | 0.064 | 0.014 |  | 0.95 |  |  |  | 0.0014 |  |  |  |  |  |  |  | Example |
| AN |  |  |  |  |  |  |  |  |  | 0.0025 | 0.0013 |  |  |  |  | Example |
| AO |  |  |  |  |  |  |  |  |  |  |  | 0.0041 |  | 0.0020 |  | Example |
| AP |  |  |  |  |  |  |  |  |  |  |  |  |  |  |  | Example |
| AQ |  |  |  |  |  |  |  |  |  | 0.0015 | 0.0021 |  |  | 0.0008 |  | Example |
| AR |  |  |  |  |  |  |  |  |  |  |  |  |  |  |  | Example |
| AS | 0.006 |  |  | 0.26 |  |  |  |  |  |  |  |  |  |  |  | Example |
| AT | 0.057 |  |  |  |  |  | 0.06 |  |  |  |  |  |  |  |  | Example |
| AU |  | 0.082 |  |  |  |  |  |  |  |  |  |  |  |  |  | Example |
| AV | 0.116 |  |  |  |  |  |  |  |  |  |  |  |  |  |  | Example |
| AW |  |  |  |  |  |  |  |  |  |  |  |  |  |  |  | Example |
| AX |  |  |  | 0.09 |  |  |  |  |  |  |  |  |  |  |  | Example |
| AY |  |  |  |  |  |  | 0.26 |  |  |  |  |  |  |  |  | Example |
| AZ |  |  |  |  |  |  |  |  |  |  |  |  |  |  |  | Example |

TABLE 5

| Chemical components | C % by mass | Si % by mass | Mn % by mass | P % by mass | S % by mass | Al % by mass | N % by mass | O % by mass | |
|---|---|---|---|---|---|---|---|---|---|
| BA | 0.142 | 0.93 | 2.10 | 0.013 | 0.0015 | 0.064 | 0.0007 | 0.0053 | Example |
| BB | 0.136 | 0.89 | 3.30 | 0.008 | 0.0031 | 0.070 | 0.0039 | 0.0006 | Example |
| BC | 0.096 | 0.28 | 2.29 | 0.009 | 0.0018 | 0.007 | 0.0048 | 0.0022 | Example |
| BD | 0.149 | 0.07 | 1.82 | 0.012 | 0.0016 | 0.037 | 0.0015 | 0.0025 | Example |
| BE | 0.085 | 0.91 | 1.52 | 0.018 | 0.0033 | 0.052 | 0.0046 | 0.0022 | Example |
| BF | 0.186 | 1.06 | 1.96 | 0.012 | 0.0008 | 0.047 | 0.0024 | 0.0022 | Example |
| BG | 0.094 | 1.33 | 1.14 | 0.009 | 0.0010 | 0.021 | 0.0007 | 0.0028 | Example |
| BH | 0.157 | 0.84 | 2.84 | 0.016 | 0.0044 | 0.211 | 0.0018 | 0.0012 | Example |
| BI | 0.109 | 1.49 | 0.71 | 0.014 | 0.0024 | 0.068 | 0.0060 | 0.0006 | Example |
| BJ | 0.127 | 0.67 | 1.53 | 0.003 | 0.0036 | 0.011 | 0.0017 | 0.0024 | Example |
| BK | 0.096 | 0.44 | 1.96 | 0.013 | 0.0049 | 0.063 | 0.0017 | 0.0027 | Example |
| BL | 0.092 | 0.55 | 2.90 | 0.006 | 0.0044 | 0.016 | 0.0017 | 0.0005 | Example |
| BM | 0.120 | 1.73 | 0.91 | 0.009 | 0.0024 | 0.010 | 0.0036 | 0.0015 | Example |
| BN | 0.102 | 0.11 | 1.81 | 0.004 | 0.0005 | 0.254 | 0.0030 | 0.0027 | Example |
| BO | 0.016 | 1.11 | 2.91 | 0.013 | 0.0026 | 0.041 | 0.0027 | 0.0017 | Comp.Ex. |
| BP | 0.411 | 0.80 | 2.60 | 0.004 | 0.0047 | 0.039 | 0.0040 | 0.0020 | Comp.Ex. |
| BQ | 0.141 | 0.01 | 2.03 | 0.006 | 0.0025 | 0.016 | 0.0025 | 0.0029 | Comp.Ex. |
| BR | 0.126 | 2.40 | 2.92 | 0.012 | 0.0014 | 0.040 | 0.0017 | 0.0016 | Comp.Ex. |
| BS | 0.121 | 0.64 | 0.17 | 0.008 | 0.0037 | 0.042 | 0.0042 | 0.0034 | Comp.Ex. |
| BT | 0.158 | 0.89 | 4.09 | 0.009 | 0.0018 | 0.083 | 0.0026 | 0.0018 | Comp.Ex. |
| BU | 0.086 | 0.77 | 2.54 | 0.208 | 0.0026 | 0.034 | 0.0014 | 0.0024 | Comp.Ex. |
| BV | 0.147 | 0.56 | 2.07 | 0.010 | 0.0139 | 0.043 | 0.0023 | 0.0008 | Comp.Ex. |
| BW | 0.137 | 0.57 | 2.16 | 0.017 | 0.0034 | 2.077 | 0.0033 | 0.0021 | Comp.Ex. |
| BX | 0.134 | 0.53 | 2.30 | 0.013 | 0.0021 | 0.026 | 0.0188 | 0.0022 | Comp.Ex. |
| BY | 0.190 | 0.98 | 2.94 | 0.010 | 0.0034 | 0.050 | 0.0032 | 0.0154 | Comp.Ex. |

TABLE 6

| Chemical components | Ti % by mass | Nb % by mass | V % by mass | Cr % by mass | Ni % by mass | Cu % by mass | Mo % by mass | B % by mass | W % by mass | Ca % by mass | Ce % by mass | Mg % by mass | Zr % by mass | La % by mass | REM % by mass | |
|---|---|---|---|---|---|---|---|---|---|---|---|---|---|---|---|---|
| BA |  |  |  |  |  |  |  |  |  |  |  |  |  |  |  | Example |
| BB |  |  |  |  |  |  |  |  |  |  |  |  |  |  |  | Example |
| BC |  |  |  |  |  |  |  |  |  |  |  |  |  |  |  | Example |

TABLE 6-continued

| Chemical components | Ti % by mass | Nb % by mass | V % by mass | Cr % by mass | Ni % by mass | Cu % by mass | Mo % by mass | B % by mass | W % by mass | Ca % by mass | Ce % by mass | Mg % by mass | Zr % by mass | La % by mass | REM % by mass | |
|---|---|---|---|---|---|---|---|---|---|---|---|---|---|---|---|---|
| BD | | | | | | | | | | | | | | | | Example |
| BE | | | | | 0.61 | 0.28 | | | | | | | | | | Example |
| BF | | | | | | | | | | | | | | | | Example |
| BG | | | | | | | | | | | | | | | | Example |
| BH | | | | 0.72 | | | | | | | | | | | | Example |
| BI | | | | 0.72 | | | 0.11 | | | | | | | | | Example |
| BJ | | 0.074 | | | | | | | | | | | | | | Example |
| BK | 0.015 | | | | | | | | | | | | | | | Example |
| BL | | | | | | | | 0.0063 | | | | | | | | Example |
| BM | 0.005 | 0.030 | | | | | | 0.0025 | | | | | | | | Example |
| BN | 0.060 | 0.018 | | | | | | 0.0032 | | | | | | | | Example |
| BO | | | | | | | | | | | | | | | | Comp.Ex. |
| BP | | | | | | | | | | | | | | | | Comp.Ex. |
| BQ | | | | | | | | | | | | | | | | Comp.Ex. |
| BR | | | | | | | | | | | | | | | | Comp.Ex. |
| BS | | | | | | | | | | | | | | | | Comp.Ex. |
| BT | | | | | | | | | | | | | | | | Comp.Ex. |
| BU | | | | | | | | | | | | | | | | Comp.Ex. |
| BV | | | | | | | | | | | | | | | | Comp.Ex. |
| BW | | | | | | | | | | | | | | | | Comp.Ex. |
| BX | | | | | | | | | | | | | | | | Comp.Ex. |
| BY | | | | | | | | | | | | | | | | Comp.Ex. |

TABLE 7

| Experimental Example | Chemical components | Hot rolling step | | | | | | Cold rolling step | |
|---|---|---|---|---|---|---|---|---|---|
| | | Slab heating temperature ° C. | Rolling completion temperature ° C. | Average cooling rate ° C./sec | Coiling temperature ° C. | Ae3* ° C. | Expression (1) | Rolling reduction % | |
| 1 | A | 1205 | 913 | 22 | 538 | 863 | 2.2 | 63 | Example |
| 2 | A | 1225 | 914 | 15 | 601 | 863 | 3.6 | 57 | Comp.Ex. |
| 3 | A | 1235 | 939 | 42 | 642 | 863 | 5.3 | 38 | Example |
| 4 | A | 1190 | 887 | 76 | 508 | 863 | 1.2 | 57 | Example |
| 5 | B | 1195 | 888 | 22 | 545 | 836 | 1.8 | 61 | Example |
| 6 | B | 1160 | 913 | 37 | 505 | 836 | 1.4 | 54 | Example |
| 7 | B | 1230 | 933 | 19 | 608 | 836 | 2.5 | 45 | Example |
| 8 | B | 1220 | 903 | 49 | 576 | 836 | 2.0 | 69 | Example |
| 9 | C | 1205 | 907 | 15 | 592 | 845 | 5.0 | 56 | Example |
| 10 | C | 1180 | 943 | 21 | 647 | 845 | 17.2 | 69 | Example |
| 11 | C | 1210 | 916 | 16 | 621 | 845 | 11.7 | 66 | Example |
| 12 | C | 1205 | 906 | 19 | 600 | 845 | 5.7 | 35 | Comp.Ex. |
| 13 | D | 1215 | 940 | 22 | 609 | 882 | 4.1 | 44 | Example |
| 14 | D | 1185 | 908 | 21 | 487 | 882 | 3.3 | 62 | Comp.Ex. |
| 15 | D | 1225 | 892 | 61 | 465 | 882 | 2.1 | 56 | Example |
| 16 | D | 1235 | 915 | 15 | 600 | 882 | 4.7 | 70 | Example |
| 17 | E | 1225 | 868 | 22 | 608 | 889 | 4.6 | 58 | Example |
| 18 | E | 1195 | 903 | 20 | 601 | 889 | 4.9 | 25 | Example |
| 19 | E | 1190 | 885 | 11 | 617 | 889 | 6.3 | 66 | Example |
| 20 | E | 1215 | 921 | 20 | 577 | 889 | 3.5 | 36 | Comp.Ex. |
| 21 | F | 1220 | 939 | 34 | 562 | 822 | 1.5 | 48 | Example |
| 22 | F | 1200 | 911 | 45 | 632 | 822 | 2.9 | 54 | Example |
| 23 | F | 1210 | 974 | 39 | 572 | 822 | 1.5 | 65 | Example |
| 24 | F | 1210 | 934 | 58 | 596 | 822 | 2.0 | 52 | Example |
| 25 | G | 1250 | 910 | 22 | 568 | 832 | 1.7 | 46 | Example |
| 26 | G | 1210 | 880 | 65 | 524 | 832 | 0.9 | 59 | Example |
| 27 | G | 1225 | 891 | 54 | 508 | 832 | 0.6 | 58 | Comp.Ex. |
| 28 | G | 1245 | 896 | 15 | 596 | 832 | 2.1 | 67 | Example |
| 29 | H | 1235 | 915 | 50 | 602 | 843 | 3.9 | 52 | Example |
| 30 | H | 1265 | 917 | 53 | 552 | 843 | 2.2 | 45 | Example |
| 31 | H | 1255 | 904 | 34 | 564 | 843 | 2.5 | 2 | Example |
| 32 | I | 1245 | 946 | 50 | 581 | 960 | 4.1 | 48 | Example |
| 33 | I | 1245 | 968 | 14 | 630 | 960 | 6.9 | 55 | Example |
| 34 | I | 1210 | 950 | 58 | 583 | 960 | 3.9 | 58 | Example |
| 35 | J | 1190 | 891 | 27 | 595 | 877 | 3.5 | 26 | Example |
| 36 | J | 1225 | 868 | 38 | 594 | 877 | 3.1 | 48 | Example |
| 37 | J | 1175 | 935 | 17 | 578 | 877 | 3.4 | 53 | Example |
| 38 | K | 1190 | 884 | 20 | 584 | 835 | 2.4 | 50 | Example |
| 39 | K | 1240 | 917 | 16 | 582 | 835 | 2.4 | 38 | Example |

TABLE 7-continued

| | | Hot rolling step | | | | | | Cold rolling step | |
|---|---|---|---|---|---|---|---|---|---|
| Experimental Example | Chemical components | Slab heating temperature °C. | Rolling completion temperature °C. | Average cooling rate °C./sec | Coiling temperature °C. | Ae3* °C. | Expression (1) | Rolling reduction % | |
| 40 | K | 1205 | 858 | 17 | 585 | 835 | 2.3 | 51 | Example |
| 41 | L | 1205 | 925 | 16 | 584 | 845 | 3.1 | 59 | Example |
| 42 | L | 1245 | 955 | 59 | 578 | 845 | 2.1 | 64 | Example |
| 43 | L | 1210 | 923 | 34 | 552 | 845 | 2.2 | 52 | Comp.Ex. |
| 44 | M | 1185 | 882 | 15 | 544 | 857 | 2.5 | 50 | Example |
| 45 | M | 1270 | 896 | 15 | 567 | 857 | 2.8 | 44 | Example |
| 46 | M | 1245 | 955 | 24 | 584 | 857 | 2.4 | 47 | Comp.Ex. |
| 47 | N | 1235 | 914 | 23 | 549 | 816 | 1.6 | 61 | Example |
| 48 | N | 1255 | 911 | 31 | 569 | 816 | 2.4 | 35 | Example |
| 49 | N | 1235 | 946 | 23 | 550 | 816 | 1.5 | 38 | Comp.Ex. |
| 50 | O | 1255 | 941 | 18 | 554 | 890 | 4.7 | 52 | Example |

TABLE 8

| | | Hot rolling step | | | | | | Cold rolling step | |
|---|---|---|---|---|---|---|---|---|---|
| Experimental Example | Chemical components | Slab heating temperature °C. | Rolling completion temperature °C. | Average cooling rate °C./sec | Coiling temperature °C. | Ae3* °C. | Expression (1) | Rolling reduction % | |
| 51 | O | 1245 | 890 | 8 | 628 | 890 | 21.7 | 52 | Comp.Ex. |
| 52 | O | 1215 | 896 | 47 | 603 | 890 | 8.1 | 25 | Example |
| 53 | O | 1185 | 881 | 10 | 624 | 890 | 12.1 | 59 | Example |
| 54 | P | 1235 | 928 | 22 | 572 | 851 | 2.2 | 50 | Example |
| 55 | P | 1240 | 909 | 14 | 616 | 851 | 1.9 | 42 | Example |
| 56 | P | 1215 | 925 | 75 | 552 | 851 | 1.4 | 47 | Example |
| 57 | Q | 1200 | 890 | 34 | 556 | 842 | 2.0 | 50 | Example |
| 58 | Q | 1205 | 908 | 58 | 582 | 842 | 2.2 | 36 | Example |
| 59 | Q | 1230 | 898 | 63 | 570 | 842 | 2.0 | 49 | Comp.Ex. |
| 60 | R | 1250 | 874 | 39 | 612 | 840 | 2.1 | 70 | Example |
| 61 | R | 1185 | 880 | 27 | 563 | 840 | 4.9 | 39 | Example |
| 62 | R | 1240 | 905 | 18 | 554 | 840 | 3.0 | 28 | Example |
| 63 | S | 1230 | 899 | 50 | 547 | 861 | 1.8 | 52 | Example |
| 64 | S | 1220 | 945 | 20 | 607 | 861 | 5.9 | 63 | Example |
| 65 | S | 1245 | 889 | 16 | 576 | 861 | 3.6 | 29 | Comp.Ex. |
| 66 | T | 1245 | 908 | 25 | 605 | 813 | 2.0 | 57 | Example |
| 67 | T | 1190 | 918 | 53 | 606 | 813 | 1.7 | 28 | Example |
| 68 | T | 1225 | 884 | 45 | 564 | 813 | 1.8 | 45 | Comp.Ex. |
| 69 | U | 1210 | 887 | 17 | 598 | 836 | 3.1 | 58 | Example |
| 70 | U | 1220 | 932 | 17 | 581 | 836 | 3.7 | 37 | Example |
| 71 | U | 1220 | 888 | 23 | 548 | 836 | 2.0 | 29 | Example |
| 72 | V | 1195 | 942 | 38 | 553 | 882 | 3.0 | 52 | Example |
| 73 | V | 1220 | 870 | 46 | 581 | 882 | 1.4 | 33 | Example |
| 74 | V | 1225 | 929 | 32 | 596 | 882 | 2.3 | 43 | Example |
| 75 | W | 1200 | 943 | 16 | 613 | 827 | 3.2 | 53 | Example |
| 76 | W | 1250 | 892 | 29 | 538 | 827 | 1.7 | 42 | Comp.Ex. |
| 77 | W | 1220 | 950 | 37 | 553 | 827 | 3.4 | 44 | Example |
| 78 | X | 1240 | 894 | 23 | 607 | 850 | 2.8 | 37 | Example |
| 79 | X | 1205 | 940 | 24 | 571 | 850 | 3.9 | 44 | Example |
| 80 | X | 1225 | 922 | 30 | 591 | 850 | 4.8 | 56 | Comp.Ex. |
| 81 | Y | 1225 | 891 | 21 | 557 | 853 | 2.7 | 46 | Example |
| 82 | Y | 1255 | 888 | 15 | 567 | 853 | 2.7 | 36 | Example |
| 83 | Y | 1185 | 873 | 14 | 587 | 853 | 3.1 | 63 | Example |
| 84 | Z | 1205 | 918 | 17 | 579 | 836 | 2.2 | 56 | Example |
| 85 | Z | 1200 | 922 | 16 | 582 | 836 | 1.6 | 53 | Comp.Ex. |
| 86 | Z | 1205 | 911 | 52 | 619 | 836 | 1.4 | 50 | Example |
| 87 | AA | 1235 | 938 | 22 | 601 | 850 | 4.0 | 63 | Example |
| 88 | AA | 1200 | 886 | 18 | 519 | 850 | 2.4 | 30 | Example |
| 89 | AB | 1195 | 913 | 19 | 592 | 840 | 1.9 | 58 | Example |
| 90 | AB | 1235 | 926 | 32 | 538 | 840 | 1.4 | 28 | Example |
| 91 | AB | 1180 | 882 | 49 | 496 | 840 | 1.2 | 45 | Example |
| 92 | AC | 1240 | 908 | 21 | 563 | 882 | 3.5 | 50 | Example |
| 93 | AC | 1205 | 883 | 19 | 635 | 882 | 5.5 | 56 | Example |
| 94 | AD | 1230 | 934 | 61 | 556 | 844 | 1.3 | 62 | Example |
| 95 | AD | 1195 | 906 | 57 | 551 | 844 | 1.5 | 46 | Example |
| 96 | AE | 1235 | 896 | 30 | 542 | 816 | 1.6 | 26 | Example |
| 97 | AE | 1195 | 909 | 19 | 613 | 816 | 1.4 | 53 | Example |

TABLE 8-continued

| Experimental Example | Chemical components | Hot rolling step | | | | | | Cold rolling step | |
|---|---|---|---|---|---|---|---|---|---|
| | | Slab heating temperature ° C. | Rolling completion temperature ° C. | Average cooling rate ° C./sec | Coiling temperature ° C. | Ae3* ° C. | Expression (1) | Rolling reduction % | |
| 98 | AF | 1195 | 932 | 21 | 581 | 865 | 3.2 | 63 | Example |
| 99 | AF | 1230 | 914 | 19 | 623 | 865 | 2.5 | 53 | Example |
| 100 | AG | 1185 | 889 | 48 | 569 | 838 | 1.8 | 52 | Example |

TABLE 9

| Experimental Example | Chemical components | Hot rolling step | | | | | | Cold rolling step | |
|---|---|---|---|---|---|---|---|---|---|
| | | Slab heating temperature ° C. | Rolling completion temperature ° C. | Average cooling rate ° C./sec | Coiling temperature ° C. | Ae3* ° C. | Expression (1) | Rolling reduction % | |
| 101 | AG | 1240 | 942 | 28 | 630 | 838 | 3.4 | 47 | Example |
| 102 | AH | 1245 | 916 | 19 | 610 | 826 | 3.4 | 75 | Example |
| 103 | AH | 1220 | 926 | 29 | 612 | 826 | 2.8 | 56 | Example |
| 104 | AI | 1210 | 902 | 14 | 601 | 853 | 3.0 | 55 | Example |
| 105 | AI | 1205 | 928 | 22 | 592 | 853 | 2.7 | 60 | Example |
| 106 | AJ | 1230 | 921 | 32 | 557 | 903 | 3.0 | 63 | Example |
| 107 | AJ | 1245 | 904 | 29 | 613 | 903 | 2.6 | 41 | Example |
| 108 | AK | 1235 | 913 | 65 | 545 | 825 | 1.3 | 56 | Example |
| 109 | AK | 1210 | 912 | 24 | 609 | 825 | 8.4 | 59 | Example |
| 110 | AL | 1210 | 903 | 21 | 551 | 825 | 1.5 | 42 | Example |
| 111 | AL | 1240 | 878 | 44 | 590 | 825 | 3.0 | 59 | Example |
| 112 | AM | 1235 | 938 | 16 | 588 | 915 | 6.8 | 57 | Example |
| 113 | AM | 1175 | 925 | 22 | 568 | 915 | 5.2 | 21 | Example |
| 114 | AM | 1245 | 889 | 27 | 521 | 915 | 3.5 | 36 | Example |
| 115 | AM | 1200 | 933 | 14 | 625 | 915 | 20.6 | 42 | Comp.Ex. |
| 116 | AN | 1240 | 905 | 20 | 596 | 855 | 2.4 | 66 | Example |
| 117 | AN | 1250 | 890 | 30 | 642 | 855 | 3.1 | 31 | Example |
| 118 | AO | 1225 | 916 | 48 | 585 | 842 | 1.8 | 60 | Example |
| 119 | AO | 1225 | 912 | 16 | 555 | 842 | 1.8 | 40 | Example |
| 120 | AP | 1230 | 905 | 26 | 598 | 830 | 1.7 | 59 | Example |
| 121 | AP | 1215 | 897 | 29 | 550 | 830 | 1.5 | 50 | Example |
| 122 | AP | 1245 | 959 | 38 | 532 | 830 | 1.4 | 49 | Example |
| 123 | AQ | 1235 | 873 | 11 | 599 | 867 | 3.2 | 63 | Example |
| 124 | AQ | 1220 | 936 | 19 | 538 | 867 | 2.6 | 58 | Example |
| 125 | AR | 1190 | 916 | 15 | 593 | 844 | 2.5 | 50 | Example |
| 126 | AR | 1235 | 929 | 73 | 512 | 844 | 1.0 | 38 | Example |
| 127 | AS | 1210 | 906 | 20 | 575 | 847 | 2.7 | 40 | Example |
| 128 | AS | 1245 | 934 | 24 | 534 | 847 | 1.6 | 62 | Example |
| 129 | AT | 1235 | 913 | 22 | 575 | 832 | 2.0 | 58 | Example |
| 130 | AT | 1210 | 927 | 42 | 621 | 832 | 3.0 | 52 | Example |
| 131 | AU | 1180 | 919 | 17 | 571 | 839 | 2.2 | 46 | Example |
| 132 | AU | 1205 | 881 | 44 | 480 | 839 | 0.7 | 35 | Comp.Ex. |
| 133 | AU | 1255 | 873 | 21 | 540 | 839 | 1.3 | 41 | Example |
| 134 | AU | 1230 | 902 | 18 | 535 | 839 | 2.7 | 49 | Example |
| 135 | AV | 1235 | 915 | 28 | 600 | 874 | 3.5 | 64 | Example |
| 136 | AV | 1195 | 924 | 52 | 535 | 874 | 2.1 | 43 | Comp.Ex. |
| 137 | AV | 1210 | 926 | 27 | 630 | 874 | 4.2 | 68 | Example |
| 138 | AW | 1200 | 878 | 16 | 560 | 847 | 2.4 | 69 | Example |
| 139 | AW | 1230 | 886 | 21 | 539 | 847 | 1.6 | 61 | Comp.Ex. |
| 140 | AW | 1225 | 954 | 17 | 622 | 847 | 3.5 | 37 | Example |
| 141 | AX | 1230 | 939 | 27 | 606 | 813 | 2.0 | 48 | Example |
| 142 | AX | 1205 | 918 | 53 | 497 | 813 | 1.0 | 53 | Example |
| 143 | AY | 1215 | 942 | 31 | 562 | 869 | 2.7 | 42 | Example |
| 144 | AY | 1210 | 962 | 21 | 538 | 869 | 9.1 | 44 | Example |
| 145 | AZ | 1230 | 896 | 27 | 571 | 845 | 2.0 | 74 | Example |
| 146 | AZ | 1245 | 926 | 15 | 608 | 845 | 2.8 | 56 | Example |
| 147 | BA | 1215 | 869 | 25 | 564 | 861 | 2.4 | 56 | Example |
| 148 | BA | 1180 | 895 | 27 | 583 | 861 | 3.0 | 41 | Example |
| 149 | BB | 1215 | 908 | 25 | 594 | 825 | 3.1 | 52 | Example |
| 150 | BB | 1170 | 914 | 17 | 553 | 825 | 3.0 | 56 | Comp.Ex. |

TABLE 10

| Experimental Example | Chemical components | Hot rolling step | | | | | | Cold rolling step | |
|---|---|---|---|---|---|---|---|---|---|
| | | Slab heating temperature °C. | Rolling completion temperature °C. | Average cooling rate °C./sec | Coiling temperature °C. | Ae3* °C. | Expression (1) | Rolling reduction % | |
| 151 | BB | 1235 | 907 | 15 | 574 | 825 | 3.0 | 5 | Example |
| 152 | BB | 1185 | 911 | 51 | 551 | 825 | 2.5 | 61 | Example |
| 153 | BC | 1190 | 920 | 70 | 545 | 828 | 1.0 | 73 | Example |
| 154 | BC | 1215 | 879 | 63 | 534 | 828 | 0.9 | 59 | Example |
| 155 | BC | 1200 | 899 | 55 | 591 | 828 | 1.5 | 55 | Example |
| 156 | BC | 1250 | 913 | 28 | 572 | 828 | 1.4 | 1 | Example |
| 157 | BC | 1235 | 882 | 55 | 538 | 828 | <u>0.6</u> | 44 | Comp.Ex. |
| 158 | BD | 1240 | 906 | 23 | 553 | 838 | 1.9 | 50 | Example |
| 159 | BD | 1235 | 938 | 16 | 606 | 838 | 2.6 | 43 | Example |
| 160 | BE | 1230 | 894 | 32 | 568 | 845 | 1.9 | 58 | Example |
| 161 | BE | 1230 | 898 | 16 | 565 | 845 | 2.0 | 41 | Example |
| 162 | BF | 1230 | 914 | 34 | 571 | 867 | 2.8 | 60 | Example |
| 163 | BF | 1190 | 931 | 66 | 577 | 867 | 1.5 | 48 | Example |
| 164 | BF | 1210 | 912 | 27 | 598 | 867 | 2.9 | 38 | Example |
| 165 | BF | 1195 | 903 | 16 | 573 | 867 | 3.6 | 51 | Comp.Ex. |
| 166 | BG | 1250 | 904 | 45 | 573 | 896 | 3.6 | 74 | Example |
| 167 | BG | 1175 | 927 | 21 | 590 | 896 | 7.3 | 25 | Example |
| 168 | BG | 1235 | 908 | 19 | 621 | 896 | <u>20.3</u> | 59 | Comp.Ex. |
| 169 | BG | 1215 | 879 | 28 | 589 | 896 | 3.5 | 62 | Example |
| 170 | BH | 1225 | 886 | 19 | 566 | 854 | 2.7 | 63 | Example |
| 171 | BH | 1195 | 904 | 29 | 563 | 854 | 1.7 | 27 | Comp.Ex. |
| 172 | BH | 1215 | 936 | 58 | 602 | 854 | 2.1 | 49 | Example |
| 173 | BH | 1240 | 882 | 61 | 574 | 854 | 1.7 | 48 | Example |
| 174 | BI | 1210 | 939 | 55 | 558 | 908 | 4.0 | 38 | Example |
| 175 | BI | 1195 | 898 | 25 | 516 | 908 | 7.9 | 69 | Example |
| 176 | BJ | 1245 | 893 | 48 | 595 | 863 | 2.1 | 55 | Example |
| 177 | BJ | 1195 | 881 | 52 | 528 | 863 | 1.8 | 46 | Comp.Ex. |
| 178 | BJ | 1225 | 920 | 35 | 559 | 863 | 3.1 | 46 | Example |
| 179 | BK | 1220 | 914 | 52 | 618 | 849 | 2.0 | 61 | Example |
| 180 | BK | 1235 | 911 | 62 | 581 | 849 | 2.6 | 57 | Example |
| 181 | BL | 1190 | 905 | 19 | 604 | 820 | 2.6 | 68 | Example |
| 182 | BL | 1185 | 912 | 46 | 582 | 820 | 2.4 | 46 | Example |
| 183 | BL | 1245 | 916 | 18 | 555 | 820 | 1.9 | 39 | Comp.Ex. |
| 184 | BL | 1210 | 890 | 56 | 575 | 820 | 1.3 | 65 | Example |
| 185 | BM | 1215 | 925 | 28 | 589 | 914 | 5.7 | 42 | Example |
| 186 | BM | 1250 | 903 | 53 | 601 | 914 | 13.9 | 50 | Comp.Ex. |
| 187 | BM | 1215 | 944 | 12 | 637 | 914 | 15.4 | 45 | Example |
| 188 | BN | 1240 | 890 | 18 | 605 | 867 | 2.5 | 50 | Example |
| 189 | BN | 1220 | 946 | 32 | 548 | 867 | 2.7 | 57 | Example |
| 190 | BO | 1225 | 939 | 24 | 575 | 840 | 2.9 | 56 | Comp.Ex. |
| 191 | BP | 1250 | 893 | 57 | 578 | 839 | 1.9 | 52 | Comp.Ex. |
| 192 | BQ | 1220 | 907 | 29 | 574 | 828 | 1.4 | 59 | Comp.Ex. |
| 193 | BR | Experiment stopped due to occurrence of cracking of slab during heating in hot rolling step | | | | | | | Comp.Ex. |
| 194 | BS | 1180 | 909 | 16 | 555 | 905 | 5.4 | 53 | Comp.Ex. |
| 195 | BT | Experiment stopped due to occurrence of cracking of slab during heating in hot rolling step | | | | | | | Comp.Ex. |
| 196 | BU | Experiment stopped due to occurrence of cracking of slab during heating in hot rolling step | | | | | | | Comp.Ex. |
| 197 | BV | 1225 | 939 | 23 | 561 | 847 | 2.1 | 62 | Comp.Ex. |
| 198 | BW | Experiment stopped due to occurrence of cracking of slab during transportation after casting of slab | | | | | | | Comp.Ex. |
| 199 | BX | 1245 | 876 | 47 | 583 | 838 | 1.7 | 50 | Comp.Ex. |
| 200 | BY | 1215 | 916 | 50 | 594 | 836 | 2.9 | 40 | Comp.Ex. |
| 201 | A | 1205 | 913 | 22 | 538 | 863 | 2.2 | 63 | Comp.Ex. |

TABLE 11

| Experimental Example | Chemical components | Annealing step Heating step | | | | | | Preheating zone Air ratio | Reduction zone P(H2O)/P(H2) | |
|---|---|---|---|---|---|---|---|---|---|---|
| | | Average heating rate °C./sec | Maximum heating temperature Tm °C. | Ac3 °C. | Ac3 − $T_M$ °C. | Ac1 °C. | $T_M$ − Ac1 °C. | | | |
| 1 | A | 2.5 | 813 | 861 | 48 | 712 | 101 | 1.0 | 0.45 | Example |
| 2 | A | 2.6 | 801 | 861 | 60 | 712 | 89 | 1.1 | 0.71 | Comp.Ex. |
| 3 | A | 1.3 | 796 | 861 | 65 | 712 | 84 | 0.8 | 0.52 | Example |
| 4 | A | 2.0 | 809 | 861 | 52 | 712 | 97 | 0.9 | 0.63 | Example |
| 5 | B | 2.3 | 805 | 852 | 47 | 693 | 112 | 1.1 | 0.86 | Example |
| 6 | B | 2.4 | 797 | 852 | 55 | 693 | 104 | 1.1 | 0.71 | Example |
| 7 | B | 2.9 | 829 | 852 | 23 | 693 | 136 | 0.9 | 1.17 | Example |
| 8 | B | 2.4 | 794 | 852 | 58 | 693 | 101 | 0.9 | 0.004 | Example |

TABLE 11-continued

| | | Annealing step Heating step | | | | | | | | |
|---|---|---|---|---|---|---|---|---|---|---|
| Experimental Example | Chemical components | Average heating rate ° C./sec | Maximum heating temperature Tm ° C. | Ac3 ° C. | Ac3 − $T_M$ ° C. | Ac1 ° C. | $T_M$ − Ac1 ° C. | Preheating zone Air ratio | Reduction zone P(H2O)/P(H2) | |
| 9 | C | 1.9 | 805 | 847 | 42 | 703 | 102 | 0.9 | 0.73 | Example |
| 10 | C | 3.3 | 789 | 847 | 58 | 703 | 86 | 1.0 | 0.27 | Example |
| 11 | C | 2.5 | 789 | 847 | 58 | 703 | 86 | 0.9 | 0.57 | Example |
| 12 | C | 2.7 | 791 | 847 | 56 | 703 | 88 | 1.0 | 0.86 | Comp.Ex. |
| 13 | D | 3.3 | 831 | 892 | 61 | 728 | 103 | 1.1 | 0.76 | Example |
| 14 | D | 4.0 | 810 | 892 | 82 | 728 | 82 | 1.4 | 0.55 | Comp.Ex. |
| 15 | D | 2.0 | 819 | 892 | 73 | 728 | 91 | 1.0 | 0.87 | Example |
| 16 | D | 2.2 | 817 | 892 | 75 | 728 | 89 | 1.0 | 0.66 | Example |
| 17 | E | 2.0 | 825 | 867 | 42 | 733 | 92 | 1.0 | 0.54 | Example |
| 18 | E | 2.3 | 799 | 867 | 68 | 733 | 66 | 1.1 | 0.92 | Example |
| 19 | E | 2.1 | 812 | 867 | 55 | 733 | 79 | 0.9 | 1.11 | Example |
| 20 | E | 2.8 | 816 | 867 | 51 | 733 | 83 | 1.0 | 0.81 | Comp.Ex. |
| 21 | F | 2.0 | 777 | 824 | 47 | 686 | 91 | 0.9 | 0.62 | Example |
| 22 | F | 2.4 | 768 | 824 | 56 | 686 | 82 | 1.0 | 0.63 | Example |
| 23 | F | 1.6 | 771 | 824 | 53 | 686 | 85 | 0.8 | 0.25 | Example |
| 24 | F | 2.2 | 768 | 824 | 56 | 686 | 82 | 1.0 | 1.65 | Example |
| 25 | G | 1.8 | 790 | 818 | 28 | 689 | 101 | 0.9 | 0.52 | Example |
| 26 | G | 1.5 | 787 | 818 | 31 | 689 | 98 | 1.0 | 0.89 | Example |
| 27 | G | 1.6 | 771 | 818 | 47 | 689 | 82 | 0.9 | 0.46 | Comp.Ex. |
| 28 | G | 2.8 | 813 | 818 | 5 | 689 | 124 | 0.8 | 0.81 | Example |
| 29 | H | 2.1 | 797 | 856 | 59 | 696 | 101 | 1.0 | 0.61 | Example |
| 30 | H | 2.6 | 781 | 856 | 75 | 696 | 85 | 0.9 | 0.14 | Example |
| 31 | H | 1.6 | 799 | 856 | 57 | 696 | 103 | 0.8 | 0.72 | Example |
| 32 | I | 3.2 | 874 | 987 | 113 | 724 | 150 | 0.9 | 0.77 | Example |
| 33 | I | 1.5 | 865 | 987 | 122 | 724 | 141 | 1.2 | 0.16 | Example |
| 34 | I | 1.2 | 768 | 987 | 219 | 724 | 44 | 0.8 | 0.43 | Example |
| 35 | J | 2.3 | 799 | 839 | 40 | 719 | 80 | 1.0 | 0.93 | Example |
| 36 | J | 3.3 | 787 | 839 | 52 | 719 | 68 | 0.7 | 0.65 | Example |
| 37 | J | 1.8 | 794 | 839 | 45 | 719 | 75 | 1.1 | 0.001 | Example |
| 38 | K | 1.8 | 790 | 808 | 18 | 690 | 100 | 0.8 | 0.40 | Example |
| 39 | K | 1.8 | 768 | 808 | 40 | 690 | 78 | 0.7 | 0.41 | Example |
| 40 | K | 2.6 | 765 | 808 | 43 | 690 | 75 | 1.0 | 0.88 | Example |
| 41 | L | 2.3 | 815 | 843 | 28 | 704 | 111 | 1.0 | 0.68 | Example |
| 42 | L | 2.1 | 829 | 843 | 14 | 704 | 125 | 0.8 | 0.53 | Example |
| 43 | L | 3.0 | 794 | 843 | 49 | 704 | 90 | 1.0 | 0.67 | Comp.Ex. |
| 44 | M | 2.1 | 808 | 864 | 56 | 703 | 105 | 1.0 | 0.64 | Example |
| 45 | M | 1.7 | 804 | 864 | 60 | 703 | 101 | 1.0 | 0.63 | Example |
| 46 | M | 1.5 | 791 | 864 | 73 | 703 | 88 | 0.5 | 0.73 | Comp.Ex. |
| 47 | N | 2.3 | 785 | 811 | 26 | 698 | 87 | 0.9 | 0.89 | Example |
| 48 | N | 2.1 | 785 | 811 | 26 | 698 | 87 | 0.9 | 0.87 | Example |
| 49 | N | 2.6 | 768 | 811 | 43 | 698 | 70 | 1.0 | 0.79 | Comp.Ex. |
| 50 | O | 2.4 | 828 | 898 | 70 | 729 | 99 | 1.1 | 0.52 | Example |

TABLE 12

| | | Annealing step Heating step | | | | | | | | |
|---|---|---|---|---|---|---|---|---|---|---|
| Experimental Example | Chemical components | Average heating rate ° C./sec | Maximum heating temperature Tm ° C. | Ac3 ° C. | Ac3 − $T_M$ ° C. | Ac1 ° C. | $T_M$ − Ac1 ° C. | Preheating zone Air ratio | Reduction zone P(H2O)/P(H2) | |
| 51 | O | 3.0 | 830 | 898 | 68 | 729 | 101 | 0.9 | 0.43 | Comp.Ex. |
| 52 | O | 3.2 | 812 | 898 | 86 | 729 | 83 | 0.9 | 0.74 | Example |
| 53 | O | 2.9 | 813 | 898 | 85 | 729 | 84 | 1.1 | 0.88 | Example |
| 54 | P | 2.9 | 802 | 868 | 66 | 701 | 101 | 1.0 | 0.62 | Example |
| 55 | P | 3.6 | 794 | 868 | 74 | 701 | 93 | 0.9 | 0.01 | Example |
| 56 | P | 3.1 | 801 | 868 | 67 | 701 | 100 | 0.8 | 0.69 | Example |
| 57 | Q | 2.3 | 804 | 835 | 31 | 693 | 111 | 0.8 | 0.73 | Example |
| 58 | Q | 3.3 | 782 | 835 | 53 | 693 | 89 | 1.0 | 0.75 | Example |
| 59 | Q | 2.6 | 794 | 835 | 41 | 693 | 101 | 0.9 | 0.93 | Comp.Ex. |
| 60 | R | 1.7 | 798 | 843 | 45 | 690 | 108 | 0.9 | 0.79 | Example |
| 61 | R | 1.6 | 790 | 843 | 53 | 690 | 100 | 1.1 | 0.61 | Example |
| 62 | R | 3.6 | 787 | 843 | 56 | 690 | 97 | 0.9 | 0.86 | Example |
| 63 | S | 2.1 | 810 | 831 | 21 | 713 | 97 | 0.8 | 0.99 | Example |
| 64 | S | 2.0 | 787 | 831 | 44 | 713 | 74 | 1.1 | 0.45 | Example |
| 65 | S | 1.9 | 789 | 831 | 42 | 713 | 76 | 1.1 | 0.73 | Comp.Ex. |
| 66 | T | 2.1 | 769 | 811 | 42 | 677 | 92 | 1.0 | 0.65 | Example |
| 67 | T | 2.0 | 794 | 811 | 17 | 677 | 117 | 1.0 | 0.82 | Example |
| 68 | T | 2.5 | 828 | 811 | −17 | 677 | 151 | 1.0 | 0.67 | Comp.Ex. |

TABLE 12-continued

| | | Annealing step Heating step | | | | | | | | |
|---|---|---|---|---|---|---|---|---|---|---|
| Experimental Example | Chemical components | Average heating rate °C./sec | Maximum heating temperature Tm °C. | Ac3 °C. | Ac3 − T$_M$ °C. | Ac1 °C. | T$_M$ − Ac1 °C. | Preheating zone Air ratio | Reduction zone P(H2O)/P(H2) | |
| 69 | U | 2.7 | 793 | 837 | 44 | 690 | 103 | 1.0 | 0.67 | Example |
| 70 | U | 2.6 | 775 | 837 | 62 | 690 | 85 | 0.9 | 0.44 | Example |
| 71 | U | 2.5 | 771 | 837 | 66 | 690 | 81 | 0.9 | 0.42 | Example |
| 72 | V | 2.3 | 817 | 883 | 66 | 720 | 97 | 1.0 | 0.55 | Example |
| 73 | V | 3.8 | 818 | 883 | 65 | 720 | 98 | 1.1 | 0.74 | Example |
| 74 | V | 2.8 | 816 | 883 | 67 | 720 | 96 | 1.0 | 0.71 | Example |
| 75 | W | 3.0 | 786 | 836 | 50 | 685 | 101 | 1.0 | 0.79 | Example |
| 76 | W | 2.0 | 778 | 836 | 58 | 685 | 93 | 1.0 | 3.20 | Comp.Ex. |
| 77 | W | 1.7 | 781 | 836 | 55 | 685 | 96 | 1.0 | 0.83 | Example |
| 78 | X | 1.9 | 808 | 860 | 52 | 699 | 109 | 1.0 | 0.92 | Example |
| 79 | X | 3.0 | 796 | 860 | 64 | 699 | 97 | 1.0 | 0.91 | Example |
| 80 | X | 2.0 | 796 | 860 | 64 | 699 | 97 | 0.9 | 1.15 | Comp.Ex. |
| 81 | Y | 2.5 | 818 | 852 | 34 | 704 | 114 | 0.9 | 0.80 | Example |
| 82 | Y | 1.8 | 802 | 852 | 50 | 704 | 98 | 0.9 | 0.90 | Example |
| 83 | Y | 2.4 | 789 | 852 | 63 | 704 | 85 | 1.0 | 0.26 | Example |
| 84 | Z | 3.0 | 803 | 849 | 46 | 698 | 105 | 0.9 | 0.85 | Example |
| 85 | Z | 0.6 | 773 | 849 | 76 | 698 | 75 | 0.9 | 0.75 | Comp.Ex. |
| 86 | Z | 2.9 | 790 | 849 | 59 | 698 | 92 | 0.9 | 0.78 | Example |
| 87 | AA | 2.4 | 813 | 841 | 28 | 703 | 110 | 1.2 | 0.56 | Example |
| 88 | AA | 2.4 | 783 | 841 | 58 | 703 | 80 | 1.0 | 0.46 | Example |
| 89 | AB | 2.5 | 793 | 832 | 39 | 695 | 98 | 0.9 | 0.74 | Example |
| 90 | AB | 2.2 | 782 | 832 | 50 | 695 | 87 | 1.0 | 0.74 | Example |
| 91 | AB | 1.6 | 794 | 832 | 38 | 695 | 99 | 0.9 | 0.16 | Example |
| 92 | AC | 2.1 | 834 | 886 | 52 | 720 | 114 | 0.9 | 0.68 | Example |
| 93 | AC | 2.4 | 806 | 886 | 80 | 720 | 86 | 0.8 | 0.83 | Example |
| 94 | AD | 2.7 | 795 | 839 | 44 | 702 | 93 | 0.8 | 0.73 | Example |
| 95 | AD | 2.1 | 793 | 839 | 46 | 702 | 91 | 1.1 | 0.81 | Example |
| 96 | AE | 1.7 | 774 | 821 | 47 | 675 | 99 | 1.0 | 0.70 | Example |
| 97 | AE | 3.2 | 782 | 821 | 39 | 675 | 107 | 0.8 | 0.77 | Example |
| 98 | AF | 1.9 | 822 | 868 | 46 | 711 | 111 | 0.9 | 0.89 | Example |
| 99 | AF | 1.9 | 806 | 868 | 62 | 711 | 95 | 0.9 | 0.86 | Example |
| 100 | AG | 3.0 | 795 | 828 | 33 | 694 | 101 | 1.0 | 0.61 | Example |

TABLE 13

| | | Annealing step Heating step | | | | | | | | |
|---|---|---|---|---|---|---|---|---|---|---|
| Experimental Example | Chemical components | Average heating rate °C./sec | Maximum heating temperature Tm °C. | Ac3 °C. | Ac3 − T$_M$ °C. | Ac1 °C. | T$_M$ − Ac1 °C. | Preheating zone Air ratio | Reduction zone P(H2O)/P(H2) | |
| 101 | AG | 1.2 | 786 | 828 | 42 | 694 | 92 | 0.8 | 0.94 | Example |
| 102 | AH | 2.2 | 784 | 822 | 38 | 689 | 95 | 1.0 | 0.70 | Example |
| 103 | AH | 2.5 | 777 | 822 | 45 | 689 | 88 | 0.8 | 0.48 | Example |
| 104 | AI | 2.9 | 802 | 820 | 18 | 745 | 57 | 1.1 | 0.59 | Example |
| 105 | AI | 2.6 | 772 | 820 | 48 | 745 | 27 | 0.8 | 0.84 | Example |
| 106 | AJ | 1.6 | 820 | 872 | 52 | 720 | 100 | 0.9 | 0.74 | Example |
| 107 | AJ | 2.2 | 807 | 872 | 65 | 720 | 87 | 0.9 | 0.83 | Example |
| 108 | AK | 2.4 | 773 | 819 | 46 | 686 | 87 | 1.0 | 0.77 | Example |
| 109 | AK | 2.2 | 782 | 819 | 37 | 686 | 96 | 0.9 | 0.80 | Example |
| 110 | AL | 2.1 | 793 | 828 | 35 | 684 | 109 | 0.9 | 0.89 | Example |
| 111 | AL | 2.7 | 776 | 828 | 52 | 684 | 92 | 1.0 | 0.73 | Example |
| 112 | AM | 2.5 | 831 | 880 | 49 | 750 | 81 | 1.0 | 0.71 | Example |
| 113 | AM | 1.9 | 811 | 880 | 69 | 750 | 61 | 0.9 | 0.57 | Example |
| 114 | AM | 2.3 | 853 | 880 | 27 | 750 | 103 | 1.0 | 0.62 | Example |
| 115 | AM | 2.5 | 824 | 880 | 56 | 750 | 74 | 0.8 | 0.98 | Comp.Ex. |
| 116 | AN | 2.7 | 796 | 835 | 39 | 708 | 88 | 0.8 | 0.65 | Example |
| 117 | AN | 2.8 | 786 | 835 | 49 | 708 | 78 | 0.7 | 0.47 | Example |
| 118 | AO | 3.6 | 805 | 836 | 31 | 707 | 98 | 1.0 | 0.41 | Example |
| 119 | AO | 1.8 | 781 | 836 | 55 | 707 | 74 | 1.1 | 0.58 | Example |
| 120 | AP | 2.3 | 790 | 815 | 25 | 691 | 99 | 1.0 | 0.74 | Example |
| 121 | AP | 2.3 | 772 | 815 | 43 | 691 | 81 | 0.9 | 0.44 | Example |
| 122 | AP | 1.9 | 779 | 815 | 36 | 691 | 88 | 0.8 | 0.79 | Example |
| 123 | AQ | 3.6 | 795 | 855 | 60 | 713 | 82 | 1.1 | 0.93 | Example |
| 124 | AQ | 2.0 | 796 | 855 | 59 | 713 | 83 | 1.1 | 0.78 | Example |
| 125 | AR | 2.2 | 800 | 846 | 46 | 696 | 104 | 1.0 | 0.96 | Example |
| 126 | AR | 2.6 | 785 | 846 | 61 | 696 | 89 | 1.1 | 0.59 | Example |
| 127 | AS | 3.0 | 815 | 845 | 30 | 707 | 108 | 1.1 | 0.63 | Example |
| 128 | AS | 3.5 | 788 | 845 | 57 | 707 | 81 | 1.0 | 0.52 | Example |

TABLE 13-continued

| Experimental Example | Chemical components | Annealing step Heating step ||||||| Preheating zone Air ratio | Reduction zone P(H2O)/ P(H2) | |
|---|---|---|---|---|---|---|---|---|---|---|
| | | Average heating rate °C./sec | Maximum heating temperature Tm °C. | Ac3 °C. | Ac3 − $T_M$ °C. | Ac1 °C. | $T_M$ − Ac1 °C. | | | |
| 129 | AT | 2.9 | 785 | 840 | 55 | 687 | 98 | 1.0 | 0.99 | Example |
| 130 | AT | 1.5 | 777 | 840 | 63 | 687 | 90 | 1.0 | 0.56 | Example |
| 131 | AU | 2.2 | 805 | 845 | 40 | 695 | 110 | 0.9 | 0.62 | Example |
| 132 | AU | 1.7 | 787 | 845 | 58 | 695 | 92 | 1.0 | 0.41 | Comp.Ex. |
| 133 | AU | 2.2 | 795 | 845 | 50 | 695 | 100 | 1.0 | 0.02 | Example |
| 134 | AU | 2.1 | 793 | 845 | 52 | 695 | 98 | 0.9 | 0.69 | Example |
| 135 | AV | 3.3 | 827 | 863 | 36 | 722 | 105 | 0.9 | 0.76 | Example |
| 136 | AV | 3.0 | 804 | 863 | 59 | 722 | 82 | 1.2 | 0.50 | Comp.Ex. |
| 137 | AV | 3.4 | 801 | 863 | 62 | 722 | 79 | 1.0 | 0.51 | Example |
| 138 | AW | 3.0 | 799 | 839 | 40 | 696 | 103 | 0.9 | 0.58 | Example |
| 139 | AW | 2.2 | 792 | 839 | 47 | 696 | 96 | 1.1 | 0.71 | Comp.Ex. |
| 140 | AW | 4.4 | 777 | 839 | 62 | 696 | 81 | 1.0 | 1.12 | Example |
| 141 | AX | 3.6 | 785 | 827 | 42 | 682 | 103 | 1.0 | 0.63 | Example |
| 142 | AX | 2.1 | 774 | 827 | 53 | 682 | 92 | 0.9 | 0.86 | Example |
| 143 | AY | 2.2 | 809 | 845 | 36 | 716 | 93 | 0.8 | 0.97 | Example |
| 144 | AY | 2.8 | 795 | 845 | 50 | 716 | 79 | 1.0 | 0.62 | Example |
| 145 | AZ | 1.8 | 793 | 857 | 64 | 699 | 94 | 0.8 | 0.60 | Example |
| 146 | AZ | 2.5 | 796 | 857 | 61 | 699 | 97 | 0.9 | 0.47 | Example |
| 147 | BA | 3.3 | 803 | 850 | 47 | 708 | 95 | 0.9 | 0.45 | Example |
| 148 | BA | 2.8 | 789 | 850 | 61 | 708 | 81 | 1.0 | 1.08 | Example |
| 149 | BB | 2.1 | 785 | 820 | 35 | 682 | 103 | 0.9 | 0.79 | Example |
| 150 | BB | 2.5 | 782 | 820 | 38 | 682 | 100 | 1.0 | 0.72 | Comp.Ex. |

TABLE 14

| Experimental Example | Chemical components | Annealing step Heating step ||||||| Preheating zone Air ratio | Reduction zone P(H2O)/ P(H2) | |
|---|---|---|---|---|---|---|---|---|---|---|
| | | Average heating rate °C./sec | Maximum heating temperature Tm °C. | Ac3 °C. | Ac3 − $T_M$ °C. | Ac1 °C. | $T_M$ − Ac1 °C. | | | |
| 151 | BB | 1.5 | 775 | 820 | 45 | 682 | 93 | 0.8 | 0.81 | Example |
| 152 | BB | 1.6 | 772 | 820 | 48 | 682 | 90 | 1.1 | 0.83 | Example |
| 153 | BC | 2.3 | 787 | 836 | 49 | 688 | 99 | 1.0 | 0.71 | Example |
| 154 | BC | 2.8 | 796 | 836 | 40 | 688 | 108 | 0.9 | 0.86 | Example |
| 155 | BC | 3.9 | 785 | 836 | 51 | 688 | 97 | 0.9 | 1.31 | Example |
| 156 | BC | 2.8 | 780 | 836 | 56 | 688 | 92 | 0.9 | 0.83 | Example |
| 157 | BC | 2.5 | 792 | 836 | 44 | 688 | 104 | 1.1 | 0.77 | Comp.Ex. |
| 158 | BD | 2.3 | 798 | 832 | 34 | 698 | 100 | 0.9 | 0.64 | Example |
| 159 | BD | 1.8 | 780 | 832 | 52 | 698 | 82 | 0.8 | 0.52 | Example |
| 160 | BE | 3.4 | 802 | 855 | 53 | 696 | 106 | 1.0 | 0.83 | Example |
| 161 | BE | 2.8 | 802 | 855 | 53 | 696 | 106 | 1.2 | 0.76 | Example |
| 162 | BF | 2.7 | 797 | 845 | 48 | 712 | 85 | 1.0 | 0.76 | Example |
| 163 | BF | 1.9 | 785 | 845 | 60 | 712 | 73 | 1.0 | 0.01 | Example |
| 164 | BF | 2.4 | 794 | 845 | 51 | 712 | 82 | 1.0 | 0.88 | Example |
| 165 | BF | 2.6 | 805 | 845 | 40 | 712 | 93 | 1.1 | 0.68 | Comp.Ex. |
| 166 | BG | 2.9 | 839 | 901 | 62 | 736 | 103 | 1.1 | 0.85 | Example |
| 167 | BG | 2.5 | 824 | 901 | 77 | 736 | 88 | 0.8 | 0.63 | Example |
| 168 | BG | 2.0 | 816 | 901 | 85 | 736 | 80 | 1.1 | 0.79 | Comp.Ex. |
| 169 | BG | 2.4 | 813 | 901 | 88 | 736 | 77 | 1.2 | 0.58 | Example |
| 170 | BH | 2.7 | 792 | 837 | 45 | 696 | 96 | 3.0 | 0.76 | Example |
| 171 | BH | 3.5 | 782 | 837 | 55 | 696 | 86 | 1.0 | 0.0000 | Comp.Ex. |
| 172 | BH | 2.2 | 792 | 837 | 45 | 696 | 96 | 0.9 | 0.43 | Example |
| 173 | BH | 3.2 | 783 | 837 | 54 | 696 | 87 | 1.0 | 0.47 | Example |
| 174 | BI | 3.0 | 860 | 936 | 76 | 741 | 119 | 1.0 | 0.63 | Example |
| 175 | BI | 2.5 | 830 | 936 | 106 | 741 | 89 | 0.9 | 0.83 | Example |
| 176 | BJ | 2.2 | 816 | 865 | 49 | 715 | 101 | 1.0 | 0.68 | Example |
| 177 | BJ | 3.7 | 810 | 865 | 55 | 715 | 95 | 0.0 | 0.59 | Comp.Ex. |
| 178 | BJ | 2.1 | 806 | 865 | 59 | 715 | 91 | 1.0 | 0.60 | Example |
| 179 | BK | 2.5 | 793 | 845 | 52 | 701 | 92 | 1.1 | 0.84 | Example |
| 180 | BK | 4.1 | 792 | 845 | 53 | 701 | 91 | 0.9 | 0.53 | Example |
| 181 | BL | 3.0 | 783 | 833 | 50 | 681 | 102 | 1.0 | 0.47 | Example |
| 182 | BL | 3.0 | 774 | 833 | 59 | 681 | 93 | 0.7 | 0.52 | Example |
| 183 | BL | 1.4 | 773 | 833 | 60 | 681 | 92 | 1.0 | 0.74 | Comp.Ex. |
| 184 | BL | 1.5 | 783 | 833 | 50 | 681 | 102 | 1.0 | 0.01 | Example |
| 185 | BM | 3.2 | 836 | 917 | 81 | 746 | 90 | 0.9 | 0.72 | Example |
| 186 | BM | 2.4 | 763 | 917 | 154 | 746 | 17 | 1.1 | 0.50 | Comp.Ex. |
| 187 | BM | 2.9 | 837 | 917 | 80 | 746 | 91 | 0.8 | 0.93 | Example |
| 188 | BN | 2.2 | 815 | 861 | 46 | 710 | 105 | 1.0 | 0.85 | Example |

TABLE 14-continued

| | | Annealing step Heating step | | | | | | | | |
|---|---|---|---|---|---|---|---|---|---|---|
| Experimental Example | Chemical components | Average heating rate °C./sec | Maximum heating temperature Tm °C. | Ac3 °C. | Ac3 − $T_M$ °C. | Ac1 °C. | $T_M$ − Ac1 °C. | Preheating zone Air ratio | Reduction zone P(H2O)/ P(H2) | |
| 189 | BN | 2.2 | 798 | 861 | 63 | 710 | 88 | 0.9 | 0.65 | Example |
| 190 | BO | 2.2 | 845 | 884 | 39 | 792 | 53 | 1.0 | 0.59 | Comp.Ex. |
| 191 | BP | 2.9 | 777 | 782 | 5 | 690 | 87 | 0.9 | 0.71 | Comp.Ex. |
| 192 | BQ | 2.9 | 794 | 824 | 30 | 686 | 108 | 0.9 | 0.65 | Comp.Ex. |
| 193 | BR | Experiment stopped due to occurrence of cracking of slab during heating in hot rolling step | | | | | | | | Comp.Ex. |
| 194 | BS | 2.4 | 825 | 892 | 67 | 737 | 88 | 1.0 | 0.54 | Comp.Ex. |
| 195 | BT | Experiment stopped due to occurrence of cracking of slab during heating in hot rolling step | | | | | | | | Comp.Ex. |
| 196 | BU | Experiment stopped due to occurrence of cracking of slab during hot rolling in hot rolling step | | | | | | | | Comp.Ex. |
| 197 | BV | 1.9 | 810 | 835 | 25 | 703 | 107 | 0.8 | 0.83 | Comp.Ex. |
| 198 | BW | Experiment stopped due to occurrence of cracking of slab during transportation after casting of slab | | | | | | | | Comp.Ex. |
| 199 | BX | 2.7 | 804 | 831 | 27 | 693 | 111 | 1.1 | 0.45 | Comp.Ex. |
| 200 | BY | 2.6 | 800 | 827 | 27 | 694 | 106 | 1.1 | 0.73 | Comp.Ex. |
| 201 | A | 2.0 | 813 | 861 | 48 | 712 | 101 | 1.0 | 2.25 | Comp.Ex. |

TABLE 15

| | | Annealing step Cooling step | | | | | | | Plating step Plating bath | | |
|---|---|---|---|---|---|---|---|---|---|---|---|
| | | | | | Martensitic transformation treatment | | Bainitic transformation treatment 1 | | Amount of | | Steel sheet | |
| Experimental Example | Chemical components | Cooling rate 1 °C./sec | Cooling rate 2 °C./sec | Ms point °C. | Average temperature °C. | Treatment time sec | Average temperature °C. | Treatment time sec | effective Al % by mass | Bath temperature °C. | entering temperature °C. | |
| 1 | A | 1.3 | 4.2 | 364 | — | — | — | — | 0.084 | 459 | 467 | Example |
| 2 | A | 1.6 | 5.4 | 350 | — | — | — | — | 0.042 | 460 | 462 | Comp.Ex. |
| 3 | A | 1.3 | 37.0 | 323 | — | — | 460 | 39 | 0.095 | 460 | 456 | Example |
| 4 | A | 1.1 | 5.6 | 250 | — | — | — | — | 0.094 | 461 | 459 | Example |
| 5 | B | 1.5 | 5.8 | 375 | — | — | — | — | 0.087 | 456 | 460 | Example |
| 6 | B | 1.2 | 8.0 | 330 | — | — | — | — | 0.105 | 466 | 475 | Example |
| 7 | B | 1.6 | 6.8 | 336 | 307 | 13 | — | — | 0.133 | 469 | 478 | Example |
| 8 | B | 1.2 | 7.1 | 365 | — | — | 420 | 98 | 0.107 | 459 | 460 | Example |
| 9 | C | 1.4 | 8.5 | 296 | — | — | — | — | 0.104 | 460 | 465 | Example |
| 10 | C | 1.3 | 21.9 | 296 | — | — | — | — | 0.098 | 462 | 461 | Example |
| 11 | C | 1.2 | 8.4 | 296 | — | — | — | — | 0.097 | 459 | 459 | Example |
| 12 | C | 0.9 | 6.4 | 275 | — | — | — | — | 0.120 | 455 | 457 | Comp.Ex. |
| 13 | D | 1.1 | 12.1 | 380 | — | — | — | — | 0.104 | 460 | 467 | Example |
| 14 | D | 1.2 | 24.3 | 343 | — | — | — | — | 0.075 | 465 | 462 | Comp.Ex. |
| 15 | D | 2.3 | 14.7 | 401 | 376 | 17 | — | — | 0.105 | 461 | 457 | Example |
| 16 | D | 1.5 | 13.9 | 360 | 346 | 12 | 348 | 26 | 0.110 | 460 | 464 | Example |
| 17 | E | 1.0 | 7.4 | 236 | — | — | — | — | 0.084 | 459 | 465 | Example |
| 18 | E | 1.3 | 4.2 | 243 | — | — | — | — | 0.114 | 459 | 456 | Example |
| 19 | E | 2.2 | 5.1 | 290 | — | — | — | — | 0.091 | 462 | 460 | Example |
| 20 | E | 0.03 | 6.0 | 125 | — | — | — | — | 0.086 | 462 | 468 | Comp.Ex. |
| 21 | F | 1.0 | 3.3 | 275 | — | — | — | — | 0.109 | 462 | 454 | Example |
| 22 | F | 1.3 | 4.8 | 302 | — | — | 416 | 15 | 0.119 | 457 | 461 | Example |
| 23 | F | 1.1 | 4.8 | 284 | — | — | — | — | 0.096 | 461 | 463 | Example |
| 24 | F | 0.9 | 2.8 | 254 | — | — | — | — | 0.080 | 465 | 460 | Example |
| 25 | G | 1.0 | 4.7 | 102 | — | — | — | — | 0.108 | 458 | 457 | Example |
| 26 | G | 2.1 | 2.9 | 275 | — | — | — | — | 0.108 | 458 | 460 | Example |
| 27 | G | 0.8 | 4.9 | 155 | — | — | — | — | 0.108 | 463 | 463 | Comp.Ex. |
| 28 | G | 0.9 | 7.5 | 102 | — | — | — | — | 0.104 | 462 | 459 | Example |
| 29 | H | 1.0 | 7.5 | 294 | — | — | — | — | 0.101 | 460 | 466 | Example |
| 30 | H | 1.6 | 8.1 | 320 | 313 | 42 | — | — | 0.131 | 461 | 456 | Example |
| 31 | H | 0.7 | 5.8 | 133 | — | — | — | — | 0.109 | 463 | 460 | Example |
| 32 | I | 1.1 | 9.0 | 276 | — | — | — | — | 0.096 | 460 | 463 | Example |
| 33 | I | 0.9 | 2.5 | 288 | — | — | 339 | 83 | 0.075 | 459 | 460 | Example |
| 34 | I | 1.1 | 10.0 | 137 | — | — | — | — | 0.101 | 459 | 450 | Example |
| 35 | J | 0.8 | 5.0 | 107 | — | — | — | — | 0.106 | 460 | 456 | Example |
| 36 | J | 1.5 | 7.9 | 225 | — | — | 476 | 21 | 0.108 | 462 | 468 | Example |
| 37 | J | 0.7 | 13.3 | 107 | — | — | — | — | 0.108 | 457 | 451 | Example |
| 38 | K | 0.9 | 5.7 | 68 | — | — | — | — | 0.095 | 458 | 453 | Example |
| 39 | K | 0.8 | 1.4 | 149 | — | — | — | — | 0.106 | 458 | 465 | Example |
| 40 | K | 0.8 | 3.1 | 149 | — | — | — | — | 0.096 | 461 | 462 | Example |
| 41 | L | 1.3 | 8.1 | 174 | — | — | — | — | 0.095 | 459 | 464 | Example |
| 42 | L | 2.4 | 7.7 | 311 | 221 | 14 | — | — | 0.096 | 463 | 472 | Example |
| 43 | L | 0.9 | 5.9 | 164 | — | — | 525 | 175 | 0.103 | 458 | 464 | Comp.Ex. |
| 44 | M | 1.1 | 6.3 | 150 | — | — | — | — | 0.086 | 459 | 454 | Example |

TABLE 15-continued

| | | Annealing step Cooling step | | | | | | | Plating step Plating bath | | |
|---|---|---|---|---|---|---|---|---|---|---|---|
| | | | | Martensitic transformation treatment | | | Bainitic transformation treatment 1 | | Amount of | | Steel sheet |
| Experimental Example | Chemical components | Cooling rate 1 °C./sec | Cooling rate 2 °C./sec | Ms point °C. | Average temperature °C. | Treatment time sec | Average temperature °C. | Treatment time sec | effective Al % by mass | Bath temperature °C. | entering temperature °C. |
| 45 | M | 2.1 | 7.0 | 377 | — | — | 419 | 248 | 0.123 | 463 | 460 | Example |
| 46 | M | 0.7 | 6.5 | 150 | — | — | — | — | 0.082 | 460 | 464 | Comp.Ex. |
| 47 | N | 1.3 | 2.3 | 188 | — | — | — | — | 0.086 | 459 | 460 | Example |
| 48 | N | 1.5 | 20.3 | 245 | — | — | — | — | 0.110 | 459 | 467 | Example |
| 49 | N | 5.4 | 7.0 | 302 | — | — | 385 | 63 | 0.090 | 461 | 458 | Comp.Ex. |
| 50 | O | 1.2 | 5.2 | 306 | — | — | — | — | 0.096 | 461 | 467 | Example |

TABLE 16

| | | Annealing step Cooling step | | | | | | | Plating step Plating bath | | |
|---|---|---|---|---|---|---|---|---|---|---|---|
| | | | | Martensitic transformation treatment | | | Bainitic transformation treatment 1 | | Amount of | | Steel sheet |
| Experimental Example | Chemical components | Cooling rate 1 °C./sec | Cooling rate 2 °C./sec | Ms point °C. | Average temperature °C. | Treatment time sec | Average temperature °C. | Treatment time sec | effective Al % by mass | Bath temperature °C. | entering temperature °C. |
| 51 | O | 1.2 | 7.5 | 295 | — | — | — | — | 0.110 | 458 | 457 | Comp.Ex. |
| 52 | O | 1.1 | 5.2 | 328 | — | — | — | — | 0.106 | 459 | 457 | Example |
| 53 | O | 1.0 | 14.4 | 301 | — | — | — | — | 0.092 | 460 | 456 | Example |
| 54 | P | 1.0 | 4.5 | 337 | — | — | — | — | 0.100 | 461 | 455 | Example |
| 55 | P | 1.3 | 4.4 | 359 | — | — | — | — | 0.106 | 461 | 456 | Example |
| 56 | P | 1.2 | 5.8 | 345 | — | — | — | — | 0.140 | 460 | 461 | Example |
| 57 | Q | 0.9 | 7.3 | 114 | — | — | — | — | 0.113 | 461 | 455 | Example |
| 58 | Q | 1.4 | 10.1 | 296 | — | — | — | — | 0.099 | 459 | 456 | Example |
| 59 | Q | 1.8 | 6.7 | 327 | 307 | 18 | 409 | 128 | 0.107 | 458 | 463 | Comp.Ex. |
| 60 | R | 0.8 | 4.0 | 24 | — | — | — | — | 0.087 | 459 | 456 | Example |
| 61 | R | 0.7 | 7.5 | 131 | — | — | — | — | 0.096 | 461 | 462 | Example |
| 62 | R | 0.8 | 2.2 | −97 | — | — | — | — | 0.076 | 461 | 465 | Example |
| 63 | S | 1.0 | 7.6 | 112 | — | — | — | — | 0.090 | 460 | 464 | Example |
| 64 | S | 0.9 | 39.0 | 136 | — | — | — | — | 0.127 | 460 | 462 | Example |
| 65 | S | 0.6 | 7.2 | 112 | — | — | — | — | 0.102 | 459 | 455 | Comp.Ex. |
| 66 | T | 0.8 | 1.6 | 148 | — | — | — | — | 0.096 | 458 | 463 | Example |
| 67 | T | 1.1 | 82.1 | 176 | — | — | 376 | 413 | 0.100 | 460 | 450 | Example |
| 68 | T | 2.5 | 2.6 | 321 | — | — | — | — | 0.106 | 460 | 468 | Comp.Ex. |
| 69 | U | 1.1 | 8.1 | 236 | — | — | — | — | 0.108 | 460 | 456 | Example |
| 70 | U | 1.4 | 10.0 | 311 | — | — | — | — | 0.089 | 459 | 458 | Example |
| 71 | U | 1.3 | 5.9 | 305 | — | — | — | — | 0.095 | 460 | 458 | Example |
| 72 | V | 1.4 | 5.4 | 368 | — | — | — | — | 0.098 | 462 | 454 | Example |
| 73 | V | 1.7 | 22.2 | 381 | — | — | — | — | 0.131 | 456 | 460 | Example |
| 74 | V | 0.4 | 5.9 | 159 | — | — | — | — | 0.113 | 458 | 457 | Example |
| 75 | W | 1.2 | 4.7 | 296 | — | — | — | — | 0.102 | 462 | 448 | Example |
| 76 | W | 0.8 | 7.7 | 214 | — | — | — | — | 0.110 | 457 | 453 | Comp.Ex. |
| 77 | W | 0.6 | 2.8 | 141 | — | — | — | — | 0.091 | 456 | 458 | Example |
| 78 | X | 1.1 | 11.0 | 135 | — | — | — | — | 0.110 | 455 | 447 | Example |
| 79 | X | 1.5 | 4.1 | 345 | — | — | — | — | 0.098 | 460 | 464 | Example |
| 80 | X | 1.2 | 4.3 | 336 | — | — | — | — | 0.099 | 459 | 456 | Comp.Ex. |
| 81 | Y | 1.1 | 7.8 | 159 | — | — | — | — | 0.099 | 463 | 469 | Example |
| 82 | Y | 2.2 | 48.0 | 350 | 300 | 27 | — | — | 0.071 | 458 | 451 | Example |
| 83 | Y | 1.0 | 5.0 | 276 | — | — | — | — | 0.086 | 462 | 465 | Example |
| 84 | Z | 1.1 | 4.9 | 280 | — | — | — | — | 0.111 | 462 | 471 | Example |
| 85 | Z | 1.0 | 7.8 | 301 | — | — | — | — | 0.097 | 462 | 471 | Comp.Ex. |
| 86 | Z | 0.9 | 7.1 | 189 | — | — | — | — | 0.090 | 459 | 457 | Example |
| 87 | AA | 1.0 | 12.1 | 94 | — | — | — | — | 0.098 | 458 | 461 | Example |
| 88 | AA | 1.0 | 4.8 | 197 | — | — | — | — | 0.102 | 457 | 464 | Example |
| 89 | AB | 1.5 | 4.0 | 265 | — | — | — | — | 0.092 | 459 | 458 | Example |
| 90 | AB | 1.2 | 5.3 | 248 | — | — | 380 | 45 | 0.161 | 466 | 467 | Example |
| 91 | AB | 0.7 | 2.6 | 120 | — | — | — | — | 0.098 | 457 | 452 | Example |
| 92 | AC | 1.1 | 3.0 | 130 | — | — | — | — | 0.096 | 459 | 455 | Example |
| 93 | AC | 0.8 | 4.7 | 156 | — | — | — | — | 0.100 | 461 | 459 | Example |
| 94 | AD | 1.3 | 2.7 | 276 | — | — | — | — | 0.097 | 458 | 449 | Example |
| 95 | AD | 1.5 | 7.4 | 281 | — | — | — | — | 0.096 | 458 | 457 | Example |
| 96 | AE | 1.0 | 3.0 | 220 | — | — | — | — | 0.102 | 461 | 460 | Example |
| 97 | AE | 1.6 | 5.7 | 286 | — | — | 437 | 26 | 0.089 | 461 | 457 | Example |
| 98 | AF | 1.2 | 3.3 | 235 | — | — | — | — | 0.099 | 459 | 461 | Example |

TABLE 16-continued

| | | Annealing step Cooling step | | | | | | | Plating step Plating bath | | | |
|---|---|---|---|---|---|---|---|---|---|---|---|---|
| | Chemical | | | Martensitic transformation treatment | | | Bainitic transformation treatment 1 | | Amount of | | Steel sheet | |
| Experimental Example | components | Cooling rate 1 °C./sec | Cooling rate 2 °C./sec | Ms point °C. | Average temperature °C. | Treatment time sec | Average temperature °C. | Treatment time sec | effective Al % by mass | Bath temperature °C. | entering temperature °C. | |
| 99 | AF | 2.8 | 14.5 | 343 | — | — | — | — | 0.094 | 461 | 455 | Example |
| 100 | AG | 0.9 | 13.4 | 194 | — | — | — | — | 0.104 | 456 | 464 | Example |

TABLE 17

| | | Annealing step Cooling step | | | | | | | Plating step Plating bath | | | |
|---|---|---|---|---|---|---|---|---|---|---|---|---|
| | Chemical | | | Martensitic transformation treatment | | | Bainitic transformation treatment 1 | | Amount of | | Steel sheet | |
| Experimental Example | components | Cooling rate 1 °C./sec | Cooling rate 2 °C./sec | Ms point °C. | Average temperature °C. | Treatment time sec | Average temperature °C. | Treatment time sec | effective Al % by mass | Bath temperature °C. | entering temperature °C. | |
| 1 | A | 1.3 | 4.2 | 364 | — | — | — | — | 0.084 | 459 | 467 | Example |
| 2 | A | 1.6 | 5.4 | 350 | — | — | — | — | 0.042 | 460 | 462 | Comp.Ex. |
| 3 | A | 1.3 | 37.0 | 323 | — | — | 460 | 39 | 0.095 | 460 | 456 | Example |
| 4 | A | 1.1 | 5.6 | 250 | — | — | — | — | 0.094 | 461 | 459 | Example |
| 5 | B | 1.5 | 5.8 | 375 | — | — | — | — | 0.087 | 456 | 460 | Example |
| 6 | B | 1.2 | 8.0 | 330 | — | — | — | — | 0.105 | 466 | 475 | Example |
| 7 | B | 1.6 | 6.8 | 336 | 307 | 13 | — | — | 0.133 | 469 | 478 | Example |
| 8 | B | 1.2 | 7.1 | 365 | — | — | 420 | 98 | 0.107 | 459 | 460 | Example |
| 9 | C | 1.4 | 8.5 | 296 | — | — | — | — | 0.104 | 460 | 465 | Example |
| 10 | C | 1.3 | 21.9 | 296 | — | — | — | — | 0.098 | 462 | 461 | Example |
| 11 | C | 1.2 | 8.4 | 296 | — | — | — | — | 0.097 | 459 | 459 | Example |
| 12 | C | 0.9 | 6.4 | 275 | — | — | — | — | 0.120 | 455 | 457 | Comp.Ex. |
| 13 | D | 1.1 | 12.1 | 380 | — | — | — | — | 0.104 | 460 | 467 | Example |
| 14 | D | 1.2 | 24.3 | 343 | — | — | — | — | 0.075 | 465 | 462 | Comp.Ex. |
| 15 | D | 2.3 | 14.7 | 401 | 376 | 17 | — | — | 0.105 | 461 | 457 | Example |
| 16 | D | 1.5 | 13.9 | 360 | 346 | 12 | 348 | 26 | 0.110 | 460 | 464 | Example |
| 17 | E | 1.0 | 7.4 | 236 | — | — | — | — | 0.084 | 459 | 465 | Example |
| 18 | E | 1.3 | 4.2 | 243 | — | — | — | — | 0.114 | 459 | 456 | Example |
| 19 | E | 2.2 | 5.1 | 290 | — | — | — | — | 0.091 | 462 | 460 | Example |
| 20 | E | 0.03 | 6.0 | 125 | — | — | — | — | 0.086 | 462 | 468 | Comp.Ex. |
| 21 | F | 1.0 | 3.3 | 275 | — | — | — | — | 0.109 | 462 | 454 | Example |
| 22 | F | 1.3 | 4.8 | 302 | — | — | 416 | 15 | 0.119 | 457 | 461 | Example |
| 23 | F | 1.1 | 4.8 | 284 | — | — | — | — | 0.096 | 461 | 463 | Example |
| 24 | F | 0.9 | 2.8 | 254 | — | — | — | — | 0.080 | 465 | 460 | Example |
| 25 | G | 1.0 | 4.7 | 102 | — | — | — | — | 0.108 | 458 | 457 | Example |
| 26 | G | 2.1 | 2.9 | 275 | — | — | — | — | 0.108 | 458 | 460 | Example |
| 27 | G | 0.8 | 4.9 | 155 | — | — | — | — | 0.108 | 463 | 463 | Comp.Ex. |
| 28 | G | 0.9 | 7.5 | 102 | — | — | — | — | 0.104 | 462 | 459 | Example |
| 29 | H | 1.0 | 7.5 | 294 | — | — | — | — | 0.101 | 460 | 466 | Example |
| 30 | H | 1.6 | 8.1 | 320 | 313 | 42 | — | — | 0.131 | 461 | 456 | Example |
| 31 | H | 0.7 | 5.8 | 133 | — | — | — | — | 0.109 | 463 | 460 | Example |
| 32 | I | 1.1 | 9.0 | 276 | — | — | — | — | 0.096 | 460 | 463 | Example |
| 33 | I | 0.9 | 2.5 | 288 | — | — | 339 | 83 | 0.075 | 459 | 460 | Example |
| 34 | I | 1.1 | 10.0 | 137 | — | — | — | — | 0.101 | 459 | 450 | Example |
| 35 | J | 0.8 | 5.0 | 107 | — | — | — | — | 0.106 | 460 | 456 | Example |
| 36 | J | 1.5 | 7.9 | 225 | — | — | 476 | 21 | 0.108 | 462 | 468 | Example |
| 37 | J | 0.7 | 13.3 | 107 | — | — | — | — | 0.108 | 457 | 451 | Example |
| 38 | K | 0.9 | 5.7 | 68 | — | — | — | — | 0.095 | 458 | 453 | Example |
| 39 | K | 0.8 | 1.4 | 149 | — | — | — | — | 0.106 | 458 | 465 | Example |
| 40 | K | 0.8 | 3.1 | 149 | — | — | — | — | 0.096 | 461 | 462 | Example |
| 41 | L | 1.3 | 8.1 | 174 | — | — | — | — | 0.095 | 459 | 464 | Example |
| 42 | L | 2.4 | 7.7 | 311 | 221 | 14 | — | — | 0.096 | 463 | 472 | Example |
| 43 | L | 0.9 | 5.9 | 164 | — | — | 525 | 175 | 0.103 | 458 | 464 | Comp.Ex. |
| 44 | M | 1.1 | 6.3 | 150 | — | — | — | — | 0.086 | 459 | 454 | Example |
| 45 | M | 2.1 | 7.0 | 377 | — | — | 419 | 248 | 0.123 | 463 | 460 | Example |
| 46 | M | 0.7 | 6.5 | 150 | — | — | — | — | 0.082 | 460 | 464 | Comp.Ex. |
| 47 | N | 1.3 | 2.3 | 188 | — | — | — | — | 0.086 | 459 | 460 | Example |
| 48 | N | 1.5 | 20.3 | 245 | — | — | — | — | 0.110 | 459 | 467 | Example |
| 49 | N | 5.4 | 7.0 | 302 | — | — | 385 | 63 | 0.090 | 461 | 458 | Comp.Ex. |
| 50 | O | 1.2 | 5.2 | 306 | — | — | — | — | 0.096 | 461 | 467 | Example |

TABLE 18

| Experimental Example | Chemical components | Annealing step Cooling step | | | | | | | Plating step Plating bath | | | |
|---|---|---|---|---|---|---|---|---|---|---|---|---|
| | | Cooling rate 1 °C./sec | Cooling rate 2 °C./sec | Ms point °C. | Martensitic transformation treatment | | Bainitic transformation treatment 1 | | Amount of effective Al % by mass | Bath temperature °C. | Steel sheet entering temperature °C. | |
| | | | | | Average temperature °C. | Treatment time sec | Average temperature °C. | Treatment time sec | | | | |
| 151 | BB | 1.0 | 4.8 | 229 | — | — | 482 | 40 | 0.107 | 459 | 462 | Example |
| 152 | BB | 0.9 | 1.3 | 223 | — | — | — | — | 0.057 | 455 | 453 | Example |
| 153 | BC | 0.9 | 3.3 | 132 | — | — | — | — | 0.104 | 458 | 458 | Example |
| 154 | BC | 1.5 | 14.5 | 323 | — | — | — | — | 0.100 | 457 | 463 | Example |
| 155 | BC | 1.4 | 3.8 | 319 | — | — | — | — | 0.073 | 461 | 455 | Example |
| 156 | BC | 1.0 | 3.3 | 240 | — | — | 453 | 36 | 0.110 | 458 | 458 | Example |
| 157 | BC | 1.0 | 6.5 | 204 | — | — | — | — | 0.099 | 458 | 464 | Comp.Ex. |
| 158 | BD | 1.2 | 9.2 | 124 | — | — | — | — | 0.091 | 458 | 463 | Example |
| 159 | BD | 0.7 | 2.6 | 124 | — | — | — | — | 0.100 | 461 | 467 | Example |
| 160 | BE | 1.3 | 7.1 | 290 | — | — | — | — | 0.090 | 462 | 468 | Example |
| 161 | BE | 1.1 | 3.0 | 196 | — | — | — | — | 0.129 | 459 | 455 | Example |
| 162 | BF | 1.0 | 3.2 | 212 | — | — | — | — | 0.110 | 457 | 465 | Example |
| 163 | BF | 1.1 | 3.7 | 231 | — | — | — | — | 0.100 | 459 | 453 | Example |
| 164 | BF | 1.0 | 14.4 | 219 | — | — | 458 | 81 | 0.078 | 464 | 469 | Example |
| 165 | BF | 1.3 | 9.0 | 219 | — | — | — | — | 0.109 | 458 | 465 | Comp.Ex. |
| 166 | BG | 1.1 | 18.8 | 139 | — | — | — | — | 0.091 | 460 | 463 | Example |
| 167 | BG | 3.7 | 2.2 | 406 | — | — | — | — | 0.131 | 462 | 455 | Example |
| 168 | BG | 1.0 | 2.6 | 259 | — | — | — | — | 0.090 | 463 | 470 | Comp.Ex. |
| 169 | BG | 1.4 | 7.4 | 328 | — | — | — | — | 0.091 | 459 | 464 | Example |
| 170 | BH | 1.1 | 7.5 | 220 | — | — | — | — | 0.094 | 459 | 462 | Example |
| 171 | BH | 1.9 | 8.3 | 271 | — | — | — | — | 0.110 | 462 | 462 | Comp.Ex. |
| 172 | BH | 1.4 | 34.0 | 256 | — | — | 394 | 71 | 0.068 | 464 | 455 | Example |
| 173 | BH | 1.5 | 16.2 | 271 | — | — | — | — | 0.117 | 457 | 455 | Example |
| 174 | BI | 1.1 | 4.9 | 151 | — | — | — | — | 0.111 | 462 | 468 | Example |
| 175 | BI | 1.0 | 4.9 | 288 | — | — | 463 | 24 | 0.101 | 460 | 454 | Example |
| 176 | BJ | 1.1 | 4.9 | 124 | — | — | — | — | 0.096 | 461 | 466 | Example |
| 177 | BJ | 2.0 | 9.0 | 315 | — | — | 461 | 810 | 0.103 | 462 | 460 | Comp.Ex. |
| 178 | BJ | 0.9 | 23.8 | 124 | — | — | — | — | 0.092 | 462 | 470 | Example |
| 179 | BK | 1.0 | 9.5 | 142 | — | — | — | — | 0.107 | 461 | 459 | Example |
| 180 | BK | 1.5 | 14.2 | 341 | — | — | — | — | 0.101 | 456 | 462 | Example |
| 181 | BL | 0.9 | 8.8 | 233 | — | — | — | — | 0.096 | 463 | 469 | Example |
| 182 | BL | 1.5 | 35.0 | 319 | 278 | 24 | — | — | 0.112 | 460 | 458 | Example |
| 183 | BL | 0.8 | 3.0 | 233 | — | — | — | — | 0.082 | 466 | 467 | Comp.Ex. |
| 184 | BL | 1.2 | 1.7 | 295 | — | — | 473 | 19 | 0.110 | 457 | 451 | Example |
| 185 | BM | 1.0 | 7.3 | 212 | — | — | — | — | 0.104 | 459 | 450 | Example |
| 186 | BM | 1.5 | 12.7 | −86 | — | — | — | — | 0.091 | 461 | 453 | Comp.Ex. |
| 187 | BM | 1.2 | 10.9 | 246 | — | — | — | — | 0.098 | 459 | 456 | Example |
| 188 | BN | 0.8 | 6.6 | 136 | — | — | — | — | 0.091 | 457 | 457 | Example |
| 189 | BN | 1.1 | 3.0 | 302 | — | — | — | — | 0.098 | 462 | 459 | Example |
| 190 | BO | 1.2 | 3.1 | * | — | — | — | — | 0.096 | 463 | 456 | Comp.Ex. |
| 191 | BP | 1.1 | 3.6 | 71 | — | — | — | — | 0.097 | 458 | 450 | Comp.Ex. |
| 192 | BQ | 0.9 | 5.2 | 240 | — | — | — | — | 0.099 | 459 | 462 | Comp.Ex. |
| 193 | BR | Experiment stopped due to occurrence of cracking of slab during heating in hot rolling step | | | | | | | | | | Comp.Ex. |
| 194 | BS | 1.1 | 4.9 | 168 | — | — | — | — | 0.108 | 458 | 458 | Comp.Ex. |
| 195 | BT | Experiment stopped due to occurrence of cracking of slab during heating in hot rolling step | | | | | | | | | | Comp.Ex. |
| 196 | BU | Experiment stopped due to occurrence of cracking of slab during hot rolling step | | | | | | | | | | Comp.Ex. |
| 197 | BV | 1.4 | 4.2 | 229 | — | — | — | — | 0.110 | 459 | 457 | Comp.Ex. |
| 198 | BW | Experiment stopped due to occurrence of cracking of slab during transportation after casting of slab | | | | | | | | | | Comp. Ex. |
| 199 | BX | 1.7 | 7.0 | 255 | — | — | — | — | 0.091 | 466 | 462 | Comp.Ex. |
| 200 | BY | 1.1 | 2.7 | 199 | — | — | — | — | 0.098 | 462 | 463 | Comp.Ex. |
| 201 | A | 1.5 | 7.2 | 364 | — | — | — | — | 0.091 | 459 | 461 | Comp.Ex. |

TABLE 19

| Experimental Example | Chemical components | Cooling step after plating | | | | | | Processing | | | |
|---|---|---|---|---|---|---|---|---|---|---|---|
| | | Bainitic transformation treatment 2 | | Reheating treatment | | Expression (2) | | Bending - bending back processing | | Cold rolling | |
| | | Cooling rate 3 °C./sec | Treatment temperature °C. | Treatment time sec | Treatment temperature °C. | Treatment time sec | | Roll diameter mm | Processing times times | Rolling reduction % | |
| 1 | A | 3.2 | — | — | — | — | 1.17 | 350 | 2 | 0.11 | Example |
| 2 | A | 2.0 | — | — | — | — | 4.57 | 350 | 2 | 0.13 | Comp.Ex. |
| 3 | A | 1.9 | — | — | — | — | 0.90 | 350 | 2 | 0.40 | Example |

TABLE 19-continued

| | | Cooling step after plating | | | | | Processing | | | |
|---|---|---|---|---|---|---|---|---|---|---|
| | | | Bainitic transformation treatment 2 | | Reheating treatment | | | Bending - bending back processing | | Cold rolling |
| Experimental Example | Chemical components | Cooling rate 3 °C./sec | Treatment temperature °C. | Treatment time sec | Treatment temperature °C. | Treatment time sec | Expression (2) | Roll diameter mm | Processing times times | Rolling reduction % | |
| 4 | A | 1.9 | — | — | 291 | 18 | 0.59 | 500 | 8 | 0.27 | Example |
| 5 | B | 3.5 | — | — | — | — | 0.94 | 350 | 2 | 0.12 | Example |
| 6 | B | 3.1 | — | — | — | — | 0.86 | 350 | 2 | 0.05 | Example |
| 7 | B | 2.0 | — | — | — | — | 0.43 | 350 | 2 | 0.25 | Example |
| 8 | B | 2.0 | 313 | 38 | — | — | 0.59 | 350 | 2 | 0.81 | Example |
| 9 | C | 3.5 | — | — | — | — | 0.66 | 350 | 2 | 0.06 | Example |
| 10 | C | 3.2 | 320 | 61 | 330 | 6 | 0.50 | 350 | 2 | 0.08 | Example |
| 11 | C | 2.4 | — | — | — | — | 0.70 | 350 | 2 | 0.15 | Example |
| 12 | C | 2.1 | — | — | — | — | 0.21 | 350 | 2 | 0.18 | Comp.Ex. |
| 13 | D | 3.5 | — | — | — | — | 0.75 | 350 | 2 | 0.20 | Example |
| 14 | D | 3.3 | — | — | — | — | 1.53 | 350 | 2 | 0.15 | Comp.Ex. |
| 15 | D | 2.3 | — | — | — | — | 0.70 | 350 | 2 | 0.20 | Example |
| 16 | D | 3.2 | — | — | — | — | 0.71 | 700 | 6 | 0.09 | Example |
| 17 | E | 4.1 | — | — | — | — | 0.72 | 350 | 2 | 0.19 | Example |
| 18 | E | 2.5 | — | — | 324 | 38 | 0.93 | 350 | 2 | 0.20 | Example |
| 19 | E | 1.7 | — | — | — | — | 1.24 | 350 | 2 | 0.55 | Example |
| 20 | E | 4.2 | — | — | — | — | 0.82 | 350 | 2 | 0.11 | Comp.Ex. |
| 21 | F | 2.8 | — | — | — | — | 0.72 | 350 | 2 | 0.49 | Example |
| 22 | F | 3.1 | — | — | 310 | 14 | 0.53 | 350 | 2 | 0.14 | Example |
| 23 | F | 2.0 | 336 | 180 | — | — | 0.62 | 700 | 6 | 0.14 | Example |
| 24 | F | 2.2 | — | — | — | — | 1.63 | 350 | 2 | 0.18 | Example |
| 25 | G | 3.9 | — | — | — | — | 0.66 | 350 | 2 | 0.16 | Example |
| 26 | G | 2.6 | — | — | 253 | 6 | 0.73 | 700 | 6 | 0.10 | Example |
| 27 | G | 2.4 | — | — | — | — | 0.86 | 350 | 2 | 0.18 | Comp.Ex. |
| 28 | G | 2.1 | — | — | — | — | 0.61 | 350 | 2 | 0.05 | Example |
| 29 | H | 2.9 | — | — | — | — | 0.94 | 350 | 2 | 0.38 | Example |
| 30 | H | 4.3 | — | — | — | — | 0.43 | 350 | 2 | 0.10 | Example |
| 31 | H | 1.9 | — | — | — | — | 0.83 | 350 | 2 | 0.19 | Example |
| 32 | I | 2.9 | — | — | — | — | 0.81 | 350 | 2 | 0.22 | Example |
| 33 | I | 2.3 | — | — | 273 | 16 | 1.27 | 350 | 2 | 0.21 | Example |
| 34 | I | 3.8 | — | — | — | — | 0.73 | 350 | 2 | 1.13 | Example |
| 35 | J | 2.4 | — | — | — | — | 0.77 | 350 | 2 | 0.28 | Example |
| 36 | J | 2.8 | — | — | — | — | 0.66 | 700 | 6 | 0.24 | Example |
| 37 | J | 1.7 | — | — | — | — | 0.87 | 350 | 2 | 0.19 | Example |
| 38 | K | 2.9 | — | — | — | — | 0.70 | 350 | 2 | 0.12 | Example |
| 39 | K | 1.8 | — | — | — | — | 0.77 | 350 | 2 | 0.17 | Example |
| 40 | K | 2.1 | 262 | 35 | — | — | 0.76 | 350 | 2 | 0.15 | Example |
| 41 | L | 3.1 | — | — | — | — | 0.77 | 350 | 2 | 0.15 | Example |
| 42 | L | 2.3 | — | — | — | — | 0.89 | 350 | 2 | 0.14 | Example |
| 43 | L | 2.3 | — | — | — | — | 0.84 | 350 | 2 | 0.17 | Comp.Ex. |
| 44 | M | 3.7 | — | — | — | — | 0.74 | 400 | 2 | 0.22 | Example |
| 45 | M | 2.1 | — | — | — | — | 0.55 | 400 | 2 | 0.16 | Example |
| 46 | M | 2.0 | — | — | — | — | 1.55 | 400 | 2 | 0.13 | Comp.Ex. |
| 47 | N | 4.3 | — | — | — | — | 1.28 | 400 | 2 | 0.25 | Example |
| 48 | N | 2.2 | — | — | 314 | 30 | 0.74 | 400 | 2 | 0.40 | Example |
| 49 | N | 3.4 | — | — | — | — | 0.84 | 400 | 2 | 0.10 | Comp.Ex. |
| 50 | O | 3.1 | — | — | — | — | 1.11 | 350 | 2 | 0.20 | Example |

TABLE 20

| | | Cooling step after plating | | | | | Processing | | | |
|---|---|---|---|---|---|---|---|---|---|---|
| | | | Bainitic transformation treatment 2 | | Reheating treatment | | | Bending - bending back processing | | Cold rolling |
| Experimental Example | Chemical components | Cooling rate 3 °C./sec | Treatment temperature °C. | Treatment time sec | Treatment temperature °C. | Treatment time sec | Expression (2) | Roll diameter mm | Processing times times | Rolling reduction % | |
| 51 | O | 3.2 | — | — | — | — | 0.76 | 350 | 2 | 0.22 | Comp.Ex. |
| 52 | O | 2.8 | — | — | — | — | 0.46 | 350 | 2 | 0.15 | Example |
| 53 | O | 2.5 | — | — | 291 | 19 | 0.54 | 350 | 2 | 0.16 | Example |
| 54 | P | 3.2 | — | — | — | — | 0.73 | 350 | 4 | 0.13 | Example |
| 55 | P | 3.2 | 276 | 53 | — | — | 0.60 | 350 | 4 | 0.22 | Example |
| 56 | P | 3.1 | — | — | — | — | 0.43 | 350 | 4 | 0.18 | Example |
| 57 | Q | 3.0 | — | — | — | — | 0.50 | 350 | 2 | 0.23 | Example |

TABLE 20-continued

|  |  | Cooling step after plating | | | | | Processing | | | |
|---|---|---|---|---|---|---|---|---|---|---|
|  |  |  | Bainitic transformation treatment 2 | | Reheating treatment | | | Bending - bending back processing | | Cold rolling |
| Experimental Example | Chemical components | Cooling rate 3 °C./sec | Treatment temperature °C. | Treatment time sec | Treatment temperature °C. | Treatment time sec | Expression (2) | Roll diameter mm | Processing times times | Rolling reduction % |
| 58 | Q | 3.4 | — | — | — | — | 0.56 | 350 | 2 | 0.35 | Example |
| 59 | Q | 3.9 | 268 | 52 | 272 | 22 | 0.53 | 1800 | 2 | 0.10 | Comp.Ex. |
| 60 | R | 2.6 | — | — | — | — | 1.29 | 350 | 2 | 0.05 | Example |
| 61 | R | 1.8 | — | — | — | — | 0.87 | 350 | 2 | 0.09 | Example |
| 62 | R | 3.6 | — | — | 324 | 9 | 0.92 | 350 | 2 | 0.10 | Example |
| 63 | S | 4.6 | — | — | — | — | 0.81 | 400 | 4 | 0.48 | Example |
| 64 | S | 2.1 | — | — | — | — | 0.47 | 400 | 4 | 0.18 | Example |
| 65 | S | 2.0 | — | — | — | — | 0.95 | 400 | 4 | 0.22 | Comp.Ex. |
| 66 | T | 2.8 | — | — | — | — | 0.83 | 350 | 2 | 0.14 | Example |
| 67 | T | 3.0 | — | — | — | — | 0.64 | 350 | 2 | 0.16 | Example |
| 68 | T | 2.5 | — | — | — | — | 0.51 | 350 | 2 | 0.09 | Comp.Ex. |
| 69 | U | 4.2 | — | — | — | — | 0.68 | 150 | 2 | 0.23 | Example |
| 70 | U | 3.2 | — | — | — | — | 0.72 | 150 | 2 | 0.20 | Example |
| 71 | U | 0.4 | — | — | — | — | 0.70 | 150 | 2 | 0.19 | Example |
| 72 | V | 2.9 | — | — | — | — | 0.71 | 170 | 2 | 0.29 | Example |
| 73 | V | 0.5 | — | — | — | — | 0.60 | 170 | 2 | 0.20 | Example |
| 74 | V | 2.7 | — | — | 272 | 12 | 0.53 | 170 | 2 | 0.08 | Example |
| 75 | W | 3.1 | — | — | — | — | 0.62 | 350 | 2 | 0.21 | Example |
| 76 | W | 1.5 | — | — | — | — | 1.13 | 350 | 2 | 0.22 | Comp.Ex. |
| 77 | W | 1.4 | — | — | 303 | 30 | 0.85 | 350 | 2 | 0.10 | Example |
| 78 | X | 3.8 | — | — | — | — | 0.44 | 350 | 2 | 0.20 | Example |
| 79 | X | 2.8 | — | — | — | — | 0.68 | 350 | 2 | 0.24 | Example |
| 80 | X | 2.4 | — | — | 283 | 18 | 0.83 | 25 | 2 | 0.04 | Comp.Ex. |
| 81 | Y | 3.7 | — | — | — | — | 0.86 | 350 | 2 | 0.14 | Example |
| 82 | Y | 2.5 | — | — | — | — | 1.18 | 350 | 2 | 0.17 | Example |
| 83 | Y | 2.3 | — | — | — | — | 1.27 | 350 | 2 | 0.16 | Example |
| 84 | Z | 4.4 | — | — | — | — | 0.66 | 350 | 2 | 0.08 | Example |
| 85 | Z | 2.4 | — | — | — | — | 0.99 | 350 | 2 | 0.10 | Comp.Ex. |
| 86 | Z | 2.9 | — | — | — | — | 0.76 | 350 | 2 | 0.08 | Example |
| 87 | AA | 3.5 | — | — | — | — | 0.81 | 350 | 2 | 0.05 | Example |
| 88 | AA | 3.0 | — | — | 325 | 8 | 0.64 | 350 | 2 | — | Example |
| 89 | AB | 4.5 | — | — | — | — | 0.64 | 350 | 4 | 0.15 | Example |
| 90 | AB | 2.9 | — | — | — | — | 0.41 | 350 | 4 | 0.21 | Example |
| 91 | AB | 1.2 | 274 | 54 | — | — | 0.71 | 350 | 4 | 0.15 | Example |
| 92 | AC | 4.7 | — | — | — | — | 0.71 | 350 | 4 | 0.06 | Example |
| 93 | AC | 2.7 | — | — | — | — | 0.75 | 350 | 4 | 0.26 | Example |
| 94 | AD | 4.7 | — | — | — | — | 0.83 | 350 | 4 | 0.22 | Example |
| 95 | AD | 2.4 | — | — | 290 | 30 | 0.80 | 350 | 4 | 0.29 | Example |
| 96 | AE | 3.4 | — | — | — | — | 0.82 | 350 | 4 | 0.08 | Example |
| 97 | AE | 3.3 | — | — | 284 | 9 | 1.00 | 350 | 4 | 0.17 | Example |
| 98 | AF | 3.8 | — | — | — | — | 0.69 | 350 | 4 | 0.22 | Example |
| 99 | AF | 2.7 | — | — | — | — | 1.08 | 350 | 4 | 0.17 | Example |
| 100 | AG | 3.6 | — | — | — | — | 0.56 | 350 | 4 | 0.19 | Example |

TABLE 21

|  |  | Cooling step after plating | | | | | Processing | | | |
|---|---|---|---|---|---|---|---|---|---|---|
|  |  |  | Bainitic transformation treatment 2 | | Reheating treatment | | | Bending - bending back processing | | Cold rolling |
| Experimental Example | Chemical components | Cooling rate 3 °C./sec | Treatment temperature °C. | Treatment time sec | Treatment temperature °C. | Treatment time sec | Expression (2) | Roll diameter mm | Processing times times | Rolling reduction % |
| 101 | AG | 2.6 | — | — | — | — | 1.09 | 350 | 4 | 0.15 | Example |
| 102 | AH | 4.3 | — | — | — | — | 1.07 | 600 | 4 | 0.10 | Example |
| 103 | AH | 2.8 | — | — | — | — | 0.88 | 600 | 4 | 0.28 | Example |
| 104 | AI | 3.1 | — | — | — | — | 0.90 | 350 | 2 | 0.15 | Example |
| 105 | AI | 2.1 | — | — | — | — | 0.65 | 350 | 2 | — | Example |
| 106 | AJ | 2.8 | — | — | — | — | 0.83 | 350 | 2 | 0.24 | Example |
| 107 | AJ | 2.6 | — | — | — | — | 1.39 | 350 | 2 | 0.29 | Example |
| 108 | AK | 4.8 | — | — | — | — | 0.76 | 350 | 2 | 0.19 | Example |
| 109 | AK | 3.8 | — | — | — | — | 1.17 | 350 | 2 | 0.19 | Example |
| 110 | AL | 3.4 | — | — | — | — | 1.10 | 350 | 2 | 0.05 | Example |

TABLE 21-continued

| | | Cooling step after plating | | | | | | Processing | | | |
| | | | | | | | | Bending - bending back processing | | Cold rolling | |
| | | Cooling rate 3 | Bainitic transformation treatment 2 | | Reheating treatment | | | Roll diameter | Processing times | Rolling reduction | |
| Experimental Example | Chemical components | °C./sec | Treatment temperature °C. | Treatment time sec | Treatment temperature °C. | Treatment time sec | Expression (2) | mm | times | % | |
|---|---|---|---|---|---|---|---|---|---|---|---|
| 111 | AL | 3.1 | 283 | 17 | — | — | 0.86 | 350 | 2 | 0.14 | Example |
| 112 | AM | 3.8 | — | — | — | — | 0.82 | 350 | 2 | 0.10 | Example |
| 113 | AM | 4.5 | — | — | 310 | 8 | 1.04 | 350 | 2 | 0.14 | Example |
| 114 | AM | 3.3 | 270 | 28 | — | — | 0.76 | 350 | 2 | 0.35 | Example |
| 115 | AM | 2.4 | — | — | — | — | 0.72 | 350 | 2 | 0.13 | Comp.Ex. |
| 116 | AN | 3.2 | — | — | — | — | 0.85 | 350 | 2 | 0.15 | Example |
| 117 | AN | 2.8 | — | — | — | — | 0.80 | 350 | 2 | 0.21 | Example |
| 118 | AO | 3.7 | — | — | — | — | 0.95 | 350 | 2 | 0.64 | Example |
| 119 | AO | 2.5 | — | — | — | — | 0.77 | 350 | 2 | 0.10 | Example |
| 120 | AP | 2.7 | — | — | — | — | 0.72 | 600 | 2 | 0.06 | Example |
| 121 | AP | 2.0 | — | — | — | — | 0.94 | 600 | 2 | 0.38 | Example |
| 122 | AP | 0.6 | — | — | — | — | 0.89 | 600 | 2 | 0.09 | Example |
| 123 | AQ | 2.8 | — | — | — | — | 0.62 | 600 | 2 | 0.13 | Example |
| 124 | AQ | 1.8 | — | — | — | — | 0.56 | 600 | 2 | 0.75 | Example |
| 125 | AR | 2.2 | — | — | — | — | 0.84 | 600 | 2 | 0.18 | Example |
| 126 | AR | 2.8 | — | — | — | — | 0.67 | 600 | 2 | 0.13 | Example |
| 127 | AS | 3.7 | — | — | — | — | 1.04 | 750 | 10 | 0.08 | Example |
| 128 | AS | 2.6 | — | — | — | — | 0.48 | 750 | 10 | 0.21 | Example |
| 129 | AT | 5.3 | — | — | — | — | 0.55 | 600 | 2 | 0.19 | Example |
| 130 | AT | 1.5 | — | — | 285 | 7 | 1.35 | 600 | 2 | 0.12 | Example |
| 131 | AU | 4.8 | — | — | — | — | 0.55 | 350 | 2 | 0.13 | Example |
| 132 | AU | 1.9 | — | — | — | — | 1.06 | 350 | 2 | 0.23 | Comp.Ex. |
| 133 | AU | 2.5 | 264 | 38 | — | — | 0.66 | 350 | 2 | 0.26 | Example |
| 134 | AU | 1.8 | — | — | — | — | 0.59 | 350 | 2 | 0.15 | Example |
| 135 | AV | 4.3 | — | — | — | — | 0.65 | 350 | 2 | 0.21 | Example |
| 136 | AV | 3.5 | — | — | — | — | 0.92 | 350 | 2 | 0.08 | Comp.Ex. |
| 137 | AV | 4.3 | 341 | 24 | — | — | 0.75 | 350 | 2 | 0.09 | Example |
| 138 | AW | 3.2 | — | — | — | — | 0.74 | 500 | 2 | 0.06 | Example |
| 139 | AW | 4.0 | — | — | — | — | 0.61 | 500 | 2 | 0.40 | Comp.Ex. |
| 140 | AW | 2.8 | 279 | 32 | — | — | 0.60 | 500 | 2 | 0.07 | Example |
| 141 | AX | 3.8 | — | — | — | — | 0.64 | 500 | 2 | 0.29 | Example |
| 142 | AX | 2.2 | — | — | — | — | 0.85 | 500 | 2 | 0.06 | Example |
| 143 | AY | 4.9 | — | — | — | — | 0.77 | 500 | 4 | 0.28 | Example |
| 144 | AY | 3.9 | — | — | — | — | 0.62 | 500 | 4 | 0.16 | Example |
| 145 | AZ | 2.6 | — | — | — | — | 0.53 | 500 | 4 | 0.27 | Example |
| 146 | AZ | 1.6 | — | — | — | — | 0.69 | 500 | 4 | 0.10 | Example |
| 147 | BA | 4.0 | — | — | — | — | 0.61 | 350 | 2 | 0.31 | Example |
| 148 | BA | 3.4 | — | — | — | — | 0.58 | 350 | 2 | 0.06 | Example |
| 149 | BB | 4.0 | — | — | — | — | 0.61 | 350 | 2 | 0.34 | Example |
| 150 | BB | 3.4 | — | — | — | — | <u>0.11</u> | 350 | 2 | 0.31 | Comp.Ex. |

TABLE 22

| | | Cooling step after plating | | | | | | Processing | | | |
| | | | | | | | | Bending - bending back processing | | Cold rolling | |
| | | Cooling rate 3 | Bainitic transformation treatment 2 | | Reheating treatment | | | Roll diameter | Processing times | Rolling reduction | |
| Experimental Example | Chemical components | °C./sec | Treatment temperature °C. | Treatment time sec | Treatment temperature °C. | Treatment time sec | Expression (2) | mm | times | % | |
|---|---|---|---|---|---|---|---|---|---|---|---|
| 151 | BB | 2.0 | — | — | — | — | 0.75 | 350 | 2 | 0.07 | Example |
| 152 | BB | 1.4 | — | — | — | — | 2.11 | 350 | 2 | 0.29 | Example |
| 153 | BC | 2.5 | — | — | — | — | 0.65 | 350 | 2 | 0.13 | Example |
| 154 | BC | 3.0 | 330 | 21 | — | — | 0.50 | 350 | 2 | 0.41 | Example |
| 155 | BC | 2.6 | — | — | — | — | 1.18 | 350 | 2 | 0.12 | Example |
| 156 | BC | 2.0 | 315 | 90 | — | — | 0.67 | 350 | 2 | 0.23 | Example |
| 157 | BC | 2.4 | — | — | — | — | 0.64 | 350 | 2 | 0.04 | Comp.Ex. |
| 158 | BD | 3.9 | — | — | — | — | 0.88 | 350 | 2 | 0.19 | Example |
| 159 | BD | 1.8 | — | — | — | — | 1.14 | 350 | 2 | 0.05 | Example |
| 160 | BE | 4.9 | — | — | — | — | 0.75 | 350 | 2 | 0.16 | Example |
| 161 | BE | 2.3 | — | — | — | — | 0.69 | 350 | 2 | 0.09 | Example |
| 162 | BF | 2.7 | — | — | — | — | 0.47 | 350 | 2 | 0.24 | Example |

TABLE 22-continued

| | | Cooling step after plating | | | | | | Processing | | | |
| | | Bainitic transformation treatment 2 | | | Reheating treatment | | | Bending - bending back processing | | Cold rolling | |
| Experimental Example | Chemical components | Cooling rate 3 °C./sec | Treatment temperature °C. | Treatment time sec | Treatment temperature °C. | Treatment time sec | Expression (2) | Roll diameter mm | Processing times times | Rolling reduction % | |
| --- | --- | --- | --- | --- | --- | --- | --- | --- | --- | --- | --- |
| 163 | BF | 2.4 | — | — | — | — | 0.60 | 350 | 2 | 0.05 | Example |
| 164 | BF | 2.3 | — | — | — | — | 2.06 | 350 | 2 | 0.10 | Example |
| 165 | BF | 3.8 | 420 | 91 | — | — | 0.53 | 350 | 2 | 0.14 | Comp.Ex. |
| 166 | BG | 4.2 | — | — | — | — | 0.89 | 350 | 2 | 0.37 | Example |
| 167 | BG | 2.6 | — | — | 277 | 19 | 0.53 | 350 | 2 | 0.19 | Example |
| 168 | BG | 2.1 | — | — | — | — | 1.00 | 350 | 2 | 0.07 | Comp.Ex. |
| 169 | BG | 3.6 | — | — | — | — | 0.46 | 70 | 2 | 0.07 | Example |
| 170 | BH | 3.4 | — | — | — | — | 0.87 | 350 | 2 | 0.12 | Example |
| 171 | BH | 4.1 | — | — | — | — | 0.55 | 350 | 2 | 0.07 | Comp.Ex. |
| 172 | BH | 2.7 | 279 | 19 | — | — | 1.84 | 350 | 2 | 0.23 | Example |
| 173 | BH | 4.1 | 315 | 45 | — | — | 0.57 | 140 | 2 | 0.07 | Example |
| 174 | BI | 2.5 | — | — | — | — | 0.58 | 350 | 2 | 0.14 | Example |
| 175 | BI | 2.4 | 314 | 20 | 290 | 21 | 0.82 | 350 | 2 | 0.15 | Example |
| 176 | BJ | 4.5 | — | — | — | — | 0.76 | 350 | 2 | 0.22 | Example |
| 177 | BJ | 3.6 | — | — | — | — | 0.54 | 350 | 2 | 0.17 | Comp.Ex. |
| 178 | BJ | 3.2 | — | — | — | — | 0.62 | 350 | 2 | 0.15 | Example |
| 179 | BK | 2.4 | — | — | — | — | 0.67 | 350 | 2 | 0.17 | Example |
| 180 | BK | 3.5 | — | — | — | — | 0.49 | 350 | 2 | 0.25 | Example |
| 181 | BL | 3.8 | — | — | — | — | 0.71 | 350 | 2 | 0.50 | Example |
| 182 | BL | 2.7 | — | — | — | — | 0.85 | 350 | 2 | 0.15 | Example |
| 183 | BL | 1.5 | — | — | — | — | 2.57 | 350 | 2 | 0.06 | Comp.Ex. |
| 184 | BL | 2.3 | — | — | — | — | 0.74 | 350 | 8 | 0.07 | Example |
| 185 | BM | 3.3 | — | — | — | — | 0.74 | 350 | 2 | 0.19 | Example |
| 186 | BM | 2.8 | — | — | — | — | 0.79 | 350 | 2 | 0.24 | Comp.Ex. |
| 187 | BM | 2.8 | 267 | 35 | — | — | 0.75 | 350 | 2 | 0.18 | Example |
| 188 | BN | 3.1 | — | — | — | — | 0.85 | 350 | 2 | 0.04 | Example |
| 189 | BN | 2.1 | — | — | 304 | 14 | 0.73 | 350 | 2 | 0.06 | Example |
| 190 | BO | 3.4 | — | — | — | — | 0.68 | 350 | 2 | 0.09 | Comp.Ex. |
| 191 | BP | 2.6 | — | — | — | — | 0.76 | 350 | 2 | 0.28 | Comp.Ex. |
| 192 | BQ | 4.8 | — | — | — | — | 0.71 | 350 | 2 | 0.09 | Comp.Ex. |
| 193 | BR | Experiment stopped due to occurrence of cracking of slab during heating in hot rolling step | | | | | | | | | Comp.Ex. |
| 194 | BS | 3.3 | — | — | — | — | 0.53 | 350 | 2 | 0.10 | Comp.Ex. |
| 195 | BT | Experiment stopped due to occurrence of cracking of slab during heating in hot rolling step | | | | | | | | | Comp.Ex. |
| 196 | BU | Experiment stopped due to occurrence of cracking of slab during hot rolling in hot rolling step | | | | | | | | | Comp.Ex. |
| 197 | BV | 3.5 | — | — | — | — | 0.61 | 350 | 2 | 0.04 | Comp.Ex. |
| 198 | BW | Experiment stopped due to occurrence of cracking of slab during transportation after casting of slab | | | | | | | | | Comp.Ex. |
| 199 | BX | 3.5 | — | — | — | — | 0.93 | 350 | 2 | 0.13 | Comp.Ex. |
| 200 | BY | 3.7 | — | — | — | — | 0.92 | 350 | 2 | 0.05 | Comp.Ex. |
| 201 | A | 5.0 | — | — | — | — | 1.07 | 350 | 2 | 0.10 | Comp.Ex. |

TABLE 23

| | | Microstructure | | | | | | | | | | | |
| | | ¼ thickness Structure fraction | | | | | | | Base steel surface layer | | | | |
| | | | | | | | | | Structure fraction | | | Grain boundaries | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | and/or oxides in grains | |
| --- | --- | --- | --- | --- | --- | --- | --- | --- | --- | --- | --- | --- | --- | --- |
| 1 | A | 59 | 9 | 12 | 17 | 0 | 3 | 0 | 38 | 0 | 28 | 0.73 | none | Example |
| 2 | A | 64 | 6 | 8 | 15 | 2 | 2 | 3 | 31 | 1 | 17 | 0.55 | none | Comp.Ex. |
| 3 | A | 71 | 14 | 13 | 2 | 0 | 0 | 0 | 29 | 0 | 20 | 0.70 | none | Example |
| 4 | A | 81 | 3 | 3 | 0 | 13 | 0 | 0 | 19 | 0 | 15 | 0.77 | none | Example |
| 5 | B | 68 | 11 | 2 | 14 | 3 | 1 | 1 | 30 | 0 | 17 | 0.56 | none | Example |
| 6 | B | 80 | 6 | 4 | 8 | 0 | 2 | 0 | 18 | 0 | 12 | 0.66 | none | Example |
| 7 | B | 79 | 5 | 2 | 0 | 14 | 0 | 0 | 21 | 0 | 12 | 0.59 | none | Example |
| 8 | B | 72 | 14 | 7 | 2 | 0 | 5 | 0 | 23 | 0 | 16 | 0.68 | none | Example |
| 9 | C | 61 | 0 | 13 | 23 | 0 | 3 | 0 | 36 | 0 | 22 | 0.60 | none | Example |
| 10 | C | 61 | 4 | 20 | 0 | 8 | 7 | 0 | 32 | 2 | 22 | 0.70 | none | Example |
| 11 | C | 61 | 6 | 17 | 16 | 0 | 0 | 0 | 39 | 0 | 22 | 0.56 | present | Example |

TABLE 23-continued

| | | Microstructure | | | | | | | Base steel surface layer | | | | |
|---|---|---|---|---|---|---|---|---|---|---|---|---|---|
| | | ¼ thickness Structure fraction | | | | | | | Structure fraction | | | Grain boundaries | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | and/or oxides in grains | |
| 12 | C | 67 | 7 | 10 | 13 | 2 | 1 | 0 | 32 | 0 | 16 | 0.51 | none | Comp.Ex. |
| 13 | D | 71 | 3 | 6 | 18 | 0 | 2 | 0 | 27 | 0 | 11 | 0.40 | none | Example |
| 14 | D | 79 | 0 | 6 | 13 | 0 | 2 | 0 | 19 | 0 | 1 | 0.05 | present | Comp.Ex. |
| 15 | D | 63 | 4 | 13 | 2 | 15 | 3 | 0 | 34 | 0 | 18 | 0.53 | present | Example |
| 16 | D | 76 | 6 | 2 | 0 | 16 | 0 | 0 | 24 | 0 | 12 | 0.52 | none | Example |
| 17 | E | 65 | 2 | 9 | 18 | 4 | 2 | 0 | 33 | 0 | 19 | 0.57 | none | Example |
| 18 | E | 64 | 6 | 12 | 0 | 18 | 0 | 0 | 36 | 0 | 12 | 0.32 | none | Example |
| 19 | E | 55 | 12 | 16 | 15 | 0 | 1 | 1 | 43 | 0 | 14 | 0.32 | none | Example |
| 20 | E | 76 | 5 | 3 | 3 | 0 | 0 | 13 | 11 | 0 | 6 | 0.59 | none | Comp.Ex. |
| 21 | F | 67 | 8 | 5 | 17 | 1 | 2 | 0 | 31 | 0 | 23 | 0.74 | none | Example |
| 22 | F | 60 | 25 | 9 | 0 | 5 | 1 | 0 | 39 | 0 | 26 | 0.67 | none | Example |
| 23 | F | 65 | 11 | 16 | 3 | 0 | 5 | 0 | 30 | 2 | 25 | 0.84 | none | Example |
| 24 | F | 71 | 4 | 9 | 15 | 0 | 1 | 0 | 28 | 0 | 10 | 0.36 | none | Example |
| 25 | G | 72 | 9 | 0 | 15 | 3 | 1 | 0 | 27 | 0 | 21 | 0.78 | none | Example |

TABLE 24

| | | Microstructure | | | | | | | Base steel surface layer | | | | |
|---|---|---|---|---|---|---|---|---|---|---|---|---|---|
| | | ¼ thickness Structure fraction | | | | | | | Structure fraction | | | Grain boundaries | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | and/or oxides in grains | |
| 26 | G | 45 | 12 | 0 | 0 | 43 | 0 | 0 | 55 | 0 | 33 | 0.60 | present | Example |
| 27 | G | 67 | 14 | 3 | 14 | 0 | 2 | 0 | 31 | 2 | 31 | 1.00 | none | Comp.Ex. |
| 28 | G | 72 | 12 | 3 | 13 | 0 | 0 | 0 | 28 | 0 | 20 | 0.72 | none | Example |
| 29 | H | 70 | 2 | 5 | 21 | 0 | 2 | 0 | 28 | 0 | 16 | 0.58 | none | Example |
| 30 | H | 62 | 4 | 10 | 4 | 18 | 2 | 0 | 36 | 0 | 27 | 0.75 | none | Example |
| 31 | H | 87 | 0 | 3 | 8 | 0 | 2 | 0 | 11 | 1 | 7 | 0.61 | none | Example |
| 32 | I | 70 | 12 | 0 | 18 | 0 | 0 | 0 | 30 | 0 | 15 | 0.51 | none | Example |
| 33 | I | 68 | 18 | 6 | 0 | 4 | 4 | 0 | 28 | 1 | 17 | 0.60 | present | Example |
| 34 | I | 83 | 5 | 2 | 9 | 1 | 0 | 0 | 17 | 0 | 14 | 0.80 | none | Example |
| 35 | J | 70 | 7 | 5 | 16 | 0 | 2 | 0 | 28 | 0 | 12 | 0.43 | present | Example |
| 36 | J | 56 | 10 | 24 | 5 | 0 | 5 | 0 | 39 | 2 | 33 | 0.85 | none | Example |
| 37 | J | 70 | 8 | 4 | 15 | 0 | 3 | 0 | 27 | 0 | 18 | 0.68 | none | Example |
| 38 | K | 65 | 10 | 2 | 17 | 5 | 1 | 0 | 34 | 0 | 24 | 0.71 | none | Example |
| 39 | K | 55 | 21 | 13 | 6 | 0 | 0 | 5 | 40 | 0 | 34 | 6.84 | none | Example |
| 40 | K | 55 | 9 | 21 | 9 | 0 | 6 | 0 | 39 | 2 | 26 | 0.67 | present | Example |
| 41 | L | 73 | 0 | 5 | 19 | 0 | 3 | 0 | 24 | 0 | 16 | 0.68 | none | Example |
| 42 | L | 45 | 0 | 4 | 0 | 51 | 0 | 0 | 55 | 0 | 41 | 0.75 | none | Example |
| 43 | L | 74 | 4 | 10 | 2 | 0 | 0 | 10 | 16 | 0 | 12 | 0.72 | none | Comp.Ex. |
| 44 | M | 87 | 5 | 0 | 8 | 0 | 0 | 0 | 13 | 0 | 7 | 0.55 | none | Example |
| 45 | M | 59 | 26 | 6 | 7 | 0 | 2 | 0 | 39 | 0 | 22 | 0.56 | none | Example |
| 46 | M | 87 | 0 | 0 | 8 | 4 | 1 | 0 | 12 | 1 | 10 | 0.83 | none | Comp.Ex. |
| 47 | N | 62 | 13 | 3 | 21 | 0 | 0 | 1 | 37 | 0 | 26 | 0.69 | none | Example |
| 48 | N | 51 | 18 | 0 | 0 | 31 | 0 | 0 | 49 | 0 | 31 | 0.63 | none | Example |
| 49 | N | 31 | 31 | 6 | 24 | 5 | 3 | 0 | 66 | 3 | 49 | 0.74 | none | Comp.Ex. |
| 50 | O | 74 | 0 | 8 | 15 | 0 | 3 | 0 | 23 | 1 | 12 | 0.54 | none | Example |

TABLE 25

| Experimental Example | Chemical components | ¼ thickness Structure fraction | | | | | | | Base steel surface layer Structure fraction | | | Grain boundaries and/or oxides in grains | |
|---|---|---|---|---|---|---|---|---|---|---|---|---|---|
| | | Ferrite % | Bainite % | Bainitic ferrite % | Martensite % | Tempered martensite % | Residual austenite % | others % | Hard phase V2 % | Residual austenite % | Hard phase V1 % | V1/V2 | |
| 51 | O | 76 | 2 | 6 | 14 | 0 | 2 | 0 | 22 | 0 | 2 | 0.08 | none | Comp.Ex. |
| 52 | O | 69 | 0 | 9 | 21 | 0 | 1 | 0 | 30 | 0 | 17 | 0.56 | none | Example |
| 53 | O | 75 | 0 | 8 | 0 | 17 | 0 | 0 | 25 | 0 | 7 | 0.28 | none | Example |
| 54 | P | 74 | 9 | 2 | 14 | 0 | 1 | 0 | 25 | 0 | 17 | 0.66 | none | Example |
| 55 | P | 68 | 10 | 15 | 1 | 0 | 6 | 0 | 26 | 2 | 21 | 0.79 | none | Example |
| 56 | P | 72 | 10 | 7 | 10 | 1 | 0 | 0 | 28 | 0 | 23 | 0.82 | none | Example |
| 57 | Q | 84 | 0 | 4 | 12 | 0 | 0 | 0 | 16 | 0 | 11 | 0.66 | none | Example |
| 58 | Q | 66 | 14 | 8 | 12 | 0 | 0 | 0 | 34 | 0 | 25 | 0.74 | none | Example |
| 59 | Q | 58 | 5 | 19 | 0 | 12 | 6 | 0 | 36 | 5 | 28 | 0.77 | none | Comp.Ex. |
| 60 | R | 91 | 0 | 0 | 7 | 0 | 2 | 0 | 7 | 0 | 5 | 0.68 | none | Example |
| 61 | R | 88 | 3 | 0 | 9 | 0 | 0 | 0 | 12 | 0 | 4 | 0.37 | none | Example |
| 62 | R | 93 | 0 | 0 | 0 | 7 | 0 | 0 | 7 | 0 | 5 | 0.71 | none | Example |
| 63 | S | 73 | 3 | 10 | 13 | 0 | 1 | 0 | 26 | 0 | 19 | 0.74 | none | Example |
| 64 | S | 71 | 0 | 0 | 24 | 3 | 2 | 0 | 27 | 0 | 15 | 0.54 | none | Example |
| 65 | S | 73 | 4 | 8 | 15 | 0 | 0 | 0 | 27 | 0 | 12 | 0.46 | none | Comp.Ex. |
| 66 | T | 73 | 7 | 2 | 15 | 2 | 0 | 1 | 26 | 0 | 15 | 0.59 | none | Example |
| 67 | T | 70 | 22 | 8 | 0 | 0 | 0 | 0 | 30 | 0 | 19 | 0.62 | present | Example |
| 68 | T | 28 | 21 | 10 | 37 | 0 | 4 | 0 | 68 | 2 | 46 | 0.68 | none | Comp.Ex. |
| 69 | U | 76 | 4 | 7 | 11 | 0 | 2 | 0 | 22 | 0 | 14 | 0.62 | none | Example |
| 70 | U | 61 | 3 | 4 | 27 | 0 | 5 | 0 | 34 | 3 | 26 | 0.77 | none | Example |
| 71 | U | 63 | 14 | 21 | 0 | 0 | 2 | 0 | 35 | 0 | 26 | 0.74 | present | Example |
| 72 | V | 67 | 8 | 3 | 21 | 0 | 1 | 0 | 32 | 0 | 19 | 0.60 | none | Example |
| 73 | V | 63 | 27 | 9 | 0 | 0 | 1 | 0 | 36 | 0 | 26 | 0.73 | none | Example |
| 74 | V | 88 | 0 | 0 | 0 | 12 | 0 | 0 | 12 | 0 | 8 | 0.68 | none | Example |
| 75 | W | 68 | 6 | 3 | 23 | 0 | 0 | 0 | 32 | 0 | 19 | 0.60 | none | Example |

TABLE 26

| Experimental Example | Chemical components | ¼ thickness Structure fraction | | | | | | | Base steel surface layer Structure fraction | | | Grain boundaries and/or oxides in grains | |
|---|---|---|---|---|---|---|---|---|---|---|---|---|---|
| | | Ferrite % | Bainite % | Bainitic ferrite % | Martensite % | Tempered martensite % | Residual austenite % | others % | Hard phase V2 % | Residual austenite % | Hard phase V1 % | V1/V2 | |
| 76 | W | 80 | 2 | 3 | 14 | 0 | 1 | 0 | 19 | 0 | 0 | 0.00 | none | Comp.Ex. |
| 77 | W | 85 | 3 | 1 | 0 | 11 | 0 | 0 | 15 | 0 | 7 | 0.45 | present | Example |
| 78 | X | 90 | 2 | 2 | 6 | 0 | 0 | 0 | 10 | 0 | 5 | 0.45 | present | Example |
| 79 | X | 72 | 8 | 4 | 15 | 0 | 1 | 0 | 27 | 0 | 16 | 0.58 | present | Example |
| 80 | X | 74 | 6 | 0 | 0 | 20 | 0 | 0 | 26 | 0 | 15 | 0.57 | none | Comp.Ex. |
| 81 | Y | 84 | 0 | 4 | 11 | 0 | 1 | 0 | 15 | 0 | 8 | 0.55 | none | Example |
| 82 | Y | 52 | 14 | 0 | 0 | 34 | 0 | 0 | 48 | 0 | 25 | 0.53 | none | Example |
| 83 | Y | 73 | 12 | 6 | 9 | 0 | 0 | 0 | 27 | 0 | 17 | 0.63 | none | Example |
| 84 | Z | 71 | 8 | 3 | 18 | 0 | 0 | 0 | 29 | 0 | 19 | 0.66 | none | Example |
| 85 | Z | 67 | 10 | 5 | 16 | 0 | 2 | 0 | 31 | 0 | 14 | 0.45 | none | Comp.Ex. |
| 86 | Z | 81 | 4 | 0 | 14 | 0 | 1 | 0 | 18 | 0 | 14 | 0.76 | none | Example |
| 87 | AA | 72 | 3 | 6 | 16 | 1 | 2 | 0 | 26 | 0 | 15 | 0.57 | none | Example |
| 88 | AA | 60 | 0 | 13 | 3 | 22 | 2 | 0 | 38 | 1 | 29 | 0.76 | none | Example |
| 89 | AB | 59 | 11 | 7 | 23 | 0 | 0 | 0 | 41 | 0 | 31 | 0.75 | none | Example |
| 90 | AB | 62 | 38 | 0 | 0 | 0 | 0 | 0 | 38 | 0 | 27 | 0.70 | none | Example |
| 91 | AB | 76 | 15 | 6 | 0 | 0 | 3 | 0 | 21 | 1 | 13 | 0.60 | none | Example |
| 92 | AC | 88 | 0 | 2 | 7 | 0 | 3 | 0 | 9 | 0 | 6 | 0.70 | none | Example |
| 93 | AC | 87 | 0 | 3 | 5 | 0 | 5 | 0 | 8 | 2 | 5 | 0.63 | present | Example |
| 94 | AD | 62 | 8 | 6 | 24 | 0 | 0 | 0 | 38 | 0 | 30 | 0.80 | none | Example |
| 95 | AD | 61 | 7 | 8 | 0 | 23 | 1 | 0 | 38 | 0 | 21 | 0.56 | present | Example |
| 96 | AE | 69 | 7 | 3 | 17 | 0 | 1 | 3 | 27 | 0 | 16 | 0.58 | none | Example |
| 97 | AE | 55 | 33 | 4 | 0 | 8 | 0 | 0 | 45 | 0 | 33 | 0.74 | none | Example |

TABLE 26-continued

| | | Microstructure | | | | | | | | | | | |
|---|---|---|---|---|---|---|---|---|---|---|---|---|---|
| | | ¼ thickness Structure fraction | | | | | | | Base steel surface layer | | | | |
| | | | | | | | | | Structure fraction | | | Grain boundaries and/or oxides in grains | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | |
| 98 | AF | 74 | 6 | 4 | 13 | 0 | 2 | 1 | 23 | 1 | 13 | 0.56 | none | Example |
| 99 | AF | 50 | 2 | 6 | 34 | 8 | 0 | 0 | 50 | 0 | 29 | 0.57 | none | Example |
| 100 | AG | 68 | 6 | 6 | 18 | 0 | 2 | 0 | 30 | 0 | 21 | 0.70 | none | Example |

TABLE 27

| | | Microstructure | | | | | | | | | | | |
|---|---|---|---|---|---|---|---|---|---|---|---|---|---|
| | | ¼ thickness Structure fraction | | | | | | | Base steel surface layer | | | | |
| | | | | | | | | | Structure fraction | | | Grain boundaries and/or oxides in grains | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | |
| 101 | AG | 60 | 0 | 9 | 21 | 0 | 0 | 10 | 30 | 0 | 22 | 0.73 | none | Example |
| 102 | AH | 57 | 7 | 5 | 25 | 2 | 4 | 0 | 39 | 1 | 22 | 0.57 | none | Example |
| 103 | AH | 60 | 4 | 31 | 5 | 0 | 0 | 0 | 40 | 0 | 34 | 0.85 | none | Example |
| 104 | AI | 84 | 2 | 0 | 12 | 0 | 2 | 0 | 14 | 2 | 8 | 0.57 | none | Example |
| 105 | AI | 71 | 21 | 4 | 4 | 0 | 0 | 0 | 29 | 0 | 21 | 0.72 | none | Example |
| 106 | AJ | 70 | 8 | 5 | 16 | 0 | 1 | 0 | 29 | 0 | 17 | 0.59 | none | Example |
| 107 | AJ | 58 | 13 | 5 | 24 | 0 | 0 | 0 | 42 | 0 | 26 | 0.63 | none | Example |
| 108 | AK | 56 | 7 | 8 | 26 | 0 | 3 | 0 | 41 | 0 | 28 | 0.69 | present | Example |
| 109 | AK | 54 | 13 | 25 | 5 | 0 | 3 | 0 | 43 | 0 | 18 | 0.43 | none | Example |
| 110 | AL | 86 | 5 | 0 | 6 | 0 | 0 | 3 | 11 | 0 | 8 | 0.76 | none | Example |
| 111 | AL | 76 | 19 | 5 | 0 | 0 | 0 | 0 | 24 | 0 | 16 | 0.65 | none | Example |
| 112 | AM | 63 | 13 | 3 | 19 | 0 | 1 | 1 | 35 | 0 | 17 | 0.48 | none | Example |
| 113 | AM | 64 | 5 | 6 | 0 | 24 | 1 | 0 | 35 | 0 | 20 | 0.58 | none | Example |
| 114 | AM | 63 | 7 | 14 | 8 | 3 | 5 | 0 | 32 | 2 | 18 | 0.55 | none | Example |
| 115 | AM | 61 | 15 | 10 | 12 | 0 | 2 | 0 | 37 | 0 | 3 | 0.09 | none | Comp.Ex. |
| 116 | AN | 79 | 5 | 3 | 11 | 0 | 0 | 2 | 19 | 0 | 14 | 0.72 | none | Example |
| 117 | AN | 61 | 7 | 6 | 23 | 0 | 3 | 0 | 36 | 0 | 28 | 0.79 | none | Example |
| 118 | AO | 81 | 5 | 3 | 10 | 0 | 1 | 0 | 18 | 0 | 13 | 0.74 | none | Example |
| 119 | AO | 70 | 7 | 4 | 19 | 0 | 0 | 0 | 30 | 0 | 18 | 0.60 | none | Example |
| 120 | AP | 77 | 8 | 4 | 8 | 0 | 1 | 2 | 20 | 0 | 11 | 0.56 | none | Example |
| 121 | AP | 69 | 16 | 1 | 14 | 0 | 0 | 0 | 31 | 0 | 26 | 0.83 | none | Example |
| 122 | AP | 75 | 18 | 4 | 3 | 0 | 0 | 0 | 25 | 0 | 19 | 0.76 | none | Example |
| 123 | AQ | 83 | 5 | 0 | 10 | 0 | 0 | 2 | 15 | 0 | 9 | 0.58 | present | Example |
| 124 | AQ | 83 | 6 | 1 | 10 | 0 | 0 | 0 | 17 | 0 | 9 | 0.50 | none | Example |
| 125 | AR | 87 | 4 | 2 | 7 | 0 | 0 | 0 | 13 | 0 | 6 | 0.45 | present | Example |

TABLE 28

| | | Microstructure | | | | | | | | | | | |
|---|---|---|---|---|---|---|---|---|---|---|---|---|---|
| | | ¼ thickness Structure fraction | | | | | | | Base steel surface layer | | | | |
| | | | | | | | | | Structure fraction | | | Grain boundaries and/or oxides in grains | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | |
| 126 | AR | 73 | 7 | 3 | 15 | 0 | 2 | 0 | 25 | 0 | 19 | 0.77 | none | Example |
| 127 | AS | 75 | 2 | 8 | 15 | 0 | 0 | 0 | 25 | 0 | 17 | 0.67 | none | Example |

TABLE 28-continued

| | | Microstructure | | | | | | | | | | | |
|---|---|---|---|---|---|---|---|---|---|---|---|---|---|
| | | ¼ thickness | | | | | | | Base steel surface layer | | | | |
| | | Structure fraction | | | | | | | Structure fraction | | | Grain | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | boundaries and/or oxides in grains | |
| 128 | AS | 61 | 9 | 16 | 14 | 0 | 0 | 0 | 39 | 0 | 32 | 0.82 | none | Example |
| 129 | AT | 80 | 2 | 3 | 14 | 0 | 0 | 1 | 19 | 0 | 12 | 0.64 | present | Example |
| 130 | AT | 88 | 4 | 2 | 0 | 6 | 0 | 0 | 12 | 0 | 7 | 0.60 | none | Example |
| 131 | AU | 87 | 2 | 0 | 11 | 0 | 0 | 0 | 13 | 0 | 9 | 0.72 | none | Example |
| 132 | AU | 80 | 5 | 3 | 12 | 0 | 0 | 0 | 20 | 0 | 19 | 0.95 | none | Comp.Ex. |
| 133 | AU | 86 | 5 | 4 | 0 | 0 | 5 | 0 | 9 | 1 | 7 | 0.83 | none | Example |
| 134 | AU | 88 | 3 | 1 | 7 | 0 | 1 | 0 | 11 | 0 | 7 | 0.68 | none | Example |
| 135 | AV | 79 | 0 | 5 | 13 | 0 | 3 | 0 | 18 | 0 | 12 | 0.64 | none | Example |
| 136 | AV | 65 | 4 | 10 | 19 | 2 | 0 | 0 | 35 | 0 | 27 | 0.78 | none | Comp.Ex. |
| 137 | AV | 61 | 13 | 17 | 4 | 0 | 5 | 0 | 34 | 3 | 26 | 0.75 | none | Example |
| 138 | AW | 67 | 11 | 4 | 16 | 0 | 1 | 1 | 31 | 0 | 22 | 0.71 | none | Example |
| 139 | AW | 63 | 13 | 8 | 0 | 0 | 0 | 16 | 21 | 0 | 14 | 0.66 | none | Comp.Ex. |
| 140 | AW | 60 | 23 | 13 | 0 | 0 | 4 | 0 | 36 | 2 | 23 | 0.65 | present | Example |
| 141 | AX | 61 | 5 | 6 | 23 | 2 | 3 | 0 | 36 | 0 | 27 | 0.75 | none | Example |
| 142 | AX | 64 | 11 | 6 | 18 | 0 | 1 | 0 | 35 | 0 | 26 | 0.73 | none | Example |
| 143 | AY | 53 | 4 | 16 | 25 | 0 | 2 | 0 | 45 | 1 | 28 | 0.62 | present | Example |
| 144 | AY | 54 | 6 | 34 | 0 | 0 | 6 | 0 | 40 | 0 | 22 | 0.55 | none | Example |
| 145 | AZ | 72 | 5 | 9 | 12 | 0 | 0 | 2 | 26 | 0 | 20 | 0.75 | none | Example |
| 146 | AZ | 74 | 5 | 6 | 15 | 0 | 0 | 0 | 26 | 0 | 20 | 0.76 | none | Example |
| 147 | BA | 75 | 3 | 5 | 15 | 0 | 2 | 0 | 23 | 0 | 18 | 0.78 | none | Example |
| 148 | BA | 56 | 10 | 5 | 21 | 7 | 1 | 0 | 43 | 0 | 23 | 0.54 | present | Example |
| 149 | BB | 56 | 8 | 7 | 26 | 0 | 3 | 0 | 41 | 0 | 27 | 0.66 | none | Example |
| 150 | BB | 70 | 5 | 8 | 16 | 0 | 1 | 0 | 29 | 0 | 19 | 0.65 | none | Comp.Ex. |

TABLE 29

| | | Microstructure | | | | | | | | | | | |
|---|---|---|---|---|---|---|---|---|---|---|---|---|---|
| | | ¼ thickness | | | | | | | Base steel surface layer | | | | |
| | | Structure fraction | | | | | | | Structure fraction | | | Grain | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | boundaries and/or oxides in grains | |
| 151 | BB | 65 | 8 | 20 | 3 | 0 | 4 | 0 | 31 | 0 | 18 | 0.58 | none | Example |
| 152 | BB | 66 | 11 | 14 | 9 | 0 | 0 | 0 | 34 | 0 | 13 | 0.38 | none | Example |
| 153 | BC | 86 | 4 | 0 | 8 | 0 | 0 | 2 | 12 | 0 | 9 | 0.75 | none | Example |
| 154 | BC | 66 | 13 | 6 | 4 | 5 | 5 | 1 | 28 | 1 | 22 | 0.78 | none | Example |
| 155 | BC | 67 | 9 | 3 | 21 | 0 | 0 | 0 | 33 | 0 | 24 | 0.74 | none | Example |
| 156 | BC | 79 | 10 | 8 | 0 | 0 | 3 | 0 | 18 | 0 | 14 | 0.76 | present | Example |
| 157 | BC | 82 | 4 | 3 | 11 | 0 | 0 | 0 | 18 | 0 | 17 | 0.97 | none | Comp.Ex. |
| 158 | BD | 80 | 5 | 0 | 11 | 0 | 1 | 3 | 16 | 1 | 12 | 0.76 | none | Example |
| 159 | BD | 80 | 6 | 0 | 14 | 0 | 0 | 0 | 20 | 0 | 15 | 0.77 | none | Example |
| 160 | BE | 77 | 3 | 4 | 14 | 0 | 2 | 0 | 21 | 0 | 14 | 0.67 | none | Example |
| 161 | BE | 85 | 0 | 4 | 9 | 0 | 2 | 0 | 13 | 0 | 8 | 0.62 | none | Example |
| 162 | BF | 64 | 13 | 7 | 13 | 0 | 3 | 0 | 33 | 0 | 18 | 0.55 | none | Example |
| 163 | BF | 61 | 5 | 7 | 24 | 0 | 3 | 0 | 36 | 0 | 28 | 0.77 | none | Example |
| 164 | BF | 63 | 1 | 27 | 4 | 0 | 5 | 0 | 32 | 2 | 17 | 0.53 | none | Example |
| 165 | BF | 63 | 3 | 21 | 0 | 0 | 13 | 0 | 24 | 3 | 13 | 0.56 | none | Comp.Ex. |
| 166 | BG | 87 | 0 | 4 | 7 | 0 | 2 | 0 | 11 | 0 | 4 | 0.35 | none | Example |
| 167 | BG | 41 | 5 | 10 | 0 | 42 | 2 | 0 | 57 | 0 | 34 | 0.60 | none | Example |
| 168 | BG | 80 | 3 | 6 | 11 | 0 | 0 | 0 | 20 | 0 | 1 | 0.06 | none | Comp.Ex. |
| 169 | BG | 71 | 2 | 6 | 19 | 0 | 2 | 0 | 27 | 0 | 14 | 0.52 | none | Example |
| 170 | BH | 65 | 3 | 7 | 19 | 5 | 0 | 1 | 34 | 0 | 22 | 0.65 | none | Example |
| 171 | BH | 54 | 5 | 14 | 25 | 0 | 2 | 0 | 44 | 0 | 33 | 0.75 | none | Comp.Ex. |
| 172 | BH | 58 | 6 | 27 | 3 | 0 | 6 | 0 | 36 | 2 | 29 | 0.80 | none | Example |
| 173 | BH | 54 | 13 | 23 | 5 | 0 | 5 | 0 | 41 | 0 | 34 | 0 83 | none | Example |
| 174 | BI | 85 | 0 | 5 | 8 | 0 | 2 | 0 | 13 | 0 | 7 | 0.57 | present | Example |
| 175 | BI | 75 | 2 | 13 | 0 | 5 | 5 | 0 | 20 | 0 | 9 | 0.46 | none | Example |

TABLE 30

| | | Microstructure | | | | | | | | | | | |
|---|---|---|---|---|---|---|---|---|---|---|---|---|---|
| | | ¼ thickness | | | | | | | Base steel surface layer | | | | |
| | | Structure fraction | | | | | | | Structure fraction | | | | |
| Experimental Example | Chemical components | Ferrite % | Bainite % | Bainitic ferrite % | Martensite % | Tempered martensite % | Residual austenite % | others % | Hard phase V2 % | Residual austenite % | Hard phase V1 % | V1/V2 | Grains and/or oxides in grains | |
| 176 | BJ | 83 | 4 | 2 | 11 | 0 | 0 | 0 | 17 | 0 | 10 | 0.60 | none | Example |
| 177 | BJ | 63 | 9 | 16 | 0 | 0 | 0 | 12 | 25 | 0 | 21 | 0.83 | none | Comp.Ex. |
| 178 | BJ | 83 | 3 | 4 | 8 | 0 | 2 | 0 | 15 | 0 | 10 | 0.64 | none | Example |
| 179 | BK | 86 | 0 | 0 | 12 | 0 | 2 | 0 | 12 | 0 | 6 | 0.49 | none | Example |
| 180 | BK | 64 | 14 | 7 | 15 | 0 | 0 | 0 | 36 | 0 | 31 | 0.85 | none | Example |
| 181 | BL | 78 | 3 | 3 | 16 | 0 | 0 | 0 | 22 | 0 | 17 | 0.78 | present | Example |
| 182 | BL | 61 | 8 | 6 | 3 | 21 | 1 | 0 | 38 | 0 | 33 | 0.88 | none | Example |
| 183 | BL | 78 | 5 | 6 | 9 | 0 | 2 | 0 | 20 | 0 | 11 | 0.55 | none | Comp.Ex. |
| 184 | BL | 68 | 20 | 10 | 2 | 0 | 0 | 0 | 32 | 0 | 20 | 0.61 | none | Example |
| 185 | BM | 79 | 0 | 8 | 11 | 0 | 2 | 0 | 19 | 1 | 9 | 0.48 | none | Example |
| 186 | BM | 90 | 0 | 0 | 0 | 0 | 0 | 10 | 0 | 0 | 0 | 0.46 | none | Comp.Ex. |
| 187 | BM | 76 | 0 | 13 | 5 | 0 | 6 | 0 | 18 | 0 | 7 | 0.37 | none | Example |
| 188 | BN | 86 | 5 | 2 | 7 | 0 | 0 | 0 | 14 | 0 | 8 | 0.54 | none | Example |
| 189 | BN | 73 | 10 | 0 | 0 | 17 | 0 | 0 | 27 | 0 | 19 | 0.69 | present | Example |
| 190 | BO | 98 | 0 | 1 | 0 | 0 | 0 | 1 | 1 | 0 | 0 | 0.00 | none | Comp.Ex. |
| 191 | BP | 47 | 7 | 6 | 37 | 0 | 3 | 0 | 50 | 0 | 38 | 0.75 | none | Comp.Ex. |
| 192 | BQ | 71 | 8 | 0 | 0 | 0 | 0 | 21 | 8 | 0 | 6 | 0.75 | none | Comp.Ex. |
| 193 | BR | Experiment stopped due to occurrence of cracking of slab during heating in hot rolling step | | | | | | | | | | | | Comp.Ex. |
| 194 | BS | 84 | 0 | 2 | 0 | 0 | 0 | 14 | 2 | 0 | 0 | 0.00 | none | Comp.Ex. |
| 195 | BT | Experiment stopped due to occurrence of cracking of slab during heating in hot rolling step | | | | | | | | | | | | Comp.Ex. |
| 196 | BU | Experiment stopped due to occurrence of cracking of slab during hot rolling in hot rolling step | | | | | | | | | | | | Comp.Ex. |
| 197 | BV | 70 | 11 | 4 | 14 | 0 | 1 | 0 | 29 | 0 | 19 | 0.67 | none | Comp.Ex. |
| 198 | BW | Experiment stopped due to occurrence of cracking of slab during transportation after casting of slab | | | | | | | | | | | | Comp.Ex. |
| 199 | BX | 68 | 6 | 8 | 17 | 0 | 1 | 0 | 31 | 0 | 24 | 0.79 | none | Comp.Ex. |
| 200 | BY | 60 | 4 | 7 | 26 | 0 | 3 | 0 | 37 | 0 | 23 | 0.62 | none | Comp.Ex. |
| 201 | A | 59 | 8 | 12 | 17 | 0 | 4 | 0 | 38 | 0 | 18 | 0.47 | none | Comp.Ex. |

TABLE 31

| | | Plated layer | | | | | Base steel sheet | | | |
|---|---|---|---|---|---|---|---|---|---|---|
| | | ζ Phase | | | δ1 Phase | | | | | |
| Experimental Example | Chemical components | Content Fe % | Al % | Boundary surface occupancy ratio % | Occupancy ratio of ζ grain in which oxides present % | Boundary surface occupancy ratio % | Plated amount g/m2 | Average thickness of refined layer μm | Average grain size of ferrite phase μm | Maximum size of oxide μm | |
| 1 | A | 3.6 | 0.19 | 51 | 0 | 0 | 61 | 2.4 | 1.6 | 0.02 | Example |
| 2 | A | 8.2 | 0.12 | 51 | 0 | 49 | 56 | 2.7 | 0.8 | 0.02 | Comp.Ex. |
| 3 | A | 2.5 | 0.20 | 59 | 0 | 0 | 67 | 2.4 | 0.6 | 0.04 | Example |
| 4 | A | 1.9 | 0.24 | 57 | 0 | 0 | 56 | 2.7 | 0.7 | 0.1 | Example |
| 5 | B | 2.8 | 0.23 | 40 | 0 | 0 | 74 | 3.7 | 0.6 | 0.1 | Example |
| 6 | B | 3.2 | 0.40 | 40 | 4 | 0 | 69 | 3.5 | 0.3 | 0.2 | Example |
| 7 | B | 0.9 | 0.43 | 35 | 0 | 0 | 60 | 3.4 | 0.4 | 0.1 | Example |
| 8 | B | 0.7 | 0.18 | 42 | 0 | 0 | 72 | 0.9 | 1.6 | 0.1 | Example |
| 9 | C | 2.8 | 0.26 | 46 | 6 | 0 | 58 | 2.3 | 0.4 | 0.2 | Example |
| 10 | C | 0.9 | 0.18 | 52 | 6 | 0 | 67 | 1.6 | 0.5 | 0.3 | Example |
| 11 | C | 1.7 | 0.20 | 41 | 5 | 0 | 63 | 2.2 | 0.4 | 0.3 | Example |
| 12 | C | 0.1 | 0.54 | 6 | 0 | 0 | 58 | 2.2 | 0.3 | 0.1 | Comp.Ex. |
| 13 | D | 1.6 | 0.23 | 51 | 0 | 0 | 68 | 3.0 | 0.3 | 0.1 | Example |
| 14 | D | 2.8 | 0.18 | 69 | 0 | 0 | 67 | 3.7 | 0.4 | 0.02 | Comp.Ex. |
| 15 | D | 2.2 | 0.31 | 41 | 0 | 0 | 65 | 2.9 | 0.4 | 0.04 | Example |
| 16 | D | 2.0 | 0.32 | 53 | 0 | 0 | 66 | 2.6 | 1.8 | 0.04 | Example |
| 17 | E | 2.0 | 0.23 | 65 | 0 | 0 | 70 | 2.3 | 1.5 | 0.02 | Example |
| 18 | E | 1.6 | 0.22 | 37 | 5 | 0 | 70 | 3.0 | 0.3 | 0.3 | Example |
| 19 | E | 1.9 | 0.19 | 50 | 0 | 0 | 66 | 2.5 | 0.4 | 0.1 | Example |
| 20 | E | 2.4 | 0.17 | 56 | 0 | 0 | 57 | 2.4 | 0.4 | 0.1 | Comp.Ex. |
| 21 | F | 2.0 | 0.25 | 49 | 9 | 0 | 68 | 2.8 | 0.4 | 0.3 | Example |
| 22 | F | 1.5 | 0.37 | 26 | 0 | 0 | 68 | 3.1 | 0.3 | 0.1 | Example |
| 23 | F | 1.2 | 0.29 | 50 | 10 | 0 | 64 | 1.9 | 0.4 | 0.5 | Example |
| 24 | F | 3.4 | 0.16 | 63 | 0 | 0 | 64 | 4.2 | 0.3 | 0.01 | Example |
| 25 | G | 2.6 | 0.34 | 49 | 0 | 0 | 71 | 2.9 | 0.3 | 0.1 | Example |
| 26 | G | 2.6 | 0.33 | 42 | 0 | 0 | 61 | 3.3 | 0.3 | 0.04 | Example |

TABLE 31-continued

| | | Plated layer | | | | | | Base steel sheet | | | |
|---|---|---|---|---|---|---|---|---|---|---|---|
| | | ζ Phase | | | δ1 Phase | | | | | | |
| | | Content | | Boundary surface occupancy ratio | Occupancy ratio of ζ grain in which oxides present | Boundary surface occupancy ratio | Plated amount | Average thickness of refined layer | Average grain size of ferrite phase | Maximum size of oxide | |
| Experimental Example | Chemical components | Fe % | Al % | % | % | % | g/m2 | μm | μm | μm | |
| 27 | G | 2.0 | 0.30 | 39 | 0 | 0 | 65 | 3.2 | 0.3 | 0.04 | Comp.Ex. |
| 28 | G | 1.8 | 0.34 | 49 | 0 | 0 | 56 | 3.6 | 0.3 | 0.02 | Example |
| 29 | H | 2.1 | 0.22 | 48 | 4 | 0 | 70 | 2.3 | 0.4 | 0.2 | Example |
| 30 | H | 1.4 | 0.29 | 17 | 10 | 0 | 64 | 1.0 | 0.5 | 0.2 | Example |
| 31 | H | 2.0 | 0.42 | 58 | 0 | 0 | 61 | 2.4 | 0.3 | 0.1 | Example |
| 32 | I | 2.9 | 0.31 | 56 | 19 | 0 | 67 | 3.5 | 0.4 | 0.4 | Example |
| 33 | I | 4.2 | 0.16 | 88 | 28 | 3 | 75 | 1.8 | 0.6 | 0.1 | Example |
| 34 | I | 2.5 | 0.31 | 46 | 0 | 0 | 58 | 2.5 | 1.3 | 0.04 | Example |
| 35 | J | 2.5 | 0.26 | 51 | 8 | 0 | 72 | 2.9 | 0.3 | 0.3 | Example |
| 36 | J | 2.0 | 0.29 | 42 | 0 | 0 | 54 | 2.5 | 0.4 | 0.1 | Example |
| 37 | J | 1.1 | 0.25 | 29 | 9 | 0 | 66 | 0.8 | 1.9 | 0.4 | Example |
| 38 | K | 2.1 | 0.24 | 40 | 0 | 0 | 69 | 1.9 | 0.3 | 0.03 | Example |
| 39 | K | 1.9 | 0.25 | 50 | 0 | 0 | 71 | 2.1 | 0.4 | 0.1 | Example |
| 40 | K | 2.6 | 0.21 | 54 | 6 | 0 | 55 | 2.9 | 0.2 | 0.2 | Example |
| 41 | L | 2.3 | 0.26 | 62 | 8 | 0 | 56 | 2.6 | 0.3 | 0.3 | Example |
| 42 | L | 2.1 | 0.32 | 51 | 0 | 0 | 65 | 2.3 | 0.3 | 0.1 | Example |
| 43 | L | 3.2 | 0.46 | 40 | 0 | 0 | 57 | 3.0 | 0.3 | 0.03 | Comp.Ex. |
| 44 | M | 2.9 | 0.20 | 51 | 0 | 0 | 65 | 3.4 | 0.3 | 0.02 | Example |
| 45 | M | 2.0 | 0.37 | 31 | 0 | 0 | 57 | 3.3 | 0.3 | 0.03 | Example |
| 46 | M | 3.0 | 0.27 | 62 | 0 | 0 | 66 | 2.8 | 0.4 | 0.1 | Comp.Ex. |
| 47 | N | 3.0 | 0.16 | 65 | 9 | 0 | 64 | 3.5 | 0.3 | 0.5 | Example |
| 48 | N | 3.2 | 0.33 | 60 | 7 | 0 | 61 | 3.3 | 0.2 | 0.3 | Example |
| 49 | N | 3.6 | 0.31 | 45 | 0 | 0 | 63 | 3.1 | 0.3 | 0.02 | Comp.Ex. |
| 50 | O | 2.0 | 0.27 | 55 | 0 | 0 | 62 | 1.9 | 0.4 | 0.02 | Example |

TABLE 32

| | | Plated layer | | | | | | Base steel sheet | | | |
|---|---|---|---|---|---|---|---|---|---|---|---|
| | | ζ Phase | | | δ1 Phase | | | | | | |
| | | Content | | Boundary surface occupancy ratio | Occupancy ratio of ζ grain in which oxides present | Boundary surface occupancy ratio | Plated amount | Average thickness of refined layer | Average grain size of ferrite phase | Maximum size of oxide | |
| Experimental Example | Chemical components | Fe % | Al % | % | % | % | g/m2 | μm | μm | μm | |
| 51 | O | 1.3 | 0.27 | 40 | 4 | 0 | 63 | 1.0 | 0.5 | 0.2 | Comp.Ex. |
| 52 | O | 1.7 | 0.30 | 33 | 0 | 0 | 62 | 1.8 | 0.3 | 0.1 | Example |
| 53 | O | 1.0 | 0.09 | 31 | 0 | 0 | 60 | 1.8 | 0.6 | 0.1 | Example |
| 54 | P | 2.0 | 0.20 | 46 | 0 | 0 | 74 | 2.3 | 1.4 | 0.1 | Example |
| 55 | P | 1.3 | 0.22 | 26 | 7 | 0 | 65 | 0.3 | 0.9 | 0.4 | Example |
| 56 | P | 0.6 | 0.29 | 21 | 0 | 0 | 66 | 2.1 | 0.5 | 0.1 | Example |
| 57 | Q | 1.3 | 0.22 | 42 | 0 | 0 | 62 | 2.4 | 0.4 | 0.1 | Example |
| 58 | Q | 1.5 | 0.31 | 48 | 0 | 0 | 70 | 2.2 | 0.4 | 0.1 | Example |
| 59 | Q | 1.6 | 0.25 | 44 | 8 | 0 | 74 | 2.0 | 0.5 | 0.3 | Comp.Ex. |
| 60 | R | 3.7 | 0.22 | 60 | 0 | 0 | 75 | 2.1 | 0.4 | 0.1 | Example |
| 61 | R | 2.1 | 0.19 | 55 | 0 | 0 | 68 | 2.0 | 0.4 | 0.1 | Example |
| 62 | R | 3.1 | 0.17 | 63 | 4 | 0 | 64 | 2.9 | 0.4 | 0.2 | Example |
| 63 | S | 3.2 | 0.27 | 48 | 0 | 0 | 68 | 2.3 | 0.3 | 0.1 | Example |
| 64 | S | 2.3 | 0.37 | 33 | 0 | 0 | 58 | 1.9 | 0.5 | 0.1 | Example |
| 65 | S | 2.7 | 0.27 | 36 | 0 | 0 | 152 | 1.8 | 0.4 | 0.1 | Comp.Ex. |
| 66 | T | 2.7 | 0.29 | 53 | 4 | 0 | 56 | 2.4 | 0.4 | 0.2 | Example |
| 67 | T | 3.0 | 0.27 | 51 | 0 | 0 | 56 | 3.0 | 1.5 | 0.02 | Example |
| 68 | T | 1.2 | 0.22 | 32 | 0 | 0 | 75 | 2.6 | 0.5 | 0.1 | Comp.Ex. |
| 69 | U | 2.4 | 0.23 | 54 | 0 | 0 | 58 | 1.8 | 0.5 | 0.1 | Example |
| 70 | U | 1.8 | 0.27 | 61 | 4 | 0 | 57 | 1.7 | 0.3 | 0.2 | Example |
| 71 | U | 2.3 | 0.20 | 46 | 0 | 0 | 66 | 1.1 | 0.5 | 0.02 | Example |
| 72 | V | 1.4 | 0.19 | 45 | 0 | 0 | 74 | 3.9 | 0.5 | 0.03 | Example |
| 73 | V | 1.2 | 0.45 | 37 | 0 | 0 | 56 | 2.2 | 0.6 | 0.04 | Example |
| 74 | V | 1.6 | 0.31 | 35 | 0 | 0 | 68 | 2.0 | 0.5 | 0.04 | Example |
| 75 | W | 1.6 | 0.27 | 50 | 0 | 0 | 72 | 1.9 | 0.4 | 0.1 | Example |
| 76 | W | 7.1 | 0.14 | 14 | 7 | 81 | 58 | 14.1 | 0.2 | 0.4 | Comp.Ex. |
| 77 | W | 2.7 | 0.25 | 45 | 0 | 0 | 63 | 2.7 | 0.4 | 0.1 | Example |
| 78 | X | 1.4 | 0.27 | 48 | 5 | 0 | 66 | 2.6 | 0.4 | 0.3 | Example |

TABLE 32-continued

| | | Plated layer | | | | | | Base steel sheet | | | |
|---|---|---|---|---|---|---|---|---|---|---|---|
| | | ζ Phase | | | δ1 Phase | | | | | | |
| | | Content | | Boundary surface occupancy | Occupancy ratio of ζ grain in which | Boundary surface occupancy | Plated | Average thickness of refined | Average grain size of ferrite | Maximum size | |
| Experimental Example | Chemical components | Fe % | Al % | ratio % | oxides present % | ratio % | amount g/m2 | layer μm | phase μm | of oxide μm | |
| 79 | X | 2.0 | 0.31 | 46 | 0 | 0 | 69 | 3.1 | 0.5 | 0.1 | Example |
| 80 | X | 2.2 | 0.20 | 51 | 5 | 0 | 75 | 2.6 | 0.5 | 0.4 | Comp.Ex. |
| 81 | Y | 2.8 | 0.21 | 59 | 0 | 0 | 59 | 2.1 | 0.5 | 0.1 | Example |
| 82 | Y | 3.3 | 0.13 | 67 | 0 | 0 | 70 | 2.4 | 0.5 | 0.1 | Example |
| 83 | Y | 2.4 | 0.16 | 54 | 6 | 0 | 60 | 1.4 | 0.8 | 0.3 | Example |
| 84 | Z | 1.9 | 0.28 | 46 | 0 | 0 | 71 | 2.7 | 0.6 | 0.04 | Example |
| 85 | Z | 2.6 | 0.23 | 63 | 0 | 0 | 70 | 2.3 | 0.5 | 1.0 | Comp.Ex. |
| 86 | Z | 1.9 | 0.16 | 56 | 4 | 0 | 58 | 2.9 | 0.5 | 0.2 | Example |
| 87 | AA | 1.8 | 0.30 | 55 | 0 | 0 | 63 | 2.1 | 2.5 | 0.02 | Example |
| 88 | AA | 1.8 | 0.28 | 41 | 7 | 0 | 58 | 1.6 | 0.6 | 0.4 | Example |
| 89 | AB | 2.4 | 0.20 | 54 | 0 | 0 | 66 | 4.3 | 0.4 | 0.04 | Example |
| 90 | AB | 2.1 | 0.75 | 28 | 0 | 0 | 65 | 4.6 | 0.4 | 0.02 | Example |
| 91 | AB | 1.9 | 0.26 | 40 | 0 | 0 | 66 | 0.5 | 0.7 | 0.1 | Example |
| 92 | AC | 1.7 | 0.18 | 40 | 4 | 0 | 59 | 1.7 | 0.5 | 0.2 | Example |
| 93 | AC | 1.6 | 0.20 | 55 | 0 | 0 | 57 | 1.9 | 0.5 | 0.1 | Example |
| 94 | AD | 3.8 | 0.23 | 60 | 0 | 0 | 57 | 2.5 | 0.3 | 0.1 | Example |
| 95 | AD | 2.2 | 0.22 | 58 | 9 | 0 | 67 | 2.6 | 0.3 | 0.5 | Example |
| 96 | AE | 2.6 | 0.27 | 39 | 0 | 0 | 65 | 2.5 | 2.4 | 0.02 | Example |
| 97 | AE | 3.0 | 0.30 | 49 | 4 | 0 | 64 | 2.5 | 0.4 | 0.3 | Example |
| 98 | AF | 2.1 | 0.22 | 54 | 5 | 0 | 72 | 2.4 | 0.5 | 0.3 | Example |
| 99 | AF | 2.1 | 0.19 | 50 | 0 | 0 | 70 | 2.0 | 0.4 | 0.1 | Example |
| 100 | AG | 1.6 | 0.24 | 41 | 0 | 0 | 59 | 1.9 | 0.5 | 0.1 | Example |

TABLE 33

| | | Plated layer | | | | | | Base steel sheet | | | |
|---|---|---|---|---|---|---|---|---|---|---|---|
| | | ζ Phase | | | | | | | | | |
| | | Content | | Boundary surface occupancy | Occupancy ratio of ζ grain in which oxides | δ1 Phase Boundary surface occupancy | Plated | Average thickness of refined | Average grain size of ferrite | Maximum | |
| Experimental Example | Chemical components | Fe % | Al % | ratio % | present % | ratio % | amount g/m2 | layer μm | phase μm | size of oxide μm | |
| 101 | AG | 2.6 | 0.20 | 69 | 0 | 0 | 69 | 2.8 | 0.4 | 0.1 | Example |
| 102 | AH | 2.8 | 0.21 | 56 | 0 | 0 | 72 | 3.0 | 0.5 | 0.03 | Example |
| 103 | AH | 2.9 | 0.29 | 48 | 0 | 0 | 72 | 2.3 | 0.5 | 0.04 | Example |
| 104 | AI | 2.1 | 0.25 | 52 | 7 | 0 | 68 | 2.8 | 0.4 | 0.2 | Example |
| 105 | AI | 1.7 | 0.29 | 35 | 0 | 0 | 62 | 2.3 | 0.5 | 0.04 | Example |
| 106 | AJ | 2.3 | 0.23 | 40 | 0 | 0 | 69 | 3.1 | 1.5 | 0.02 | Example |
| 107 | AJ | 3.6 | 0.13 | 80 | 0 | 0 | 64 | 3.2 | 0.6 | 0.1 | Example |
| 108 | AK | 2.2 | 0.19 | 63 | 4 | 0 | 71 | 2.8 | 0.5 | 0.2 | Example |
| 109 | AK | 2.0 | 0.16 | 61 | 0 | 0 | 76 | 2.3 | 0.4 | 0.1 | Example |
| 110 | AL | 4.2 | 0.26 | 61 | 5 | 5 | 57 | 4.4 | 0.6 | 0.4 | Example |
| 111 | AL | 3.1 | 0.30 | 38 | 0 | 0 | 67 | 4.0 | 0.4 | 0.1 | Example |
| 112 | AM | 1.8 | 0.21 | 56 | 0 | 0 | 68 | 2.7 | 0.5 | 0.1 | Example |
| 113 | AM | 3.1 | 0.18 | 51 | 0 | 0 | 57 | 2.1 | 0.4 | 0.1 | Example |
| 114 | AM | 2.2 | 0.24 | 50 | 0 | 0 | 73 | 2.4 | 0.4 | 0.1 | Example |
| 115 | AM | 1.6 | 0.20 | 45 | 0 | 0 | 70 | 2.7 | 0.5 | 0.1 | Comp.Ex. |
| 116 | AN | 2.6 | 0.30 | 53 | 0 | 0 | 70 | 2.9 | 0.6 | 0.1 | Example |
| 117 | AN | 2.0 | 0.23 | 53 | 5 | 0 | 63 | 2.2 | 0.4 | 0.3 | Example |
| 118 | AO | 2.3 | 0.44 | 57 | 0 | 0 | 65 | 2.3 | 0.4 | 0.04 | Example |
| 119 | AO | 2.8 | 0.34 | 33 | 0 | 0 | 72 | 2.9 | 0.5 | 0.1 | Example |
| 120 | AP | 2.1 | 0.23 | 44 | 0 | 0 | 61 | 3.7 | 0.6 | 0.1 | Example |
| 121 | AP | 2.5 | 0.18 | 48 | 0 | 0 | 73 | 2.7 | 0.5 | 0.1 | Example |
| 122 | AP | 2.6 | 0.35 | 39 | 0 | 0 | 66 | 2.9 | 0.5 | 0.03 | Example |
| 123 | AQ | 2.4 | 0.28 | 67 | 0 | 0 | 71 | 3.6 | 0.4 | 0.1 | Example |
| 124 | AQ | 2.4 | 0.30 | 31 | 0 | 0 | 69 | 3.4 | 0.5 | 0.1 | Example |
| 125 | AR | 1.7 | 0.26 | 37 | 0 | 0 | 71 | 3.5 | 2.4 | 0.01 | Example |
| 126 | AR | 2.5 | 0.24 | 57 | 0 | 0 | 67 | 3.3 | 0.5 | 0.1 | Example |
| 127 | AS | 2.5 | 0.26 | 49 | 0 | 0 | 58 | 2.6 | 0.4 | 0.1 | Example |
| 128 | AS | 2.5 | 0.35 | 43 | 0 | 0 | 56 | 2.0 | 0.4 | 0.02 | Example |

TABLE 33-continued

| | | Plated layer | | | | | | Base steel sheet | | | |
|---|---|---|---|---|---|---|---|---|---|---|---|
| | | ζ Phase | | | | | | | | | |
| | | Content | | Boundary surface occupancy ratio % | Occupancy ratio of ζ grain in which oxides present % | δ1 Phase Boundary surface occupancy ratio % | Plated amount g/m2 | Average thickness of refined layer μm | Average grain size of ferrite phase μm | Maximum size of oxide μm | |
| Experimental Example | Chemical components | Fe % | Al % | | | | | | | | |
| 129 | AT | 1.1 | 0.18 | 42 | 5 | 0 | 63 | 3.1 | 0.6 | 0.3 | Example |
| 130 | AT | 4.4 | 0.38 | 69 | 0 | 0 | 75 | 2.7 | 0.4 | 0.04 | Example |
| 131 | AU | 2.1 | 0.35 | 43 | 0 | 0 | 58 | 2.7 | 0.5 | 0.1 | Example |
| 132 | AU | 2.4 | 0.26 | 47 | 6 | 0 | 67 | 2.5 | 0.6 | 0.5 | Comp.Ex. |
| 133 | AU | 1.3 | 0.22 | 42 | 0 | 0 | 59 | 0.7 | 0.8 | 0.1 | Example |
| 134 | AU | 1.3 | 0.17 | 46 | 0 | 0 | 66 | 3.2 | 0.5 | 0.1 | Example |
| 135 | AV | 1.8 | 0.21 | 50 | 0 | 0 | 71 | 2.6 | 0.7 | 0.04 | Example |
| 136 | AV | 1.8 | 0.19 | 55 | 9 | 0 | <u>8</u> | 2.0 | 0.5 | 0.4 | Comp.Ex. |
| 137 | AV | 2.2 | 0.34 | 57 | 0 | 0 | 71 | 2.0 | 0.5 | 0.1 | Example |
| 138 | AW | 2.0 | 0.25 | 36 | 0 | 0 | 60 | 2.8 | 0.5 | 0.1 | Example |
| 139 | AW | 2.3 | 0.35 | 39 | 7 | 0 | 55 | 3.6 | 0.5 | 0.4 | Comp.Ex. |
| 140 | AW | 1.8 | 0.18 | 46 | 8 | 0 | 60 | 3.8 | 0.5 | 0.6 | Example |
| 141 | AX | 1.7 | 0.20 | 37 | 0 | 0 | 58 | 2.6 | 0.6 | 0.1 | Example |
| 142 | AX | 3.3 | 0.40 | 51 | 8 | 0 | 75 | 3.2 | 0.4 | 0.4 | Example |
| 143 | AY | 2.3 | 0.19 | 44 | 0 | 0 | 57 | 2.4 | 0.6 | 0.03 | Example |
| 144 | AY | 1.4 | 0.16 | 47 | 0 | 0 | 70 | 2.1 | 0.4 | 0.04 | Example |
| 145 | AZ | 1.5 | 0.32 | 43 | 0 | 0 | 72 | 2.4 | 0.5 | 0.1 | Example |
| 146 | AZ | 1.9 | 0.22 | 47 | 7 | 0 | 61 | 2.0 | 0.4 | 0.5 | Example |
| 147 | BA | 1.5 | 0.24 | 32 | 0 | 0 | 63 | 1.8 | 0.4 | 0.1 | Example |
| 148 | BA | 1.8 | 0.16 | 40 | 0 | 0 | 62 | 2.5 | 0.5 | 0.1 | Example |
| 149 | BB | 2.1 | 0.26 | 45 | 9 | 0 | 71 | 2.9 | 0.5 | 0.3 | Example |
| 150 | BB | 0.4 | <u>1.08</u> | <u>11</u> | 0 | 0 | 64 | 2.8 | 0.4 | 0.1 | Comp.Ex. |

TABLE 34

| | | Plated layer | | | | | | Base steel sheet | | | |
|---|---|---|---|---|---|---|---|---|---|---|---|
| | | ζ Phase | | | | | | | | | |
| | | Content | | Boundary surface occupancy ratio % | Occupancy ratio of ζ grain in which oxides present % | δ1 Phase Boundary surface occupancy ratio % | Plated amount g/m2 | Average thickness of refined layer μm | Average grain size of ferrite phase μm | Maximum size of oxide μm | |
| Experimental Example | Chemical components | Fe % | Al % | | | | | | | | |
| 151 | BB | 3.0 | 0.35 | 53 | 0 | 0 | 56 | 2.7 | 0.4 | 0.1 | Example |
| 152 | BB | 4.5 | 0.10 | 80 | 9 | 2 | 66 | 2.7 | 0.3 | 0.4 | Example |
| 153 | BC | 2.2 | 0.41 | 38 | 0 | 0 | 65 | 3.9 | 0.7 | 0.03 | Example |
| 154 | BC | 1.3 | 0.19 | 52 | 0 | 0 | 72 | 3.5 | 0.7 | 0.1 | Example |
| 155 | BC | 2.6 | 0.12 | 74 | 0 | 0 | 61 | 4.3 | 0.4 | 0.04 | Example |
| 156 | BC | 2.4 | 0.28 | 44 | 0 | 0 | 56 | 4.0 | 6.4 | 0.1 | Example |
| 157 | BC | 1.9 | 0.26 | 38 | 0 | 0 | 70 | 4.2 | 0.4 | 0.1 | Comp.Ex. |
| 158 | BD | 4.5 | 0.24 | 63 | 0 | 0 | 72 | 4.9 | 0.6 | 0.1 | Example |
| 159 | BD | 2.9 | 0.31 | 67 | 0 | 0 | 62 | 4.9 | 2.5 | 0.02 | Example |
| 160 | BE | 1.9 | 0.20 | 50 | 0 | 0 | 59 | 3.0 | 0.4 | 0.1 | Example |
| 161 | BE | 1.8 | 0.35 | 35 | 0 | 0 | 59 | 3.0 | 0.5 | 0.1 | Example |
| 162 | BF | 1.3 | 0.24 | 33 | 0 | 0 | 57 | 2.4 | 0.4 | 0.1 | Example |
| 163 | BF | 1.3 | 0.23 | 48 | 0 | 0 | 60 | 0.5 | 0.8 | 0.1 | Example |
| 164 | BF | 3.5 | 0.25 | 86 | 0 | 0 | 71 | 2.5 | 0.4 | 0.1 | Example |
| 165 | BF | 1.7 | 0.25 | 41 | 5 | 0 | 71 | 2.3 | 0.5 | 0.3 | Comp.Ex. |
| 166 | BG | 1.5 | 0.18 | 56 | 0 | 0 | 68 | 2.2 | 0.5 | 0.1 | Example |
| 167 | BG | 1.2 | 0.34 | 32 | 9 | 0 | 61 | 1.7 | 0.5 | 0.2 | Example |
| 168 | BG | 1.3 | 0.30 | 51 | 0 | 0 | 59 | 2.2 | 0.5 | 0.1 | Comp.Ex. |
| 169 | BG | 1.7 | 0.17 | 52 | 10 | 0 | 57 | 1.9 | 0.4 | 0.3 | Example |
| 170 | BH | 2.5 | 0.24 | 42 | 0 | 0 | 58 | 2.3 | 0.4 | 0.03 | Example |
| 171 | BH | 0.1 | 0.36 | <u>5</u> | 0 | 0 | 70 | <u>≤0.1</u> | (3.4) | (<0.01) | Comp.Ex. |
| 172 | BH | 4.1 | 0.19 | 73 | 10 | 11 | 68 | 1.9 | 0.5 | 0.5 | Example |
| 173 | BH | 2.1 | 0.40 | 51 | 0 | 0 | 71 | 2.1 | 0.5 | 0.04 | Example |
| 174 | BI | 0.9 | 0.25 | 44 | 0 | 0 | 73 | 1.8 | 0.5 | 0.02 | Example |
| 175 | BI | 2.4 | 0.26 | 62 | 0 | 0 | 58 | 2.2 | 0.4 | 0.02 | Example |
| 176 | BJ | 3.2 | 0.18 | 61 | 0 | 0 | 58 | 3.0 | 0.5 | 0.04 | Example |

TABLE 34-continued

| | | Plated layer | | | | | Base steel sheet | | | |
|---|---|---|---|---|---|---|---|---|---|---|
| | | ζ Phase | | | | | | | | |
| | | Content | | Boundary surface occupancy ratio % | Occupancy ratio of ζ grain in which oxides present % | δ1 Phase Boundary surface occupancy ratio % | Plated amount g/m2 | Average thickness of refined layer μm | Average grain size of ferrite phase μm | Maximum size of oxide μm | |
| Experimental Example | Chemical components | Fe % | Al % | | | | | | | | |
| 177 | BJ | 1.6 | 0.23 | 54 | 10 | 0 | 56 | 2.4 | 0.5 | 0.5 | Comp.Ex. |
| 178 | BJ | 1.8 | 0.22 | 4 | 0 | 0 | 62 | 2.2 | 0.5 | 0.1 | Example |
| 179 | BK | 1.7 | 0.21 | 48 | 0 | 0 | 59 | 3.7 | 0.4 | 0.1 | Example |
| 180 | BK | 1.7 | 0.22 | 40 | 9 | 0 | 62 | 2.7 | 0.5 | 0.3 | Example |
| 181 | BL | 3.2 | 0.21 | 65 | 0 | 0 | 59 | 2.7 | 0.5 | 0.1 | Example |
| 182 | BL | 2.9 | 0.39 | 50 | 0 | 0 | 68 | 2.1 | 0.4 | 0.02 | Example |
| 183 | BL | 5.8 | 0.30 | 67 | 0 | 25 | 70 | 2.8 | 0.3 | 0.1 | Comp.Ex. |
| 184 | BL | 1.9 | 0.28 | 33 | 0 | 0 | 70 | 0.5 | 0.8 | 0.03 | Example |
| 185 | BM | 1.5 | 0.23 | 49 | 0 | 0 | 68 | 1.9 | 0.5 | 0.04 | Example |
| 186 | BM | 2.3 | 0.22 | 49 | 0 | 0 | 67 | 1.7 | 0.4 | 0.1 | Comp.Ex. |
| 187 | BM | 1.5 | 0.19 | 31 | 0 | 0 | 58 | 1.9 | 0.5 | 0.1 | Example |
| 188 | BN | 3.7 | 0.23 | 66 | 4 | 0 | 60 | 4.1 | 0.4 | 0.3 | Example |
| 189 | BN | 3.0 | 0.31 | 56 | 5 | 0 | 73 | 4.0 | 0.6 | 0.4 | Example |
| 190 | BO | 1.9 | 0.22 | 49 | 0 | 0 | 68 | 2.3 | 0.5 | 0.1 | Comp.Ex. |
| 191 | BP | 2.6 | 0.37 | 50 | 0 | 0 | 66 | 2.2 | 0.5 | 0.1 | Comp.Ex. |
| 192 | BQ | 4.0 | 0.42 | 54 | 0 | 0 | 70 | 4.8 | 0.5 | 0.1 | Comp.Ex. |
| 193 | BR | Experiment stopped due to occurrence of cracking of slab during heating in hot rolling step | | | | | | | | | Comp.Ex. |
| 194 | BS | 1.2 | 0.20 | 34 | 0 | 0 | 76 | 2.9 | 0.6 | 0.03 | Comp.Ex. |
| 195 | BT | Experiment stopped due to occurrence of cracking of slab during heating in hot rolling step | | | | | | | | | Comp.Ex. |
| 196 | BU | Experiment stopped due to occurrence of cracking of slab during hot rolling in hot rolling step | | | | | | | | | Comp.Ex. |
| 197 | BV | 1.1 | 0.22 | 39 | 4 | 0 | 60 | 2.5 | 0.7 | 0.4 | Comp.Ex. |
| 198 | BW | Experiment stopped due to occurrence of cracking of slab during transportation after casting of slab | | | | | | | | | Comp.Ex. |
| 199 | BX | 2.1 | 0.23 | 59 | 0 | 0 | 71 | 2.3 | 0.5 | 0.1 | Comp.Ex. |
| 200 | BY | 1.9 | 0.18 | 47 | 0 | 0 | 55 | 2.9 | 0.6 | 0.03 | Comp.Ex. |
| 201 | A | 6.6 | 0.19 | 65 | 0 | 30 | 65 | 7.4 | 0.6 | 0.10 | Comp.Ex. |

TABLE 35

| | | | Tensile properties | | | | | Bendability | |
|---|---|---|---|---|---|---|---|---|---|
| Experimental Example | Chemical components | Thickness t mm | Yield strength YS MPa | Maximum tensile strength TS MPa | Total Elongation El % | Hole expansibility λ % | $TS^{0.5} \times El \times \lambda^{0.5}$ | Minimum bending radius r mm | r/t |
| 1 | A | 1.5 | 454 | 748 | 24 | 37 | 2.99E+06 | 1.5 | 1.0 |
| 2 | A | 1.6 | 454 | 732 | 26 | 33 | 2.96E+06 | 1.5 | 0.9 |
| 3 | A | 2.0 | 322 | 569 | 30 | 86 | 3.78E+06 | 3.5 | 1.8 |
| 4 | A | 1.5 | 371 | 693 | 27 | 40 | 3.12E+06 | 1.5 | 1.0 |
| 5 | B | 1.5 | 349 | 613 | 32 | 53 | 3.54E+06 | 3.0 | 2.0 |
| 6 | B | 1.6 | 316 | 619 | 31 | 50 | 3.38E+06 | 2.0 | 1.3 |
| 7 | B | 1.7 | 341 | 608 | 30 | 48 | 3.12E+06 | 1.0 | 0.6 |
| 8 | B | 1.2 | 342 | 553 | 33 | 54 | 3.15E+06 | 2.0 | 1.7 |
| 9 | C | 1.5 | 510 | 935 | 20 | 22 | 2.68E+06 | 1.0 | 0.7 |
| 10 | C | 1.2 | 575 | 820 | 23 | 33 | 3.10E+06 | 1.0 | 0.8 |
| 11 | C | 1.3 | 551 | 890 | 18 | 38 | 2.95E+06 | 1.5 | 1.2 |
| 12 | C | 1.7 | 410 | 748 | 23 | 39 | 2.94E+06 | 2.5 | 1.5 |
| 13 | D | 2.8 | 347 | 696 | 31 | 23 | 2.73E+06 | 4.5 | 1.6 |
| 14 | D | 1.3 | 357 | 699 | 29 | 33 | 3.08E+06 | 1.0 | 0.8 |
| 15 | D | 1.4 | 432 | 622 | 29 | 61 | 3.51E+06 | 2.5 | 1.8 |
| 16 | D | 1.2 | 342 | 609 | 30 | 73 | 3.85E+06 | 1.0 | 0.8 |
| 17 | E | 1.5 | 591 | 1015 | 15 | 41 | 3.11E+06 | 1.0 | 0.7 |
| 18 | E | 1.8 | 569 | 826 | 22 | 51 | 3.73E+06 | 2.0 | 1.1 |
| 19 | E | 1.2 | 583 | 913 | 17 | 28 | 2.48E+06 | 1.5 | 1.3 |
| 20 | E | 1.6 | 359 | 603 | 16 | 27 | 1.23E+06 | 2.0 | 1.3 |
| 21 | F | 1.5 | 505 | 880 | 17 | 47 | 3.04E+06 | 1.0 | 0.7 |
| 22 | F | 1.6 | 429 | 633 | 26 | 87 | 3.86E+06 | 1.5 | 0.9 |
| 23 | F | 1.2 | 488 | 755 | 24 | 31 | 2.77E+06 | 1.0 | 0.8 |
| 24 | F | 1.3 | 373 | 727 | 24 | 35 | 2.78E+06 | 1.0 | 0.8 |
| 25 | G | 1.3 | 429 | 833 | 20 | 39 | 3.00E+06 | 1.5 | 1.2 |

TABLE 35-continued

| Experimental Example | Fatigue resistance Fatigue limit DL MPa | DL/TS | Plating adhesion | Spot weldability | Corrosion resistance | Chipping Properties | IR90° V bending powdering | |
|---|---|---|---|---|---|---|---|---|
| 1 | 373 | 0.50 | ○ | ○ | ○ | ○ | ○ | Example |
| 2 | 333 | 0.45 | x | ○ | ○ | x | x | Comp.Ex. |
| 3 | 253 | 0.44 | ○ | ○ | ○ | ○ | ○ | Example |
| 4 | 319 | 0.46 | ○ | ○ | ○ | ○ | ○ | Example |
| 5 | 300 | 0.49 | ○ | ○ | ○ | ○ | ○ | Example |
| 6 | 324 | 0.52 | ○ | ○ | ○ | ○ | ○ | Example |
| 7 | 333 | 0.55 | ○ | ○ | ○ | ○ | ○ | Example |
| 8 | 284 | 0.51 | ○ | ○ | ○ | ○ | ○ | Example |
| 9 | 418 | 0.45 | ○ | ○ | ○ | ○ | ○ | Example |
| 10 | 469 | 0.57 | ○ | ○ | ○ | ○ | ○ | Example |
| 11 | 485 | 0.54 | ○ | ○ | ○ | ○ | ○ | Example |
| 12 | 345 | 0.46 | x | ○ | ○ | ○ | ○ | Comp.Ex. |
| 13 | 288 | 0.41 | ○ | ○ | ○ | ○ | ○ | Example |
| 14 | 201 | 0.29 | ○ | ○ | ○ | ○ | ○ | Comp.Ex. |
| 15 | 301 | 0.48 | ○ | ○ | ○ | ○ | ○ | Example |
| 16 | 323 | 0.53 | ○ | ○ | ○ | ○ | ○ | Example |
| 17 | 498 | 0.49 | ○ | ○ | ○ | ○ | ○ | Example |
| 18 | 449 | 0.54 | ○ | ○ | ○ | ○ | ○ | Example |
| 19 | 385 | 0.42 | ○ | ○ | ○ | ○ | ○ | Example |
| 20 | 324 | 0.54 | ○ | ○ | ○ | ○ | ○ | Comp.Ex. |
| 21 | 445 | 0.51 | ○ | ○ | ○ | ○ | ○ | Example |
| 22 | 299 | 0.47 | ○ | ○ | ○ | ○ | ○ | Example |
| 23 | 405 | 0.54 | ○ | ○ | ○ | ○ | ○ | Example |
| 24 | 318 | 0.44 | ○ | ○ | ○ | ○ | ○ | Example |
| 25 | 407 | 0.49 | ○ | ○ | ○ | ○ | ○ | Example |

TABLE 36

| Experimental Example | Chemical components | Thickness t mm | Tensile properties | | | | | Bendability | |
|---|---|---|---|---|---|---|---|---|---|
| | | | Yield strength YS MPa | Maximum tensile strength TS MPa | Total Elongation El % | Hole expansibility λ % | TS$^{0.5}$ × El × λ$^{0.5}$ | Minimum bending radius r mm | r/t |
| 26 | G | 1.3 | 759 | 985 | 16 | 38 | 3.05E+06 | 1.5 | 1.2 |
| 27 | G | 1.5 | 516 | 873 | 22 | 25 | 2.84E+06 | 3.5 | 2.3 |
| 28 | G | 1.2 | 462 | 818 | 23 | 22 | 2.52E+06 | 1.5 | 1.3 |
| 29 | H | 1.3 | 427 | 772 | 21 | 40 | 2.85E+06 | 2.0 | 1.5 |
| 30 | H | 1.7 | 573 | 877 | 20 | 45 | 3.48E+06 | 2.5 | 1.5 |
| 31 | H | 2.4 | 405 | 852 | 24 | 24 | 2.92E+06 | 2.0 | 0.8 |
| 32 | I | 1.3 | 411 | 742 | 20 | 63 | 3.21E+06 | 2.0 | 1.5 |
| 33 | I | 1.5 | 420 | 675 | 27 | 43 | 3.10E+06 | 2.0 | 1.3 |
| 34 | I | 1.5 | 367 | 717 | 28 | 30 | 2.94E+06 | 1.0 | 0.7 |
| 35 | J | 2.0 | 510 | 949 | 20 | 19 | 2.55E+06 | 2.0 | 1.0 |
| 36 | J | 1.6 | 522 | 846 | 21 | 32 | 2.92E+06 | 1.0 | 0.6 |
| 37 | J | 1.7 | 541 | 953 | 19 | 24 | 2.74E+06 | 1.0 | 0.6 |
| 38 | K | 1.3 | 693 | 1111 | 15 | 28 | 2.94E+06 | 1.0 | 0.8 |
| 39 | K | 1.8 | 456 | 737 | 26 | 40 | 3.29E+06 | 2.5 | 1.4 |
| 40 | K | 1.9 | 632 | 1022 | 16 | 35 | 3.09E+06 | 1.0 | 0.5 |
| 41 | L | 1.3 | 531 | 976 | 17 | 22 | 2.43E+06 | 1.0 | 0.8 |
| 42 | L | 1.4 | 828 | 1030 | 16 | 44 | 3.51E+06 | 1.0 | 0.7 |
| 43 | L | 1.4 | 353 | 601 | 21 | 20 | 1.38E+06 | 2.0 | 1.4 |
| 44 | M | 1.5 | 338 | 748 | 25 | 32 | 2.89E+06 | 2.0 | 1.3 |
| 45 | M | 1.5 | 439 | 700 | 28 | 44 | 3.44E+06 | 2.0 | 1.3 |
| 46 | M | 2.0 | 393 | 784 | 22 | 40 | 3.05E+06 | 4.5 | 2.3 |
| 47 | N | 1.5 | 508 | 832 | 23 | 31 | 3.07E+06 | 1.0 | 0.7 |
| 48 | N | 1.7 | 631 | 801 | 21 | 60 | 3.69E+06 | 2.0 | 1.2 |
| 49 | N | 2.0 | 767 | 1128 | 9 | 30 | 1.87E+06 | 1.5 | 0.8 |
| 50 | O | 1.5 | 440 | 771 | 24 | 30 | 2.81E+06 | 2.0 | 1.3 |

| Experimental Example | Fatigue resistance Fatigue limit DL MPa | DL/TS | Plating adhesion | Spot weldability | Corrosion resistance | Chipping Properties | IR90° V bending powdering | |
|---|---|---|---|---|---|---|---|---|
| 26 | 514 | 0.52 | ○ | ○ | ○ | ○ | ○ | Example |
| 27 | 484 | 0.55 | ○ | ○ | ○ | ○ | ○ | Comp.Ex. |
| 28 | 390 | 0.48 | ○ | ○ | ○ | ○ | ○ | Example |
| 29 | 385 | 0.50 | ○ | ○ | ○ | ○ | ○ | Example |

TABLE 36-continued

| | | | | | | | | |
|---|---|---|---|---|---|---|---|---|
| 30 | 553 | 0.63 | ○ | ○ | ○ | ○ | ○ | Example |
| 31 | 351 | 0.41 | ○ | ○ | ○ | ○ | ○ | Example |
| 32 | 356 | 0.48 | ○ | ○ | ○ | ○ | ○ | Example |
| 33 | 359 | 0.53 | ○ | ○ | ○ | ○ | ○ | Example |
| 34 | 347 | 0.48 | ○ | ○ | ○ | ○ | ○ | Example |
| 35 | 388 | 0.41 | ○ | ○ | ○ | ○ | ○ | Example |
| 36 | 476 | 0.56 | ○ | ○ | ○ | ○ | ○ | Example |
| 37 | 439 | 0.46 | ○ | ○ | ○ | ○ | ○ | Example |
| 38 | 598 | 0.54 | ○ | ○ | ○ | ○ | ○ | Example |
| 39 | 357 | 0.48 | ○ | ○ | ○ | ○ | ○ | Example |
| 40 | 538 | 0.53 | ○ | ○ | ○ | ○ | ○ | Example |
| 41 | 469 | 0.48 | ○ | ○ | ○ | ○ | ○ | Example |
| 42 | 428 | 0.42 | ○ | ○ | ○ | ○ | ○ | Example |
| 43 | 297 | 0.49 | ○ | ○ | ○ | ○ | ○ | Comp.Ex. |
| 44 | 328 | 0.44 | ○ | ○ | ○ | ○ | ○ | Example |
| 45 | 314 | 0.45 | ○ | ○ | ○ | ○ | ○ | Example |
| 46 | 359 | 0.46 | x | ○ | ○ | ○ | ○ | Comp.Ex. |
| 47 | 435 | 0.52 | ○ | ○ | ○ | ○ | ○ | Example |
| 48 | 438 | 0.55 | ○ | ○ | ○ | ○ | ○ | Example |
| 49 | 477 | 0.42 | ○ | ○ | ○ | ○ | ○ | Comp.Ex. |
| 50 | 365 | 0.47 | ○ | ○ | ○ | ○ | ○ | Example |

TABLE 37

| | | | Tensile properties | | | | | Bendability | |
|---|---|---|---|---|---|---|---|---|---|
| Experimental Example | Chemical components | Thickness t mm | Yield strength YS MPa | Maximum tensile strength TS MPa | Total Elongation El % | Hole expansibility λ % | $TS^{0.5} \times El \times \lambda^{0.5}$ | Minimum bending radius r mm | r/t |
| 51 | O | 1.3 | 369 | 737 | 20 | 48 | 2.77E+06 | 1.0 | 0.8 |
| 52 | O | 1.8 | 401 | 810 | 24 | 33 | 3.18E+06 | 1.5 | 0.8 |
| 53 | O | 1.3 | 472 | 748 | 26 | 44 | 3.53E+06 | 1.5 | 1.2 |
| 54 | P | 1.5 | 380 | 683 | 23 | 62 | 3.23E+06 | 1.5 | 1.0 |
| 55 | P | 1.5 | 456 | 769 | 27 | 23 | 2.76E+06 | 1.5 | 1.0 |
| 56 | P | 1.6 | 418 | 708 | 25 | 35 | 2.79E+06 | 2.0 | 1.3 |
| 57 | Q | 1.3 | 439 | 827 | 22 | 31 | 2.91E+06 | 1.5 | 1.2 |
| 58 | Q | 1.9 | 431 | 694 | 27 | 42 | 3.20E+06 | 2.0 | 1.1 |
| 59 | Q | 1.7 | 467 | 692 | 26 | 56 | 3.54E+06 | 3.5 | 2.1 |
| 60 | R | 0.9 | 287 | 640 | 24 | 67 | 3.18E+06 | 1.0 | 1.1 |
| 61 | R | 1.3 | 291 | 636 | 33 | 31 | 2.95E+06 | 2.0 | 1.5 |
| 62 | R | 1.3 | 275 | 593 | 29 | 75 | 3.63E+06 | 2.5 | 1.9 |
| 63 | S | 1.5 | 571 | 974 | 17 | 32 | 2.92E+06 | 1.0 | 0.7 |
| 64 | S | 1.4 | 528 | 1050 | 15 | 26 | 2.60E+06 | 1.0 | 0.7 |
| 65 | S | 1.6 | 422 | 860 | 22 | 27 | 2.88E+06 | 2.0 | 1.3 |
| 66 | T | 1.5 | 479 | 911 | 21 | 26 | 3.11E+06 | 2.0 | 1.3 |
| 67 | T | 1.6 | 378 | 607 | 34 | 55 | 3.77E+06 | 2.0 | 1.3 |
| 68 | T | 1.3 | 663 | 1006 | 7 | 8 | 6.32E+05 | 3.5 | 2.7 |
| 69 | U | 1.5 | 396 | 749 | 25 | 34 | 2.99E+06 | 1.5 | 1.0 |
| 70 | U | 1.2 | 511 | 960 | 19 | 18 | 2.40E+06 | 1.0 | 0.8 |
| 71 | U | 1.6 | 406 | 640 | 31 | 43 | 3.29E+06 | 1.0 | 0.6 |
| 72 | V | 1.5 | 405 | 714 | 28 | 29 | 2.88E+06 | 2.5 | 1.7 |
| 73 | V | 2.0 | 342 | 562 | 33 | 72 | 3.73E+06 | 1.0 | 0.5 |
| 74 | V | 1.2 | 314 | 598 | 31 | 49 | 3.17E+06 | 1.0 | 0.8 |
| 75 | W | 1.5 | 398 | 772 | 24 | 32 | 2.91E+06 | 1.5 | 1.0 |

| | Fatigue resistance | | | | | | | |
|---|---|---|---|---|---|---|---|---|
| Experimental Example | Fatigue limit DL MPa | DL/TS | Plating adhesion | Spot weldability | Corrosion resistance | Chipping Properties | IR90° V bending powdering | |
| 51 | 199 | 0.27 | ○ | ○ | ○ | ○ | ○ | Comp.Ex. |
| 52 | 365 | 0.45 | ○ | ○ | ○ | ○ | ○ | Example |
| 53 | 340 | 0.45 | ○ | ○ | ○ | ○ | ○ | Example |
| 54 | 313 | 0.46 | ○ | ○ | ○ | ○ | ○ | Example |
| 55 | 293 | 0.38 | ○ | ○ | ○ | ○ | ○ | Example |
| 56 | 385 | 0.54 | ○ | ○ | ○ | ○ | ○ | Example |
| 57 | 399 | 0.48 | ○ | ○ | ○ | ○ | ○ | Example |
| 58 | 358 | 0.52 | ○ | ○ | ○ | ○ | ○ | Example |
| 59 | 378 | 0.55 | ○ | ○ | ○ | ○ | ○ | Comp.Ex. |
| 60 | 288 | 0.45 | ○ | ○ | ○ | ○ | ○ | Example |
| 61 | 270 | 0.42 | ○ | ○ | ○ | ○ | ○ | Example |
| 62 | 292 | 0.49 | ○ | ○ | ○ | ○ | ○ | Example |
| 63 | 521 | 0.53 | ○ | ○ | ○ | ○ | ○ | Example |
| 64 | 425 | 0.40 | ○ | ○ | ○ | ○ | ○ | Example |

TABLE 37-continued

| | | | | | | | | |
|---|---|---|---|---|---|---|---|---|
| 65 | 380 | 0.44 | ○ | x | ○ | ○ | ○ | Comp.Ex. |
| 66 | 408 | 0.45 | ○ | ○ | ○ | ○ | ○ | Example |
| 67 | 274 | 0.45 | ○ | ○ | ○ | ○ | ○ | Example |
| 68 | 508 | 0.50 | ○ | ○ | ○ | ○ | ○ | Comp.Ex. |
| 69 | 387 | 0.52 | ○ | ○ | ○ | ○ | ○ | Example |
| 70 | 355 | 0.37 | ○ | ○ | ○ | ○ | ○ | Example |
| 71 | 316 | 0.49 | ○ | ○ | ○ | ○ | ○ | Example |
| 72 | 346 | 0.48 | ○ | ○ | ○ | ○ | ○ | Example |
| 73 | 221 | 0.39 | ○ | ○ | ○ | ○ | ○ | Example |
| 74 | 288 | 0.48 | ○ | ○ | ○ | ○ | ○ | Example |
| 75 | 355 | 0.46 | ○ | ○ | ○ | ○ | ○ | Example |

TABLE 38

| Experimental Example | Chemical components | Thickness t mm | Tensile properties | | | | | Bendability | |
|---|---|---|---|---|---|---|---|---|---|
| | | | Yield strength YS MPa | Maximum tensile strength TS MPa | Total elongation El % | Hole expansibility λ % | $TS^{0.5} \times El \times \lambda^{0.5}$ | Minimum bending radius r mm | r/t |
| 76 | W | 1.8 | 364 | 693 | 24 | 39 | 2.73E+06 | 1.5 | 0.8 |
| 77 | W | 1.7 | 335 | 662 | 25 | 52 | 3.07E+06 | 1.5 | 0.9 |
| 78 | X | 2.4 | 284 | 556 | 32 | 61 | 3.28E+06 | 3.5 | 1.5 |
| 79 | X | 1.3 | 340 | 663 | 26 | 55 | 3.29E+06 | 2.0 | 1.5 |
| 80 | X | 1.7 | 374 | 617 | 17 | 47 | 1.79E+06 | 3.0 | 1.8 |
| 81 | Y | 2.0 | 373 | 831 | 21 | 29 | 2.71E+06 | 2.5 | 1.3 |
| 82 | Y | 1.7 | 562 | 783 | 19 | 70 | 3.48E+06 | 3.0 | 1.8 |
| 83 | Y | 1.8 | 412 | 713 | 25 | 47 | 3.26E+06 | 3.0 | 1.7 |
| 84 | Z | 1.5 | 414 | 781 | 20 | 33 | 2.51E+06 | 2.0 | 1.3 |
| 85 | Z | 1.7 | 399 | 758 | 23 | 36 | 2.88E+06 | 4.5 | 2.6 |
| 86 | Z | 1.7 | 340 | 682 | 31 | 27 | 2.87E+06 | 1.5 | 0.9 |
| 87 | AA | 1.5 | 582 | 1137 | 15 | 18 | 2.44E+06 | 1.5 | 1.0 |
| 88 | AA | 1.9 | 605 | 908 | 17 | 42 | 3.01E+06 | 1.5 | 0.8 |
| 89 | AB | 1.5 | 578 | 999 | 17 | 27 | 2.79E+06 | 1.0 | 0.7 |
| 90 | AB | 1.8 | 401 | 618 | 31 | 48 | 3.30E+06 | 3.0 | 1.7 |
| 91 | AB | 1.7 | 348 | 583 | 31 | 52 | 3.15E+06 | 1.5 | 0.9 |
| 92 | AC | 1.3 | 414 | 778 | 25 | 33 | 3.12E+06 | 1.5 | 1.2 |
| 93 | AC | 1.5 | 385 | 721 | 25 | 46 | 3.28E+06 | 2.0 | 1.3 |
| 94 | AD | 1.5 | 527 | 905 | 20 | 20 | 2.44E+06 | 1.0 | 0.7 |
| 95 | AD | 1.5 | 537 | 738 | 23 | 53 | 3.36E+06 | 2.5 | 1.7 |
| 96 | AE | 2.0 | 445 | 785 | 22 | 41 | 3.10E+06 | 1.5 | 0.8 |
| 97 | AE | 1.9 | 484 | 709 | 24 | 61 | 3.54E+06 | 2.5 | 1.3 |
| 98 | AF | 1.5 | 398 | 810 | 24 | 27 | 2.87E+06 | 1.0 | 0.7 |
| 99 | AF | 1.9 | 675 | 1042 | 18 | 17 | 2.50E+06 | 1.0 | 0.5 |
| 100 | AG | 1.5 | 536 | 982 | 18 | 32 | 3.13E+06 | 1.0 | 0.7 |

| Experimental Example | Fatigue resistance | | Plating adhesion | Spot weldability | Corrosion resistance | Chipping Properties | 1R90° V bending powdering | |
|---|---|---|---|---|---|---|---|---|
| | Fatigue limit DL MPa | DL/TS | | | | | | |
| 76 | 202 | 0.29 | x | ○ | ○ | ○ | ○ | Comp.Ex. |
| 77 | 301 | 0.45 | ○ | ○ | ○ | ○ | ○ | Example |
| 78 | 277 | 0.50 | ○ | ○ | ○ | ○ | ○ | Example |
| 79 | 299 | 0.45 | ○ | ○ | ○ | ○ | ○ | Example |
| 80 | 300 | 0.49 | ○ | ○ | ○ | ○ | ○ | Comp.Ex. |
| 81 | 362 | 0.44 | ○ | ○ | ○ | ○ | ○ | Example |
| 82 | 414 | 0.53 | ○ | ○ | ○ | ○ | ○ | Example |
| 83 | 375 | 0.53 | ○ | ○ | ○ | ○ | ○ | Example |
| 84 | 350 | 0.45 | ○ | ○ | ○ | ○ | ○ | Example |
| 85 | 209 | 0.28 | x | ○ | ○ | ○ | x | Comp.Ex. |
| 86 | 312 | 0.46 | ○ | ○ | ○ | ○ | ○ | Example |
| 87 | 481 | 0.42 | ○ | ○ | ○ | ○ | ○ | Example |
| 88 | 474 | 0.52 | ○ | ○ | ○ | ○ | ○ | Example |
| 89 | 506 | 0.51 | ○ | ○ | ○ | ○ | ○ | Example |
| 90 | 219 | 0.35 | ○ | ○ | ○ | ○ | ○ | Example |
| 91 | 298 | 0.51 | ○ | ○ | ○ | ○ | ○ | Example |
| 92 | 358 | 0.46 | ○ | ○ | ○ | ○ | ○ | Example |
| 93 | 303 | 0.42 | ○ | ○ | ○ | ○ | ○ | Example |
| 94 | 491 | 0.54 | ○ | ○ | ○ | ○ | ○ | Example |
| 95 | 359 | 0.49 | ○ | ○ | ○ | ○ | ○ | Example |
| 96 | 374 | 0.48 | ○ | ○ | ○ | ○ | ○ | Example |
| 97 | 278 | 0.39 | ○ | ○ | ○ | ○ | ○ | Example |
| 98 | 335 | 0.41 | ○ | ○ | ○ | ○ | ○ | Example |

TABLE 38-continued

| | | | | | | | | |
|---|---|---|---|---|---|---|---|---|
| 99 | 498 | 0.48 | ○ | ○ | ○ | ○ | ○ | Example |
| 100 | 503 | 0.51 | ○ | ○ | ○ | ○ | ○ | Example |

TABLE 39

| | | | Tensile properties | | | | | Bendability | |
|---|---|---|---|---|---|---|---|---|---|
| | | | | Maximum | | | | | |
| Experimental Example | Chemical components | Thickness t mm | Yield strength YS MPa | tensile strength TS MPa | Total elongation El % | Hole expansibility λ % | $TS^{0.5} \times El \times \lambda^{0.5}$ | Minimum bending radius r mm | r/t |
| 101 | AG | 1.6 | 551 | 1012 | 15 | 28 | 2.56E+06 | 1.5 | 0.9 |
| 102 | AH | 0.9 | 621 | 1037 | 16 | 19 | 2.33E+06 | 1.0 | 1.1 |
| 103 | AH | 1.5 | 482 | 819 | 20 | 35 | 2.77E+06 | 1.5 | 1.0 |
| 104 | AI | 1.5 | 448 | 931 | 18 | 22 | 2.40E+06 | 1.0 | 0.7 |
| 105 | AI | 1.6 | 434 | 702 | 28 | 46 | 3.53E+06 | 2.5 | 1.6 |
| 106 | AJ | 1.5 | 475 | 899 | 20 | 33 | 3.10E+06 | 1.5 | 1.0 |
| 107 | AJ | 1.9 | 564 | 987 | 17 | 29 | 2.84E+06 | 2.5 | 1.3 |
| 108 | AK | 1.5 | 611 | 1099 | 14 | 19 | 2.22E+06 | 1.5 | 1.0 |
| 109 | AK | 1.4 | 560 | 867 | 18 | 54 | 3.38E+06 | 2.0 | 1.4 |
| 110 | AL | 1.5 | 287 | 630 | 27 | 49 | 2.99E+06 | 2.0 | 1.3 |
| 111 | AL | 1.6 | 302 | 530 | 29 | 115 | 3.79E+06 | 3.0 | 1.9 |
| 112 | AM | 1.5 | 598 | 1007 | 17 | 32 | 3.07E+06 | 1.0 | 0.7 |
| 113 | AM | 1.4 | 632 | 932 | 18 | 51 | 3.66E+06 | 2.5 | 1.8 |
| 114 | AM | 1.2 | 636 | 965 | 17 | 23 | 2.44E+06 | 1.0 | 0.8 |
| 115 | AM | 1.9 | 592 | 930 | 21 | 22 | 2.79E+06 | 2.5 | 1.3 |
| 116 | AN | 1.2 | 372 | 731 | 27 | 28 | 2.82E+06 | 1.5 | 1.3 |
| 117 | AN | 2.0 | 489 | 853 | 20 | 30 | 2.73E+06 | 1.5 | 0.8 |
| 118 | AO | 1.2 | 381 | 702 | 23 | 55 | 3.17E+06 | 1.5 | 1.3 |
| 119 | AO | 1.8 | 465 | 818 | 20 | 39 | 2.92E+06 | 2.0 | 1.1 |
| 120 | AP | 1.5 | 363 | 729 | 21 | 50 | 2.92E+06 | 2.0 | 1.3 |
| 121 | AP | 1.5 | 472 | 826 | 19 | 46 | 3.06E+06 | 1.5 | 1.0 |
| 122 | AP | 1.9 | 346 | 623 | 35 | 41 | 3.48E+06 | 2.5 | 1.3 |
| 123 | AQ | 1.5 | 351 | 725 | 29 | 33 | 3.25E+06 | 1.5 | 1.0 |
| 124 | AQ | 1.4 | 317 | 595 | 27 | 52 | 2.83E+06 | 2.0 | 1.4 |
| 125 | AR | 1.5 | 346 | 703 | 30 | 25 | 2.80E+06 | 2.0 | 1.3 |

| Experimental Example | Fatigue resistance | | Plating adhesion | Spot weldability | Corrosion resistance | Chipping Properties | 1R90° V bending powdering | |
|---|---|---|---|---|---|---|---|---|
| | Fatigue limit DL MPa | DL/TS | | | | | | |
| 101 | 460 | 0.45 | ○ | ○ | ○ | ○ | ○ | Example |
| 102 | 520 | 0.50 | ○ | ○ | ○ | ○ | ○ | Example |
| 103 | 477 | 0.58 | ○ | ○ | ○ | ○ | ○ | Example |
| 104 | 360 | 0.39 | ○ | ○ | ○ | ○ | ○ | Example |
| 105 | 338 | 0.48 | ○ | ○ | ○ | ○ | ○ | Example |
| 106 | 423 | 0.47 | ○ | ○ | ○ | ○ | ○ | Example |
| 107 | 496 | 0.50 | ○ | ○ | ○ | ○ | ○ | Example |
| 108 | 539 | 0.49 | ○ | ○ | ○ | ○ | ○ | Example |
| 109 | 391 | 0.45 | ○ | ○ | ○ | ○ | ○ | Example |
| 110 | 287 | 0.46 | ○ | ○ | ○ | ○ | ○ | Example |
| 111 | 268 | 0.51 | ○ | ○ | ○ | ○ | ○ | Example |
| 112 | 507 | 0.50 | ○ | ○ | ○ | ○ | ○ | Example |
| 113 | 465 | 0.50 | ○ | ○ | ○ | ○ | ○ | Example |
| 114 | 513 | 0.53 | ○ | ○ | ○ | ○ | ○ | Example |
| 115 | 256 | 0.28 | ○ | ○ | ○ | ○ | ○ | Comp.Ex. |
| 116 | 367 | 0.50 | ○ | ○ | ○ | ○ | ○ | Example |
| 117 | 427 | 0.50 | ○ | ○ | ○ | ○ | ○ | Example |
| 118 | 283 | 0.40 | ○ | ○ | ○ | ○ | ○ | Example |
| 119 | 420 | 0.51 | ○ | ○ | ○ | ○ | ○ | Example |
| 120 | 349 | 0.48 | ○ | ○ | ○ | ○ | ○ | Example |
| 121 | 435 | 0.53 | ○ | ○ | ○ | ○ | ○ | Example |
| 122 | 334 | 0.54 | ○ | ○ | ○ | ○ | ○ | Example |
| 123 | 287 | 0.40 | ○ | ○ | ○ | ○ | ○ | Example |
| 124 | 298 | 0.50 | ○ | ○ | ○ | ○ | ○ | Example |
| 125 | 321 | 0.46 | ○ | ○ | ○ | ○ | ○ | Example |

TABLE 40

| Experimental Example | Chemical components | Thickness t mm | Tensile properties | | | | | Bendability | |
|---|---|---|---|---|---|---|---|---|---|
| | | | Yield strength YS MPa | Maximum tensile strength TS MPa | Total elongation El % | Hole expansibility λ % | $TS^{0.5} \times El \times \lambda^{0.5}$ | Minimum bending radius r mm | r/t |
| 126 | AR | 1.8 | 381 | 718 | 24 | 37 | 2.81E+06 | 3.0 | 1.7 |
| 127 | AS | 2.1 | 434 | 848 | 23 | 24 | 2.78E+06 | 2.5 | 1.2 |
| 128 | AS | 1.5 | 539 | 843 | 21 | 40 | 3.25E+06 | 2.0 | 1.3 |
| 129 | AT | 1.5 | 389 | 825 | 21 | 27 | 2.59E+06 | 1.0 | 0.7 |
| 130 | AT | 1.2 | 310 | 637 | 33 | 43 | 3.48E+06 | 2.0 | 1.7 |
| 131 | AU | 1.5 | 416 | 904 | 20 | 22 | 2.55E+06 | 1.5 | 1.0 |
| 132 | AU | 2.0 | 437 | 842 | 22 | 21 | 2.46E+06 | 5.0 | <u>2.5</u> |
| 133 | AU | 2.0 | 369 | 756 | 23 | 37 | 2.91E+06 | 1.5 | 0.8 |
| 134 | AU | 1.9 | 343 | 747 | 22 | 41 | 2.88E+06 | 2.0 | 1.1 |
| 135 | AV | 0.9 | 481 | 932 | 17 | 42 | 3.13E+06 | 1.0 | 1.1 |
| 136 | AV | 2.0 | 558 | 941 | 19 | 33 | 3.15E+06 | 2.5 | 1.3 |
| 137 | AV | 1.3 | 557 | 901 | 18 | 39 | 3.04E+06 | 1.5 | 1.2 |
| 138 | AW | 0.9 | 433 | 831 | 22 | 30 | 2.89E+06 | 1.0 | 1.1 |
| 139 | AW | 1.4 | 355 | 543 | 21 | 39 | <u>1.66E+06</u> | 2.5 | 1.8 |
| 140 | AW | 1.7 | 400 | 637 | 27 | 60 | 3.36E+06 | 1.5 | 0.9 |
| 141 | AX | 1.5 | 502 | 899 | 19 | 24 | 2.51E+06 | 2.0 | 1.3 |
| 142 | AX | 1.8 | 395 | 746 | 25 | 37 | 3.10E+06 | 2.0 | 1.1 |
| 143 | AY | 1.5 | 616 | 1098 | 15 | 23 | 2.62E+06 | 1.5 | 1.0 |
| 144 | AY | 2.0 | 465 | 722 | 27 | 28 | 2.77E+06 | 3.5 | 1.8 |
| 145 | AZ | 0.9 | 396 | 744 | 21 | 59 | 3.27E+06 | 1.5 | 1.7 |
| 146 | AZ | 1.2 | 395 | 709 | 27 | 38 | 3.14E+06 | 1.5 | 1.3 |
| 147 | BA | 1.5 | 465 | 842 | 23 | 28 | 2.97E+06 | 2.0 | 1.3 |
| 148 | BA | 1.6 | 542 | 883 | 19 | 30 | 2.73E+06 | 2.0 | 1.3 |
| 149 | BB | 1.5 | 625 | 995 | 19 | 22 | 2.80E+06 | 1.5 | 1.0 |
| 150 | BB | 1.5 | 458 | 866 | 20 | 23 | 2.44E+06 | 3.5 | <u>2.3</u> |

| Experimental Example | Fatigue resistance | | Plating adhesion | Spot weldability | Corrosion resistance | Chipping Properties | 1R90° V bending powdering | |
|---|---|---|---|---|---|---|---|---|
| | Fatigue limit DL MPa | DL/TS | | | | | | |
| 126 | 353 | 0.49 | ○ | ○ | ○ | ○ | ○ | Example |
| 127 | 361 | 0.43 | ○ | ○ | ○ | ○ | ○ | Example |
| 128 | 354 | 0.42 | ○ | ○ | ○ | ○ | ○ | Example |
| 129 | 359 | 0.44 | ○ | ○ | ○ | ○ | ○ | Example |
| 130 | 298 | 0.47 | ○ | ○ | ○ | ○ | ○ | Example |
| 131 | 404 | 0.45 | ○ | ○ | ○ | ○ | ○ | Example |
| 132 | 381 | 0.45 | ○ | ○ | ○ | ○ | ○ | <u>Comp.Ex.</u> |
| 133 | 348 | 0.46 | ○ | ○ | ○ | ○ | ○ | Example |
| 134 | 333 | 0.45 | ○ | ○ | ○ | ○ | ○ | Example |
| 135 | 416 | 0.45 | ○ | ○ | ○ | ○ | ○ | Example |
| 136 | 392 | 0.42 | ○ | ○ | <u>x</u> | Unmeasurable | | <u>Comp.Ex.</u> |
| 137 | 425 | 0.47 | ○ | ○ | ○ | ○ | ○ | Example |
| 138 | 374 | 0.45 | ○ | ○ | ○ | ○ | ○ | Example |
| 139 | 224 | 0.41 | ○ | ○ | ○ | ○ | ○ | <u>Comp.Ex.</u> |
| 140 | 309 | 0.49 | ○ | ○ | ○ | ○ | ○ | Example |
| 141 | 433 | 0.48 | ○ | ○ | ○ | ○ | ○ | Example |
| 142 | 329 | 0.44 | ○ | ○ | ○ | ○ | ○ | Example |
| 143 | 473 | 0.43 | ○ | ○ | ○ | ○ | ○ | Example |
| 144 | 408 | 0.57 | ○ | ○ | ○ | ○ | ○ | Example |
| 145 | 388 | 0.52 | ○ | ○ | ○ | ○ | ○ | Example |
| 146 | 342 | 0.48 | ○ | ○ | ○ | ○ | ○ | Example |
| 147 | 415 | 0.49 | ○ | ○ | ○ | ○ | ○ | Example |
| 148 | 487 | 0.55 | ○ | ○ | ○ | ○ | ○ | Example |
| 149 | 537 | 0.54 | ○ | ○ | ○ | ○ | ○ | Example |
| 150 | 445 | 0.51 | <u>x</u> | ○ | ○ | ○ | ○ | <u>Comp.Ex.</u> |

TABLE 41

| Experimental Example | Chemical components | Thickness t mm | Tensile properties | | | | | Bendability | |
|---|---|---|---|---|---|---|---|---|---|
| | | | Yield strength YS MPa | Maximum tensile strength TS MPa | Total elongation El % | Hole expansibility λ % | $TS^{0.5} \times El \times \lambda^{0.5}$ | Minimum bending radius r mm | r/t |
| 151 | BB | 2.2 | 492 | 761 | 22 | 42 | 2.99E+06 | 3.0 | 1.4 |
| 152 | BB | 2.0 | 542 | 854 | 22 | 35 | 3.25E+06 | 2.0 | 1.0 |

TABLE 41-continued

| | | | | | | | | | |
|---|---|---|---|---|---|---|---|---|---|
| 153 | BC | 1.1 | 271 | 598 | 29 | 58 | 3.23E+06 | 1.5 | 1.4 |
| 154 | BC | 1.3 | 427 | 687 | 24 | 46 | 2.93E+06 | 1.5 | 1.2 |
| 155 | BC | 1.7 | 443 | 762 | 23 | 45 | 3.25E+06 | 1.5 | 0.9 |
| 156 | BC | 2.0 | 330 | 594 | 29 | 61 | 3.28E+06 | 2.5 | 1.3 |
| 157 | BC | 1.2 | 361 | 686 | 27 | 35 | 2.87E+06 | 3.0 | 2.5 |
| 158 | BD | 1.5 | 353 | 706 | 29 | 24 | 2.67E+06 | 1.0 | 0.7 |
| 159 | BD | 1.7 | 369 | 696 | 26 | 45 | 3.20E+06 | 1.5 | 0.9 |
| 160 | BE | 1.5 | 421 | 753 | 26 | 28 | 2.84E+06 | 1.0 | 0.7 |
| 161 | BE | 1.9 | 384 | 742 | 25 | 36 | 3.03E+06 | 2.5 | 1.3 |
| 162 | BF | 1.0 | 480 | 879 | 20 | 35 | 3.08E+06 | 1.5 | 1.5 |
| 163 | BF | 1.7 | 568 | 1055 | 14 | 38 | 2.96E+06 | 1.5 | 0.9 |
| 164 | BF | 1.5 | 567 | 899 | 20 | 26 | 2.75E+06 | 1.5 | 1.0 |
| 165 | BF | 0.9 | 534 | 899 | 26 | 37 | 4.26E+06 | 2.0 | 2.2 |
| 166 | BG | 1.0 | 353 | 686 | 27 | 34 | 2.83E+06 | 1.0 | 1.0 |
| 167 | BG | 1.5 | 792 | 940 | 19 | 46 | 3.71E+06 | 2.5 | 1.7 |
| 168 | BG | 1.5 | 348 | 690 | 25 | 48 | 3.14E+06 | 3.0 | 2.0 |
| 169 | BG | 1.2 | 419 | 776 | 24 | 33 | 2.98E+06 | 1.5 | 1.3 |
| 170 | BH | 1.2 | 513 | 911 | 17 | 30 | 2.56E+06 | 1.0 | 0.7 |
| 171 | BH | 1.9 | 590 | 1052 | 15 | 24 | 2.51E+06 | 1.0 | 0.5 |
| 172 | BH | 1.8 | 583 | 861 | 22 | 27 | 2.89E+06 | 1.0 | 0.6 |
| 173 | BH | 1.3 | 513 | 818 | 20 | 47 | 3.21E+06 | 1.5 | 1.2 |
| 174 | BI | 1.5 | 345 | 675 | 28 | 44 | 3.26E+06 | 2.0 | 1.3 |
| 175 | BI | 1.2 | 296 | 481 | 41 | 43 | 2.84E+06 | 2.0 | 1.7 |

| Experimental Example | Fatigue resistance | | Plating adhesion | Spot weldability | Corrosion resistance | Chipping Properties | 1R90° V bending powdering | |
|---|---|---|---|---|---|---|---|---|
| | Fatigue limit DL MPa | DL/TS | | | | | | |
| 151 | 369 | 0.48 | ○ | ○ | ○ | ○ | ○ | Example |
| 152 | 458 | 0.54 | ○ | ○ | ○ | ○ | ○ | Example |
| 153 | 283 | 0.47 | ○ | ○ | ○ | ○ | ○ | Example |
| 154 | 385 | 0.56 | ○ | ○ | ○ | ○ | ○ | Example |
| 155 | 384 | 0.50 | ○ | ○ | ○ | ○ | ○ | Example |
| 156 | 310 | 0.52 | ○ | ○ | ○ | ○ | ○ | Example |
| 157 | 381 | 0.56 | ○ | ○ | ○ | ○ | ○ | Comp.Ex. |
| 158 | 293 | 0.42 | ○ | ○ | ○ | ○ | ○ | Example |
| 159 | 362 | 0.52 | ○ | ○ | ○ | ○ | ○ | Example |
| 160 | 359 | 0.48 | ○ | ○ | ○ | ○ | ○ | Example |
| 161 | 329 | 0.44 | ○ | ○ | ○ | ○ | ○ | Example |
| 162 | 376 | 0.43 | ○ | ○ | ○ | ○ | ○ | Example |
| 163 | 495 | 0.47 | ○ | ○ | ○ | ○ | ○ | Example |
| 164 | 460 | 0.51 | ○ | ○ | ○ | ○ | ○ | Example |
| 165 | 419 | 0.47 | ○ | ○ | ○ | ○ | ○ | Comp.Ex. |
| 166 | 295 | 0.43 | ○ | ○ | ○ | ○ | ○ | Example |
| 167 | 615 | 0.65 | ○ | ○ | ○ | ○ | ○ | Example |
| 168 | 197 | 0.29 | ○ | ○ | ○ | ○ | ○ | Comp.Ex. |
| 169 | 354 | 0.46 | ○ | ○ | ○ | ○ | ○ | Example |
| 170 | 457 | 0.50 | ○ | ○ | ○ | ○ | ○ | Example |
| 171 | 535 | 0.51 | x | ○ | ○ | ○ | ○ | Comp.Ex. |
| 172 | 475 | 0.55 | ○ | ○ | ○ | ○ | ○ | Example |
| 173 | 488 | 0.60 | ○ | ○ | ○ | ○ | ○ | Example |
| 174 | 317 | 0.47 | ○ | ○ | ○ | ○ | ○ | Example |
| 175 | 215 | 0.45 | ○ | ○ | ○ | ○ | ○ | Example |

TABLE 42

| Experimental Example | Chemical components | Thickness t mm | Tensile properties | | | | | Bendability | |
|---|---|---|---|---|---|---|---|---|---|
| | | | Yield strength YS MPa | Maximum tensile strength TS MPa | Total elongation El % | Hole expansibility $\lambda$ % | $TS^{0.5} \times El \times \lambda^{0.5}$ | Minimum bending radius r mm | r/t |
| 176 | BJ | 1.5 | 416 | 858 | 17 | 56 | 3.20E+06 | 1.5 | 1.0 |
| 177 | BJ | 1.4 | 386 | 630 | 19 | 25 | 1.50E+06 | 2.5 | 1.8 |
| 178 | BJ | 1.5 | 450 | 972 | 17 | 28 | 2.73E+06 | 2.0 | 1.3 |
| 179 | BK | 1.3 | 307 | 671 | 30 | 29 | 2.81E+06 | 2.0 | 1.5 |
| 180 | BL | 1.3 | 378 | 684 | 24 | 45 | 2.88E+06 | 2.0 | 1.5 |
| 181 | BL | 1.3 | 357 | 718 | 26 | 37 | 3.04E+06 | 1.5 | 1.2 |
| 182 | BL | 2.0 | 447 | 692 | 28 | 50 | 3.60E+06 | 3.5 | 1.8 |
| 183 | BL | 1.9 | 379 | 740 | 24 | 34 | 2.82E+06 | 1.5 | 0.8 |
| 184 | BL | 1.3 | 375 | 635 | 30 | 54 | 3.53E+06 | 2.6 | 2.0 |
| 185 | BM | 1.5 | 486 | 921 | 17 | 33 | 2.73E+06 | 1.0 | 0.7 |
| 186 | BM | 1.4 | 261 | 551 | 21 | 31 | 1.51E+06 | 2.5 | 1.8 |
| 187 | BM | 1.6 | 482 | 885 | 20 | 34 | 3.07E+06 | 2.0 | 1.3 |

TABLE 42-continued

| | | | | | | | | |
|---|---|---|---|---|---|---|---|---|
| 188 | BN | 1.5 | 354 | 706 | 24 | 44 | 2.99E+06 | 2.0 | 1.3 |
| 189 | BN | 1.2 | 385 | 641 | 29 | 56 | 3.52E+06 | 2.0 | 1.7 |
| 190 | BO | 1.5 | 160 | <u>365</u> | 37 | 52 | <u>1.86E+06</u> | 1.0 | 0.7 |
| 191 | BP | 1.5 | 870 | 1460 | 5 | 13 | 1.01E+06 | 5.5 | <u>3.7</u> |
| 192 | BQ | 1.5 | 292 | <u>462</u> | 27 | 29 | <u>1.44E+06</u> | 4.0 | <u>2.7</u> |
| 193 | BR | Experiment stopped due to occurrence of cracking of slab during heating in hot rolling step | | | | | | | |
| 194 | BS | 1.5 | 230 | <u>430</u> | 30 | 35 | <u>1.58E+06</u> | 3.5 | <u>2.3</u> |
| 195 | BT | Experiment stopped due to occurrence of cracking of slab during heating in hot rolling step | | | | | | | |
| 196 | BU | Experiment stopped due to occurrence of cracking of slab during hot rolling in hot rolling step | | | | | | | |
| 197 | BV | 1.5 | 485 | 830 | 13 | 16 | <u>1.24E+06</u> | 5.0 | <u>3.3</u> |
| 198 | BW | Experiment stopped due to occurrence of cracking of slab during transportation after casting of slab | | | | | | | |
| 199 | BX | 1.5 | 442 | 756 | 14 | 12 | 1.01E+06 | 5.0 | <u>3.3</u> |
| 200 | BY | 1.5 | 635 | 1204 | 3 | 5 | <u>2.80E+05</u> | over 6.0 | <u>over4.0</u> |
| 201 | A | 1.5 | 452 | 745 | 24 | 38 | 2.99E+06 | 1.5 | 1.0 |

| Experimental Example | Fatigue resistance Fatigue limit DL MPa | DL/TS | Plating adhesion | Spot weldability | Corrosion resistance | Chipping Properties | 1R90° V bending powdering | |
|---|---|---|---|---|---|---|---|---|
| 176 | 412 | 0.48 | ○ | ○ | ○ | ○ | ○ | Example |
| 177 | 349 | 0.55 | ○ | ○ | ○ | ○ | ○ | <u>Comp.Ex.</u> |
| 178 | 433 | 0.45 | ○ | ○ | ○ | ○ | ○ | Example |
| 179 | 282 | 0.42 | ○ | ○ | ○ | ○ | ○ | Example |
| 180 | 346 | 0.51 | ○ | ○ | ○ | ○ | ○ | Example |
| 181 | 338 | 0.47 | ○ | ○ | ○ | ○ | ○ | Example |
| 182 | 431 | 0.62 | ○ | ○ | ○ | ○ | ○ | Example |
| 183 | 361 | 0.49 | x | ○ | ○ | x | x | <u>Comp.Ex.</u> |
| 184 | 353 | 0.56 | ○ | ○ | ○ | ○ | ○ | Example |
| 185 | 397 | 0.43 | ○ | ○ | ○ | ○ | ○ | Example |
| 186 | 216 | 0.39 | ○ | ○ | ○ | ○ | ○ | <u>Comp.Ex.</u> |
| 187 | 418 | 0.47 | ○ | ○ | ○ | ○ | ○ | Example |
| 188 | 314 | 0.44 | ○ | ○ | ○ | ○ | ○ | Example |
| 189 | 368 | 0.57 | ○ | ○ | ○ | ○ | ○ | Example |
| 190 | 155 | 0.42 | ○ | ○ | ○ | ○ | ○ | <u>Comp.Ex.</u> |
| 191 | 423 | <u>0.29</u> | ○ | x | ○ | ○ | ○ | <u>Comp.Ex.</u> |
| 192 | 175 | 0.38 | ○ | ○ | ○ | ○ | ○ | <u>Comp.Ex.</u> |
| 193 | | Experiment stopped due to occurrence of cracking of slab during heating in hot rolling step | | | | | | <u>Comp.Ex.</u> |
| 194 | 155 | 0.36 | ○ | ○ | ○ | ○ | ○ | <u>Comp.Ex.</u> |
| 195 | | Experiment stopped due to occurrence of cracking of slab during heating in hot rolling step | | | | | | <u>Comp.Ex.</u> |
| 196 | | Experiment stopped due to occurrence of cracking of slab during hot rolling in hot rolling step | | | | | | <u>Comp.Ex.</u> |
| 197 | 234 | <u>0.28</u> | ○ | x | ○ | ○ | ○ | <u>Comp.Ex.</u> |
| 198 | | Experiment stopped due to occurrence of cracking of slab during transportation after casting of slab | | | | | | <u>Comp.Ex.</u> |
| 199 | 208 | <u>0.28</u> | ○ | x | ○ | ○ | ○ | <u>Comp.Ex.</u> |
| 200 | 298 | <u>0.25</u> | ○ | x | ○ | ○ | ○ | <u>Comp.Ex.</u> |
| 201 | 380 | 0.51 | x | ○ | ○ | ○ | ○ | <u>Comp.Ex.</u> |

Experimental Example 190 is an example in which since the C content was low and the volume fraction of the hard phase was low, sufficient strength, ductility and hole expansibility could not be obtained.

Experimental Example 191 is an example in which the C content was high and spot weldability deteriorated. Further, a fraction of martensite was high, and fatigue resistance, ductility hole expansibility and bendability were deteriorated.

Experimental Example 192 is an example in which since the Si content was low, large amounts of pearlite and coarse cementite were formed in the annealing step and the plating step, formability of the steel sheet could not be sufficiently obtained.

Experimental Example 193 is an example in which the experiment was stopped since the Si content was high and the slab was cracked during heating in the hot rolling step.

Experimental Example 194 is an example in which since the Mn content was low, large amounts of pearlite and coarse cementite were formed in the annealing step and the plating step, formability of the steel sheet could not be sufficiently obtained.

Experimental Example 195 is an example in which the experiment was stopped since the Mn content was high and the slab was cracked during heating in the hot rolling step.

Experimental Example 196 is an example in which the experiment was stopped since the P content was high and the slab was cracked after rolling in the hot rolling step.

Experimental Example 197 is an example in which since the S content was high and a large amount of coarse sulfides were formed, ductility, hole expansibility, bendability, spot weldability and fatigue resistance deteriorated.

Experimental Example 198 is an example in which the experiment was stopped since the Al content was high and the slab was cracked during transportation in the hot rolling step.

Experimental Example 199 is an example in which since the N content was high and a large amount of coarse nitrides were formed, ductility, hole expansibility, bendability, spot weldability and fatigue resistance deteriorated.

Experimental Example 200 is an example in which since the O content was high and a large amount of coarse oxides were formed, ductility, hole expansibility, bendability, spot weldability and fatigue resistance deteriorated.

Experimental Examples 27, 132, and 157 are examples in which since the value of Expression (1) was small in the hot rolling step, the fraction (V1/V2) of the hard phase in the surface layer became high, and sufficient bendability could not be obtained.

Experimental Examples 51, 115, and 168 are examples in which since the value of Expression (1) was large in the hot rolling step, decarburization excessively proceeded in the surface layer and the fraction (V1/V2) of the hard phase became small, and sufficient fatigue resistance could not be obtained.

Experimental Example 85 is an example in which since the average heating rate at 600° C. to 750° C. was too small, growth of oxidation excessively proceeded inside the steel sheet and coarse oxides which act as a fracture origin were formed, bendability and fatigue resistance deteriorated. With a deterioration of bendability, in an evaluation test of plating adhesion and powdering property, plating peeling originating from bending and cracking of the steel sheet occurred, and therefore plating adhesion and powdering property deteriorated.

Experimental Example 68 is an example in which since the maximum heating temperature ($T_M$) was more than Ac3 point in the annealing step, and the volume fraction of the ferrite phase at the ¼ thickness was low, ductility and bendability deteriorated.

Experimental Example 186 is an example in which since the maximum heating temperature ($T_M$) was less than (Ac1 point+20°)° C. in the annealing step, and the coarse iron-based carbides remained without melting, ductility and hole expansibility deteriorated.

Experimental Example 46 is an example in which since the air ratio in the preheating zone was small in the heating step of the annealing step, plating adhesion deteriorated. Since plating peeling occurred at the time of bending deformation by the deterioration of plating adhesion, bendability also deteriorated.

Experimental Example 14 is an example in which since the air ratio in the preheating zone was large in the heating step of the annealing step, decarburization excessively proceeded in the surface layer and the fraction (V1/V2) of the hard phase became small, fatigue resistance deteriorated.

Experimental Example 171 is an example in which since the ratio between the water vapor partial pressure $P(H_2O)$ and the hydrogen partial pressure $P(H_2)$, $P(H_2O)/P(H_2)$, in the reduction zone in the heating step of the annealing step was small, the grain size of the surface of the base steel sheet was not refined, and ζ phase formation did not proceed in the plated layer, plating adhesion was deteriorated. Here, the refined layer was not formed, the average grain size of the ferrite in the surface of the base steel sheet was 3.4 μm, and the maximum size of the oxides was less than 0.01 μm inside the steel sheet within a range up to 0.5 μm from the surface.

Experimental Example 201 is an example in which since the ratio between the water vapor partial pressure $P(H_2O)$ and the hydrogen partial pressure $P(H_2)$, $P(H_2O)/P(H_2)$, in the reduction zone in the heating step of the annealing step was large, the refined layer of the surface of the base steel sheet was excessively thick, and alloying of the plated layer excessively proceeded, plating adhesion deteriorated.

Experimental Example 76 is an example in which since the ratio between the water vapor partial pressure $P(H_2O)$ and the hydrogen partial pressure $P(H_2)$, $P(H_2O)/P(H_2)$, in the reduction zone in the heating step of the annealing step was specifically large, decarburization excessively proceeded in the surface layer and the fraction (V1/V2) of the hard phase became small, and fatigue resistance deteriorated.

Experimental Example 20 is an example in which since the average cooling rate (average cooling rate 1) between 760° C. and 700° C. was low in the cooling step of the annealing step, a large amount of pearlite was formed, ductility and hole expansibility deteriorated.

Experimental Example 49 is an example in which since the average cooling rate (average cooling rate 1) between 760° C. and 700° C. was high in the cooling step of the annealing step, and the volume fraction of the ferrite phase at the ¼ thickness was low, sufficient ductility could not be obtained.

Experimental Example 139 is an example in which since the average cooling rate (average cooling rate 2) between 650° C. and 500° C. was low in the cooling step of the annealing step, a large amount of pearlite was formed, ductility and hole expansibility deteriorated.

Experimental Example 2 is an example in which the amount of effective Al in the plating bath was small and the amount of Fe in the plated layer was large in the plating step, plating adhesion deteriorated.

Experimental Example 150 is an example in which the amount of effective Al in the plating bath and Al in the plated layer increased and the ratio of the interface between the ζ phase, and the base steel in the entire interface between the plated layer and the base steel, bendability and plating adhesion deteriorated.

Experimental Example 12 is an example in which since the value of Expression (2) was small in the plating step and the ratio of the interface between the r phase and the base steel in the entire interface between the plated layer and the base steel, plating adhesion deteriorated.

Experimental Example 183 is an example in which since the value of Expression (2) was large in the plating step and the amount of Fe in the plated layer was large in the plating step, plating adhesion deteriorated.

Experimental Example 65 is an example in which since the blowing pressure of the mixed gas mainly including nitrogen after the immersion was low in the plating bath in the plating step, and the plated amount of the plating layer excessively increased, spot weldability deteriorated.

Experimental Example 136 is an example in which since the blowing pressure of the mixed gas mainly including nitrogen after the immersion was high in the plating bath in the plating step, and the plated amount of the plating layer decreased, and sufficient corrosion resistance could not be obtained.

Experimental Examples 7, 15, 30, 42, 82, and 182 are examples in which the martensitic transformation treatment was applied in the cooling step of the annealing step, and high strength hot-dip galvanized steel sheets excellent in formability, plating adhesion, weldability, corrosion resistance and fatigue resistance were obtained.

Experimental Examples 3, 36, 45, 67, 90, 103, 105, 109, 144, 151, 164, and 184 are examples in which the bainitic transformation treatment 1 was applied in the cooling step of the annealing step, and high strength hot-dip galvanized steel sheets excellent in formability, plating adhesion, weldability, corrosion resistance and fatigue resistance were obtained.

Experimental Example 43 is an example in which the bainitic transformation treatment 1 was applied in the cooling step of the annealing step. However, since the treatment temperature was high, pearlite and coarse cementite were formed, ductility and hole expansibility deteriorated.

Experimental Example 177 is an example in which the bainitic transformation treatment 1 was applied in the cooling step of the annealing step. However, since the treatment time was long, pearlite and coarse cementite were formed, and ductility and hole expansibility deteriorated.

Experimental Examples 23, 40, 55, 91, 114, 137, 154, 173, and 187 are examples in which the bainitic transformation treatment 2 was applied in the cooling step after the plating step, and high strength hot-dip galvanized steel sheets excellent in formability, plating adhesion, weldability, corrosion resistance and fatigue resistance were obtained.

Experimental Example 165 is an example in which the bainitic transformation treatment 2 was applied in the cooling step after the plating step. However, since the treatment temperature was high, a large amount of residual austenite was formed, bendability deteriorated.

Experimental Examples 4, 18, 26, 48, 53, 62, 74, 77, 88, 95, 113, 130, 167, and 189 are examples in which the reheating treatment was applied in the cooling step after the plating step, and high strength hot-dip galvanized steel sheets excellent in formability, plating adhesion, weldability, corrosion resistance and fatigue resistance were obtained.

Experimental Example 16 is an example in which the martensitic transformation treatment and the bainitic transformation treatment 1 were applied in the cooling step of the annealing step, and high strength hot-dip galvanized steel sheets excellent in formability, plating adhesion, weldability, corrosion resistance and fatigue resistance were obtained.

Experimental Examples 8, 111, 133, 140, 156, and 172 are examples in which the bainitic transformation treatment 1 was applied in the cooling step of the annealing step, and then the bainitic transformation treatment 2 was applied in the cooling step after the plating step, and high strength hot-dip galvanized steel sheets excellent in formability, plating adhesion, weldability, corrosion resistance and fatigue resistance were obtained.

Experimental Examples 22, 33, and 97 are examples in which the bainitic transformation treatment 1 was applied in the cooling step of the annealing step, and then the reheating treatment was applied in the cooling step after the plating step, and high strength hot-dip galvanized steel sheets excellent in formability, plating adhesion, weldability, corrosion resistance and fatigue resistance were obtained.

Experimental Example 10 is an example in which the bainitic transformation treatment 2 and the reheating treatment were applied in the cooling step after the plating step, and high strength hot-dip galvanized steel sheets excellent in formability, plating adhesion, weldability, corrosion resistance and fatigue resistance were obtained.

Experimental Example 175 is an example in which the bainitic transformation treatment 1 was applied in the cooling step of the annealing step, and then the bainitic transformation treatment 2 and the reheating treatment were applied in the cooling step after the plating step, and high strength hot-dip galvanized steel sheets excellent in formability, plating adhesion, weldability, corrosion resistance and fatigue resistance were obtained.

Experimental Example 80 is an example in which since a diameter of a roll used for the processing was small and excessive strain was introduced in the surface layer of the base steel sheet in the bending-bending back processing step of the processing step, ductility deteriorated.

Experimental Example 59 is an example in which since a diameter of a roll used for the processing was large and sufficient strain was not introduced in the surface layer of the base steel sheet in the bending-bending back processing step of the processing step, and a large amount of residual austenite presented in the surface layer of the base steel sheet, bendability deteriorated.

Although each embodiment and experimental examples of the present invention has been described in detail above, all of these embodiments and these experimental examples are merely examples of embodiments in implementation of the present invention. The technical scope of the present invention should not be interpreted as limited only by the embodiments. That is, the present invention can be implemented in various forms without departing from the technical idea thereof or the main features thereof.

INDUSTRIAL APPLICABILITY

The present invention is an effective technology for a high strength hot-dip galvanized steel sheet excellent in formability, fatigue resistance, weldability, corrosion resistance, and plating adhesion and production method thereof. According to the embodiment of the present invention, it is possible to provide a high strength hot-dip galvanized steel sheet excellent in ductility, hole expansibility and bendability and further excellent in plating adhesion after forming, having high fatigue limit, and having excellent spot weldability and corrosion resistance, and production method thereof.

The invention claimed is:
1. A hot-dip galvanized steel sheet comprising:
a base steel sheet; and
a hot-dip galvanized layer formed on at least one surface of the base steel sheet, wherein:
the base steel sheet includes,
a chemical composition comprising, % by mass,
C: 0.040% to 0.280%,
Si: 0.05% to 2.00%,
Mn: 0.50% to 3.50%,
P: 0.0001% to 0.1000%,
S: 0.0001% to 0.0100%,
Al: 0.001% to 1.500%,
N: 0.0001% to 0.0100%,
O: 0.0001% to 0.0100%, and
a remainder of Fe and impurities;
in a range of ⅛ thickness to ⅜ thickness centered at a position of ¼ thickness from the surface of the base steel sheet, by volume fraction,
40% or more and 97% or less of a ferrite phase,
a total of 3% by volume fraction or more of a hard structure comprising one or more of a bainite phase, a bainitic ferrite phase, a fresh martensite phase and a tempered martensite phase,
a residual austenite phase is 0 to 8% by volume fraction,
a total of a pearlite phase and a coarse cementite phase is 0 to 8% by volume fraction,
in a surface layer range of 20 μm depth in a steel sheet direction from an interface between the hot-dip galvanized layer and the base steel sheet, a volume fraction of a residual austenite is 0 to 3%,
the base steel sheet includes a microstructure in which V1/V2 which is a ratio of a volume fraction V1 of the hard structure in the surface layer range and a volume fraction V2 of the hard structure in the range of ⅛ thickness to ⅜ thickness centered at the position of ¼ thickness from the surface of the base steel sheet is 0.10 or more and 0.90 or less,
a Fe content is more than 0% by mass to 5.0% by mass or less and an Al content is more than 0% by mass to 1.0% by mass or less in the hot-dip galvanized layer, and columnar grains formed of a ζ phase are included in the hot-dip galvanized layer,
a ratio ((A*/A)×100) of an interface (A*) between the ζ phase and the base steel sheet in an entire interface (A) between the hot-dip galvanized plated layer and the base steel sheet is 20% or more,
a refined layer is formed at the side of the interface in the base steel sheet, an average thickness of the refined layer is 0.1 to 5.0 μm, an average grain size of ferrite in the refined layer is 0.1 to 3.0 μm, one or two or more of oxides of Si and Mn are contained, and a maximum size of the oxide is 0.01 to 0.4 μm.

2. The hot-dip galvanized steel sheet according to claim 1, wherein the base steel sheet further contains, % by mass, one or two or more selected from
Ti: 0.001% to 0.150%,
Nb: 0.001% to 0.100%, and
V: 0.001% to 0.300%.

3. The hot-dip galvanized steel sheet according to claim 1, wherein the base steel sheet contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

4. The hot-dip galvanized steel sheet according to claim 2, wherein the base steel sheet contains, % by mass, one or two or more selected from
Cr: 0.01% to 2.00%,
Ni: 0.01% to 2.00%,
Cu: 0.01% to 2.00%,
Mo: 0.01% to 2.00%,
B: 0.0001% to 0.0100%, and
W: 0.01% to 2.00%.

5. The hot-dip galvanized steel sheet according to claim 1, wherein the base steel sheet contains, % by mass, one or two or more selected from Ca, Ce, Mg, Zr, La, and REM in a total amount of 0.0001% to 0.0100%.

6. The hot-dip galvanized steel sheet according to claim 2, wherein the base steel sheet contains, % by mass, one or two or more selected from Ca, Ce, Mg, Zr, La, and REM in a total amount of 0.0001% to 0.0100%.

7. The hot-dip galvanized steel sheet according to claim 3, wherein the base steel sheet contains, % by mass, one or two or more selected from Ca, Ce, Mg, Zr, La, and REM in a total amount of 0.0001% to 0.0100%.

8. The hot-dip galvanized steel sheet according to claim 4, wherein the base steel sheet contains, % by mass, one or two or more selected from Ca, Ce, Mg, Zr, La, and REM in a total amount of 0.0001% to 0.0100%.

9. The hot-dip galvanized steel sheet according to claim 1, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

10. The hot-dip galvanized steel sheet according to claim 2, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

11. The hot-dip galvanized steel sheet according to claim 3, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

12. The hot-dip galvanized steel sheet according to claim 4, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

13. The hot-dip galvanized steel sheet according to claim 5, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

14. The hot-dip galvanized steel sheet according to claim 6, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

15. The hot-dip galvanized steel sheet according to claim 7, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

16. The hot-dip galvanized steel sheet according to claim 8, wherein a ratio ((A**/A*)×100) of an interface (A**) formed between ζ grains in which coarse oxides are present and the base steel sheet in an interface (A*) between the ζ phase and the base steel sheet in the hot-dip galvanized layer is 50% or less.

17. The hot-dip galvanized steel sheet according to claim 1, wherein a plated amount on one surface of the base steel sheet in the hot-dip galvanized layer is 10 g/m² or more and 100 g/m² or less.

18. The hot-dip galvanized steel sheet according to claim 2, wherein a plated amount on one surface of the base steel sheet in the hot-dip galvanized layer is 10 g/m² or more and 100 g/m² or less.

19. The hot-dip galvanized steel sheet according to claim 3, wherein a plated amount on one surface of the base steel sheet in the hot-dip galvanized layer is 10 g/m² or more and 100 g/m² or less.

20. The hot-dip galvanized steel sheet according to claim 4, wherein a plated amount on one surface of the base steel sheet in the hot-dip galvanized layer is 10 g/m² or more and 100 g/m² or less.

* * * * *